United States Patent [19]

Sander et al.

[11] 4,319,337

[45] Mar. 9, 1982

[54] APPARATUS FOR DISPLAYING THE STATUS OF INDIVIDUAL DICTATED MESSAGES IN A CENTRAL DICTATION SYSTEM

[75] Inventors: Willy M. Sander, Stamford; David L. Boudreau, Shelton; G. Burnell Hohl, Norwalk, all of Conn.

[73] Assignee: Dictaphone Corporation, Rye, N.Y.

[21] Appl. No.: 84,122

[22] Filed: Oct. 12, 1979

[51] Int. Cl.³ .............................................. G06F 3/04
[52] U.S. Cl. ...................................... 364/900; 369/29
[58] Field of Search ... 364/200 MS File, 900 MS File, 364/200, 900; 369/25, 29; 179/100.1 DR

[56] References Cited

U.S. PATENT DOCUMENTS

| | | | |
|---|---|---|---|
| 3,648,249 | 3/1972 | Goldsberry | 364/900 |
| 3,984,644 | 10/1976 | Matz | 179/100.1 DR |
| 4,024,354 | 5/1977 | Bolick, Jr. et al. | 369/29 |
| 4,221,938 | 9/1980 | Mohammadioun et al. | 369/29 |
| 4,260,854 | 4/1981 | Kolodny et al. | 369/29 |

Primary Examiner—Harvey E. Springborn

Attorney, Agent, or Firm—Curtis, Morris & Safford; Arthur V. Smith

[57] ABSTRACT

In a central dictation system of the type having a plurality of recorders, a plurality of dictate stations are adapted to seize individual ones of the recorders, and a plurality of transcribe stations assignable to transcribe the dictated messages, a display device displays information identifying predetermined parameters related to the messages being recorded, including the status of such messages, immediately following the seizure of respective recorders by corresponding dictate stations, whereupon messages are dictated onto such recorders. The display device displays information associated with respective messages in corresponding lines, the displayed lines being segregated into areas as a function of the particular status of the associated messages. Depending upon a change in the status of an associated message, the line of displayed information may be transferred from one segregated area to another. The display device is operative to display information of messages having a selected status or a selected parameter.

50 Claims, 18 Drawing Figures

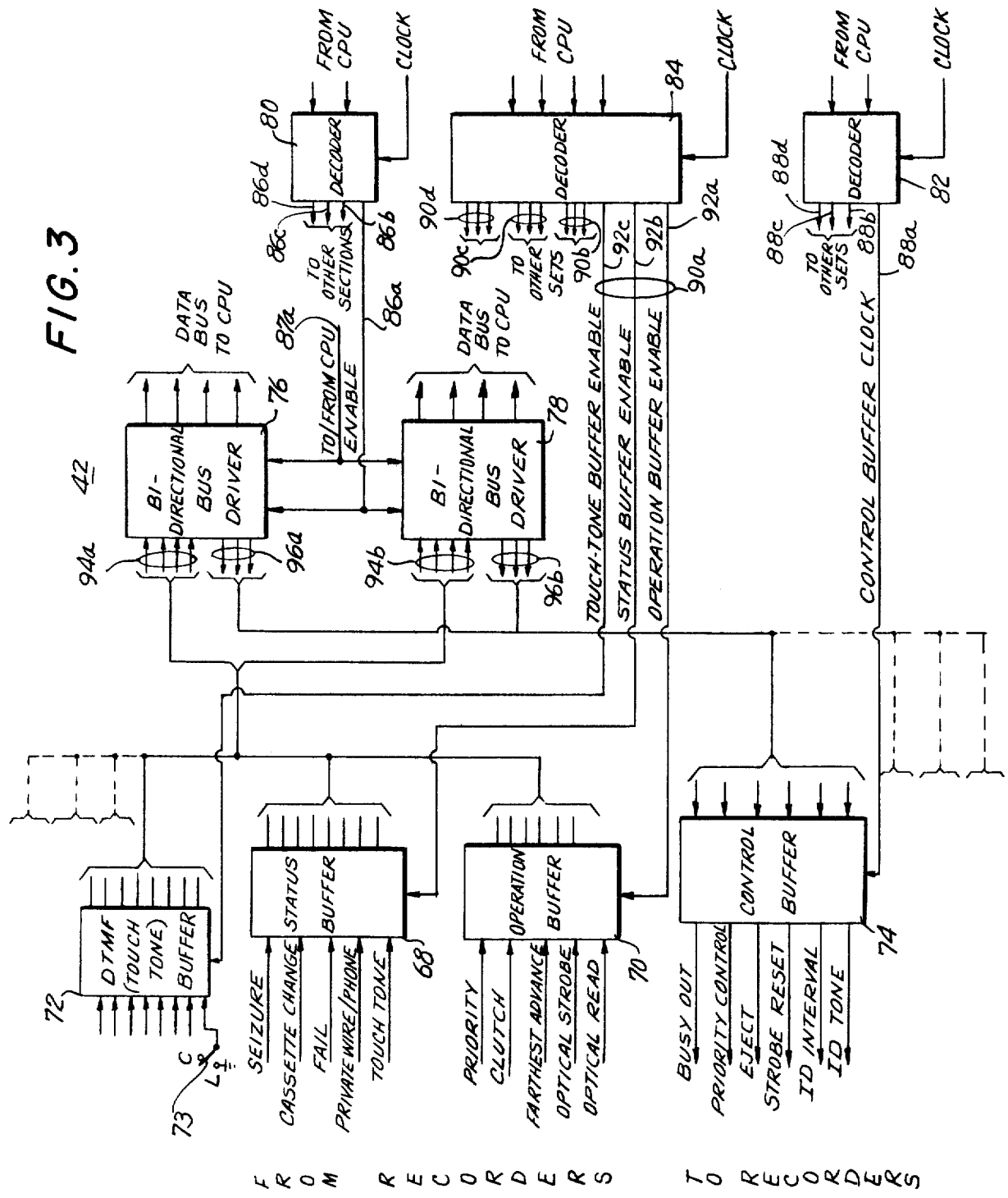

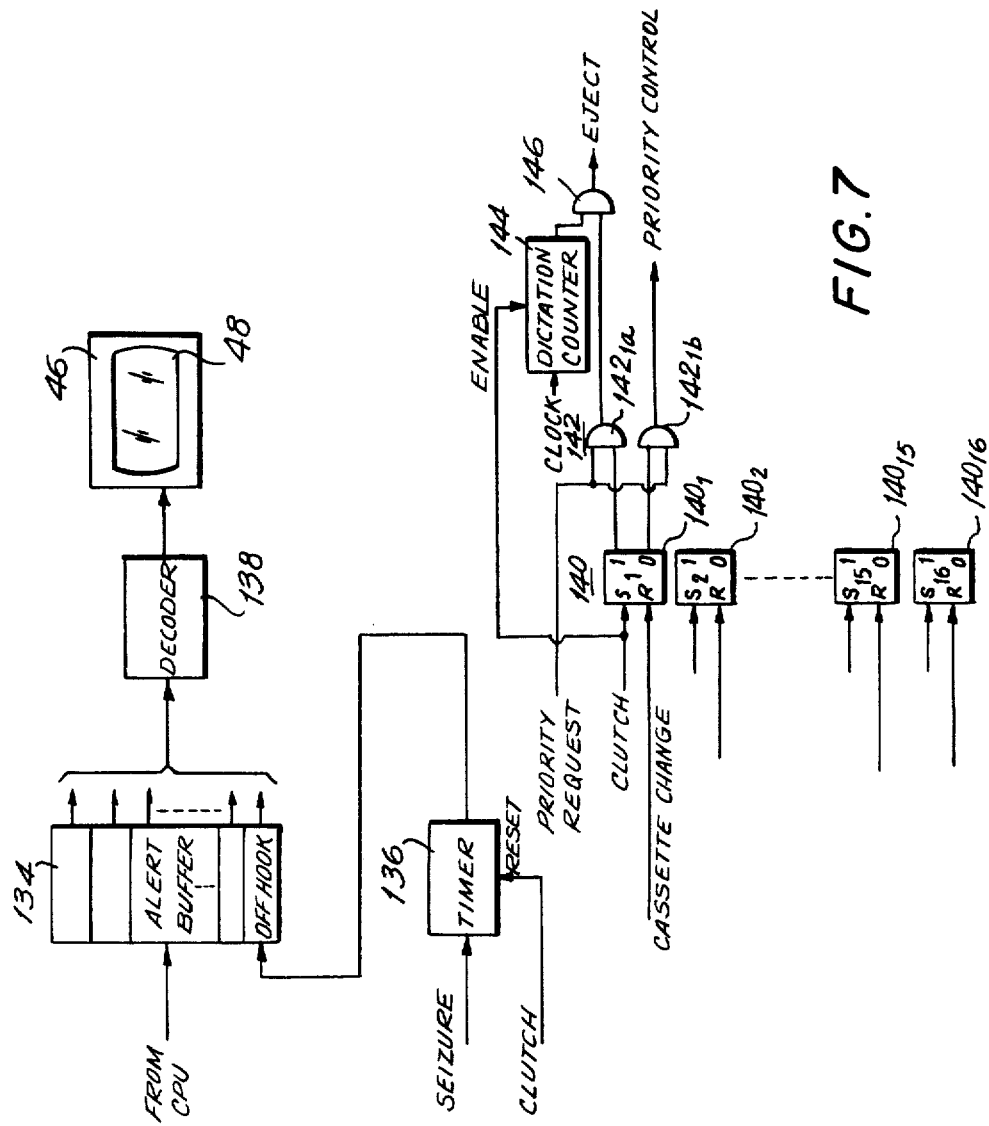

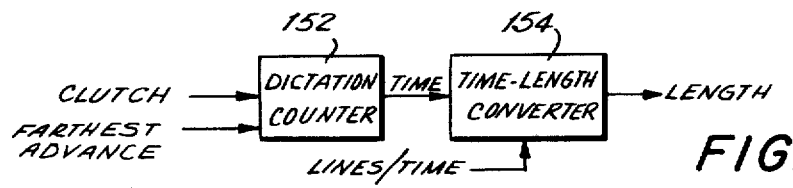
FIG. 9
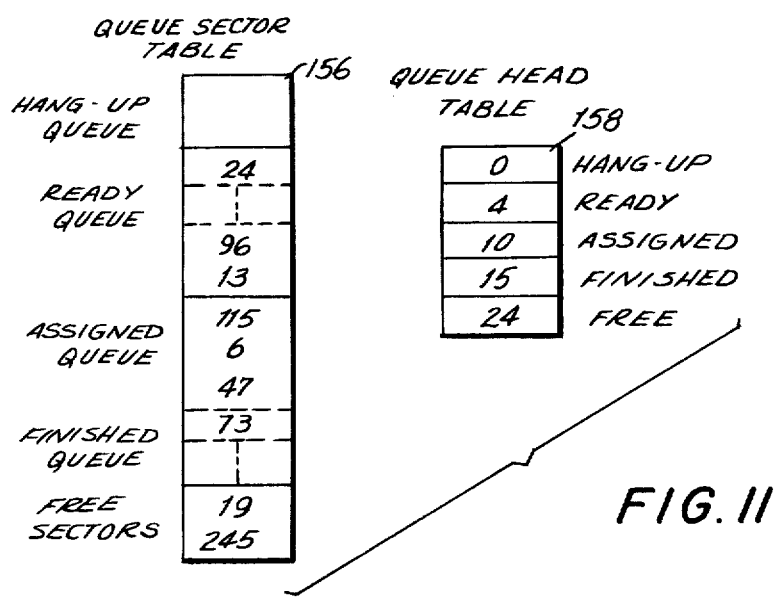
FIG. 10
FIG. 11

FIG. 12

S-13%　A-68%　BACKLOG=2800　TURNAROUND=4.0　RATE=700　JUL 79　25/09:25

COMMAND:

ALERT: OFFHOOK- RECORDER 1

| N | ID# | AUTHOR | DEPT | TYPE | STATUS | REC | CASS | LENGTH | TIME IN | SECY | TIME OUT |
|---|-----|--------|------|------|--------|-----|------|--------|---------|------|----------|
| 1 | 201 | SMITH | 10 | 5 | A P | 1 |  | 174 | 24/13:17 | 4 | 24/13:17 |
| 2 | 415 | JONES | 20 | 1 | A | 4 | 3019 | 14 | 25/08:56 | 6 | 25/9:15 |
| 3 | 308 | GREEN | 20 | 2 | A | 5 |  | 129 | 24/08:10 | 3 | 24/08:10 |
| 4 | 215 | BROWN | 10 | 1 | A | 6 | 3151 | 46 | 24/08:45 | 5 | 24/08:55 |
| 5 | 231 | WHITE | 30 | 3 | A | 4 | 3201 | 51 | 24/09:01 | 2 | 24/11:15 |
| 7 | 224 | BRIGHT | 30 | 1 | R P | 2 | 4175 | 18 | 24/12:59 |  |  |
| 8 | 316 | LAND | 10 | 2 | R P | 7 | 4716 | 72 | 24/14:40 |  |  |
| 9 | 320 | DAY | 10 | 1 | R | 3 | 2247 | 64 | 25/8:56 |  |  |
| 10 | 410 | JOHNSON | 20 | 2 | R | 3 | 3515 | 46 | 25/9:02 |  |  |
| 11 | 290 | CARSON | 10 | 2 | R | 4 | 3119 | 91 | 25/9:05 |  |  |
| 13 |  |  |  |  |  |  |  |  |  |  |  |
| 14 | 315 | HUDSON | 20 | 2 | D | 4 | 3815 |  | 25/8:59 |  |  |
| 15 | 201 | SMITH | 10 | 5 | D | 1 |  |  | 25/9:08 |  |  |
| 16 | 273 | IRVING | 10 | 2 | D | 5 |  |  | 25/9:15 |  |  |
| 17 | 320 | DAY | 10 | 1 | D P | 3 | 2249 |  | 25/9:20 |  |  |

FIG. 13

INQUIRY D201

| N | ID # | AUTHOR | DEPT | TYPE | STATUS | REC | CASS | LENGTH | TIME IN | SECY | TIME OUT |
|---|------|--------|------|------|--------|-----|------|--------|---------|------|----------|
| 1 | 201 | SMITH | 10 | 2 | F | 1 | | 65 | 24/9:15 | 4 | 24/10:50 |
| 2 | 201 | SMITH | 10 | 1 | A | 1 | | 114 | 24/13:25 | 4 | 24/13:25 |
| 3 | 201 | SMITH | 10 | 4 | R | 4 | 2718 | 39 | 25/9:15 | | |

FIG. 14

INQUIRY R1

| N | ID # | AUTHOR | DEPT | TYPE | STATUS | REC | CASS | LENGTH | TIME IN | SECY | TIME OUT |
|---|------|--------|------|------|--------|-----|------|--------|---------|------|----------|
| 1 | 201 | SMITH | 10 | 4 | F | 1 | | 61 | 23/09:26 | 4 | 23/10:15 |
| 2 | 316 | LAND | 10 | 1 | F | 1 | | 55 | 23/10:15 | 4 | 23/11:00 |
| 3 | 308 | GREEN | 20 | 1 | F | 1 | | 47 | 23/10:40 | 4 | 23/11:15 |
| 4 | 254 | GRAY | 30 | 1 | F | 1 | | 115 | 23/13:15 | 4 | 23/14:00 |
| 5 | 275 | BLACK | 30 | 2 | F | 1 | | 141 | 23/14:00 | 4 | 23/15:15 |
| 6 | 201 | SMITH | 10 | 1 | F | 1 | | 197 | 23/15:00 | 4 | 23/17:05 |
| 7 | 308 | GREEN | 20 | 3 | F | 1 | | 82 | 23/15:30 | 4 | 24/09:15 |
| 8 | 419 | SILVER | 20 | 3 | F | 1 | | 94 | 23/16:00 | 4 | 24/09:38 |
| 9 | 360 | GOLD | 10 | 3 | F | 1 | | 65 | 23/16:20 | 4 | 24/10:15 |
| 10 | 316 | LAND | 10 | 5 | A | 1 | | 77 | 24/09:15 | 4 | 24/9:15 |
| 11 | 370 | RAY | 30 | 1 | A | 1 | | 86 | 24/09:25 | 4 | 24/9:25 |
| 12 | 415 | JONES | 20 | 4 | A | 1 | | 110 | 24/09:55 | 4 | 24/9:55 |
| 13 | 201 | SMITH | 10 | 4 | A | 1 | | 101 | 24/10:35 | 4 | 24/10:35 |
| 14 | 240 | LADD | 40 | 2 | A | 1 | | 94 | 24/11:05 | 4 | 24/11:05 |
| 15 | 310 | WATERS | 40 | 2 | A | 1 | | 89 | 24/11:36 | 4 | 24/11:36 |
| 16 | 215 | JACKSON | 30 | 1 | A | 1 | | 115 | 24/12:15 | 4 | 24/12:15 |

MORE

APPARATUS FOR DISPLAYING THE STATUS OF INDIVIDUAL DICTATED MESSAGES IN A CENTRAL DICTATION SYSTEM

BACKGROUND OF THE INVENTION

This invention relates to apparatus for displaying data and, more particularly, to such apparatus for displaying the status of individual messages which are dictated in a central dictation system and for displaying additional information associated with selected parameters of such messages.

Central dictation systems are known wherein a number of dictation recorders are provided, each recorder being connectable to one or more dictate stations such that the users at such dictate stations can dictate messages onto the recorder. One example of such a central dictation system includes a recorder of the so-called endless loop type wherein the recording medium comprises an endless loop of magnetic tape. With this type of recorder, separate dictate and transcribe locations are provided in the endless loop recorder so that, while a user dictates a message onto the endless tape loop, a previously recorded message thereon can be transcribed by a transcriptionist at a transcribe station, the latter being operably connected to the transcribe location of the endless loop recorder. One example of a dictation system incorporating such an endless loop recorder is disclosed in U.S. Pat. No. 3,984,644, issued Oct. 5, 1976, and assigned to the assignee of the present invention.

Another type of recorder which is used in a central dictation system is adapted to record dictated messages onto individual recording media, such as magnetic tape housed in tape cassettes. One example of this type of recorder is disclosed in U.S. Pat. No. 4,099,209, issued July 4, 1978, and assigned to the assignee of the present invention. As disclosed therein, this recorder is provided with a supply of fresh tape cassettes and with a recording mechanism, such as a record/playback deck. A fresh cassette is transported from the supply to the record/playback deck and, concurrently, a used cassette upon which the dictated messages have been recorded is ejected from the record/playback deck and transported to an output store. In the event that a so-called "priority" message is recorded on a fresh cassette, the recorder also includes a priority exit chute whereby, when this priority cassette is ejected from the record/playback deck, it exits from the recorder through the priority exit chute so as to be transcribed promptly. Although dictation and transcription cannot be performed concurrently on the same tape cassette, since conventional cassettes are used, a typical cassette desk-top dictate/transcribe machine can be used to transcribe the dictated message. Hence, if a number of transcriptionists are employed, dictated messages can be transcribed rapidly, and the users of the recorder can be provided with "hard copy" of their dictated messages promptly.

Heretofore, in a central dictation system which is provided with a plurality of recorders, whether of the endless loop type or of the aforementioned cassette-changer type, the status and whereabouts of the dictated messages are not monitored. Consequently, if the originator, or author, of a message has not received a transcribed copy thereof, after a matter of hours, days, or weeks, it may be difficult, if not impossible, to determine why his message has not been transcribed or to ascertain the present location of his dictated message in the central dictation system. Accordingly, there has been a need to provide apparatus for monitoring the whereabouts and status of each message in the central dictation system from the time that the message first is being dictated until the time that the dictated message has been fully transcribed. Also, a suitable display, such as the display screen of a cathode ray tube, is desirable in order to provide supervisory personnel with an overall display of the status of different messages; and to provide that display with the capability of being operated so that all messages of a particular type or having a particular common parameter can be displayed and, thus, located in the central dictation system.

One type of apparatus for monitoring and displaying the status of different dictated messages which has been proposed is adapted to operate with tape cassettes, wherein particular parameters, such as the identity of the particular recorder upon which the messages have been dictated, the identity of the author of such messages and the identity of the cassette, are recorded on the tape within the cassette and read by the monitoring and display apparatus. This apparatus is not a so-called on-line system wherein information is supplied to it while such information is generated. Rather, information is supplied to the apparatus only after all messages have been recorded on a cassette. Information regarding messages which are in the process of being dictated is not displayed. Also, since information is supplied to the apparatus by direct-reading of such information from the cassette tape at, for example, a read station of the apparatus, status information is displayed in the order at which the cassettes are read. This may result in a confusing order of displayed information. Also, the displayed information is not segregated in accordance with different statuses of that information. Rather, to be apprised of the information concerning messages of predetermined status, it is necessary for supervisory personnel to scan displayed information until the information having desired status is obtained.

OBJECTS OF THE INVENTION

Accordingly, it is an object of the present invention to provide improved apparatus for storing and displaying the status of individual dictated messages, which overcomes the aforenoted problems of the apparatus which has been proposed heretofore.

Another object of this invention is to provide improved monitoring and displaying apparatus for use in a central dictation system wherein information, including status information, associated with each message which is and has been dictated can be displayed.

A further object of this invention is to provide monitoring and displaying apparatus for use in a central dictation system wherein such apparatus is on-line so as to receive data directly from the system while that data is in the process of being generated.

An additional object of this invention is to provide monitoring and displaying apparatus for use in a central dictation system wherein information associated with a message is displayed immediately upon the commencement of dictation of that message.

Yet another object of this invention is to provide apparatus for storing and displaying information associated with individual messages which are dictated in a central dictation system, said information including the status of the messages, with the displayed information being segregated into respective areas as a function of the particular status of the associated messages.

A still further object of this invention is to provide apparatus of the foregoing type in which stored information can be retrieved and displayed if that information includes parameters which correspond to selected search parameters.

Another object of this invention is to provide apparatus for storing and displaying information, including status information, associated with individual messages which have been dictated in a central dictation system, said information including information concerning the length of each message, and wherein the apparatus includes a timer for timing each message, the time data then being converted and displayed as approximate line-of-transcription data.

Another object of this invention is to provide apparatus of the foregoing type in which the central dictation system includes at least one multiple-cassette recorder, and wherein the identity of each cassette is optically encoded thereon and is read as the cassette is transported in its recorder, the identity of each cassette also being stored and displayed.

Another object of this invention is to provide monitoring and displaying apparatus for use in a central dictation system in which information concerning each dictated message is stored and the status information associated therewith is updated as the status of the message is changed.

A further object of this invention is to provide apparatus for storing and displaying information related to the status of individual dictated messages which are in the process of being recorded, the displayed information being erased in the event that its associated message is less than a predetermined duration.

An additional object of this invention is to provide apparatus for storing and displaying information associated with messages which are dictated in a central dictation system, which apparatus includes a magnetic disc recording media for storing and for archiving such information, for future retrieval and display.

Various other objects, advantages and features of the present invention will become readily apparent from the ensuing detailed description, and the novel features will be particularly pointed out in the appended claims.

SUMMARY OF THE INVENTION

In accordance with the present invention, apparatus is provided for storing and displaying information associated with respective individual messages which are dictated in a central dictation system of the type having at least one recorder, a plurality of dictate stations adapted to seize the recorder and to transmit dictated messages thereto, and at least one transcribe station assignable to transcribe the dictated messages. The information which is stored and displayed includes status data representing the status of each message, e.g., whether that message is in the process of being dictated, whether dictation is complete, whether that message has been assigned for transcription and whether the transcription of that message has been completed. When a dictate station seizes the recorder to commence the recording of a dictated message, a display device immediately displays the information which is associated with that message being recorded. The displayed information also includes additional parameters representing selected items which relate to the dictated message, such as the identity of the dictator, or author, the length of the dictated message, the identity of the recorder upon which the message was recorded, the type of message, and so on. In accordance with one aspect of this invention, messages having different statuses are displayed in segregated areas of the display device, each area being associated with a respective status. When the status of a respective message changes, the area in which it is displayed is transferred accordingly. In accordance with another aspect of this invention, the display device is selectively operable so as to display all messages which have a common, selected parameter. Advantageously, as dictation of a message proceeds, the length of that message is timed; and time data is converted to an approximate line-of-transcription data representing the equivalent lines of printing of the dictated message, this line-of-transcription data being stored with the information associated with that message and selectively displayed. In accordance with another feature of this invention, the central dictation system is provided with at least one multiple-cassette recorder of the type having a supply of fresh cassettes, each having optically coded indicia on the housing thereof for identifying the cassette, and a record/playbeck deck to which individual ones of the cassettes are transported to have messages recorded thereon. An optical reader is interposed in the transport path of the cassette for reading the optically coded indicia from which cassette identification data is generated and included in the information which is associated with each message recorded on that cassette, which information is stored and selectively displayed.

By reason of the present invention, supervisory personnel easily can ascertain the whereabouts and status of each message which is dictated in a central dictation system, thereby improving the efficiency with which each message is transcribed, and minimizing the possibility of "losing" a message.

BRIEF DESCRIPTION OF THE DRAWINGS

The following detailed description, given by way of example, will best be understood in conjunction with the accompanying drawings in which:

FIG. 3 is a block diagram of the interface circuitry which is included in a portion of the apparatus of this invention;

FIG. 6 is a block diagram representing the manner in which alert conditions are displayed with the apparatus of the present invention;

FIG. 7 is a logic diagram representing the manner in which a priority-dictation control operation is achieved by the apparatus of this invention;

FIG. 9 is a chart representing the information which is associated with each dictated message and which is displayed;

FIG. 10 is a block diagram representing the manner in which the length of each dictated message in terms of lines-of-transcription is ascertained;

FIG. 11 represents a chart which is useful in understanding how the apparatus of this invention keeps account of the information which is stored therein;

FIG. 12 represents a normal display of information which is obtained by the apparatus of this invention;

FIG. 13 represents the display of information which is obtained in response to an inquiry relating to a particular parameter;

FIG. 14 represents the display which is obtained in response to an inquiry associated with another parameter;

DETAILED DESCRIPTION OF A PREFERRED EMBODIMENT

Figure 1:
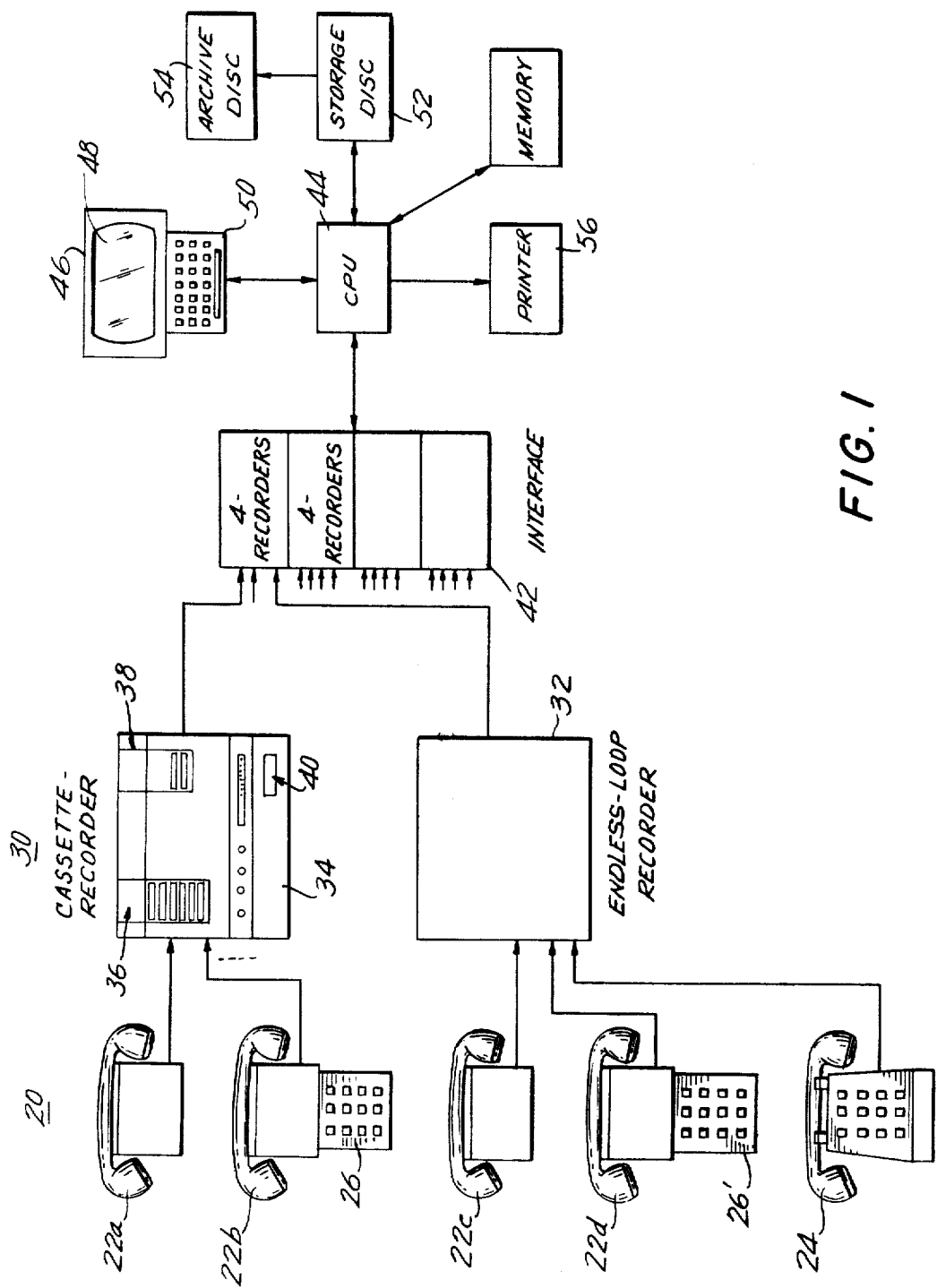
FIG. 1 is a block diagram of apparatus in combination with a central dictation system according to the present invention.

Referring now to the drawings, wherein like reference numerals are used throughout, FIG. 1 is a block diagram representing a central dictation system in which the apparatus of the present invention is employed. The central dictation system includes a plurality of individual dictate stations 20 and a plurality of central recorders 30. Although plural central recorders are illustrated, it will become apparent that the present invention can be used in a central dictation system wherein only a single recorder is provided. Dictate stations 20 may be of the so-called private-wire type wherein direct electrical connections are made between each dictate station and one or more central recorders, or the dictate station may comprise a telephone-coupled handset 24 in which a suitable coupling circuit, or interface device, is interconnected between a central recorder and a telephone line so as to permit remote dictation of messages. In FIG. 1, private-wire handsets 22 are illustrated as comprising handsets 22a, 22b, 22c and 22d, each private-wire handset being disposed at a separate dictate station and being connected to one or more central recorders. Each private-wire handset 22 may be of the type disclosed in aforementioned U.S. Pat. No. 3,984,644. Since such handsets are conventional, further description thereof is not provided.

In addition to a conventional private-wire handset, some or all of dictate stations 20 may be additionally provided with a tone encoder 26 having a keyboard which, when operated, transmits dual-tone multifrequency (DTMF) signals, commonly referred to as Touch-Tone signals. In the illustrated embodiment, tone encoder 26 is provided with private-wire handset 22b and tone encoder 26' is provided with private-wire handset 22d. The user at a respective dictate station, referred to herein as the dictator or author, may transmit tone-encoded data representing his identity and the type of message which he is dictating by suitably operating the keyboard of the tone encoder.

Central recorders 30 may be comprised of one or more endless-loop recorders of the type disclosed in U.S. Pat. No. 3,984,644, or one or more multiple-cassette recorders of the type disclosed in U.S. Pat. No. 4,099,209. It is anticipated that, in a typical central dictation system, a combination of both endless-loop and multiple-cassette recorders is provided. Hence, central recorders 30 are illustrated as comprising an endless-loop recorder 32 and a multiple-cassette recorder 34. As is known, the endless-loop recorder is provided with an endless loop of magnetic tape which is driven to traverse a dictation site whereat a dictated message is recorded and played back, and a transcription site whereat the previously dictated message is played back for transcription. Advantageously, while one message is being recorded, a previously recorded message concurrently can be played back. Typically, a transcribe station (not shown) is connected to the transcription site of endless-loop recorder 32 so as to transcribe all messages which are recorded on the endless loop of magnetic tape. Since the same transcriptionist thus may transcribe each dictated message on the endless loop of magnetic tape, such transcriptionist may be considered to be "assigned" to endless-loop recorder 32. In accordance with an advantageous operating feature of the endless-loop recorder, a message which is dictated and which is awaiting transcription may be assigned a "priority" status, whereupon the transcriptionist advances the endless loop of magnetic tape until the "priority" message is reached and then proceeds to transcribe this priority message. Hence, by designating a particular message as a priority message, it may be transcribed out of its normal turn.

Multiple-cassette recorder 34 includes a supply of fresh cassettes 36, each of which is individually transported to a record/playback deck by a conveyor mechanism, such as a conveyor belt. One or more messages may be recorded on the cassette, depending upon the selected capacity thereof, as determined by a supervisor of the central dictation system. The multiple-cassette recorder additionally includes an output store 38 to which a used cassette is transported from the record/playback deck once the selected recording capacity of that cassette has been attained. As described in U.S. Pat. No. 4,099,209, an elevator mechanism (not shown) is provided at output store 38 to raise each transported, or ejected, cassette which is received from the record/playback deck into an output stack. It is appreciated that, after a dictated message is completed, the cassette upon which that message has been recorded may not be ejected from the record/playback deck because the selected capacity of that cassette has not been reached. For the purpose of the present discussion, it will be assumed that dictated messages which have been completed but which are stored on a cassette that remains in the record/playback deck are characterized as having a status referred to as "hang-up" status. Once a cassette is ejected from the record/playback deck, the status of all messages stored thereon is characterized as "ready-for-transcription" status. As is appreciated, ejected cassettes which are stored in output store 38 may be transcribed by a conventional deck-top transcription machine and, generally, in a central dictation system, a particular transcriptionist is not assigned to transcribe all messages which are recorded by a particular multiple-cassette recorder.

Multiple-cassette recorder 34 additionally is provided with a priority discharge chute 40 at which an ejected cassette containing a priority-dictated message is discharged. As described in greater detail in U.S. Pat. No. 4,099,209, the priority discharge of a cassette operates by raising the elevator which is provided at output store 38 prior to the ejection of the priority cassette from the record/playback deck. Hence, when this priority cassette is ejected, it is transported to priority discharge chute 40 rather than onto the elevator. The cassette then is discharged from the multiple-cassette recorder. Generally, a priority cassette contains only a single message which is the priority message.

In accordance with an advantageous feature of the present invention, an optical code, such as a standard bar code, is provided on the housing of each cassette. This optical code represents identifying data of the cassette such that the whereabouts of that cassette in the central dictation system, and thus the messages which are recorded thereon, can be monitored and ascertained. To this effect, and as will be described in greater detail with respect to FIG. 2, an optical reader is provided in the cassette transport path between supply 36 and the record/playback deck. As the cassette is transported past this optical reader, the optically encoded indicia representing cassette-identifying data is read. This optically read data, together with other data described in greater detail below, is supplied to the storage and display apparatus of the present invention.

The storage and display apparatus of this invention includes a central processing unit (CPU) 44, a display device 46, a storage disc 52 and, optionally, a printer 56. As is recognized, CPU 44 is adapted to receive and transmit data relating to the operation of each of the central recorders in binary format. An interface 42 is provided between central recorders 30 and CPU 44 in order to establish a communication path therebetween. Preferably, the apparatus of the present invention can be used in a central dictation system which is provided with, for example, sixteen central recorders. Interface 42 is adapted to transmit data relating to each of these sixteen recorders between each recorder and CPU 44. In this regard, interface 42 is provided with four separate sections, each section being connected to four separate recorders. In the illustrated embodiment, endless-loop recorder 32 and multiple-cassette recorder 34 are connected to one section of interface 42. As will be described below with respect to FIG. 3, the data from each recorder is multiplexed and transmitted to CPU 44. Also, data which is to be returned to each recorder from CPU 44 is demultiplexed prior to being returned to the appropriate recorder.

CPU 44 may be comprised of a Model 8080 microprocessor, manufactured by Intel Corp., together with associated storage devices, such as random access memories (RAM's), a system clock and associated data processing devices. This microprocessor is programmed so as to control and carry out the various functions which are described herein. It should be readily apparent to those or ordinary skill in the art that, as an alternative to the programmed microprocessor, CPU 44 may be constructed of discrete circuitry. The CPU is adapted to receive data from each of the central recorders via interface 42 and, in response to such data, to generate and accumulate information associated with each message which is dictated. For example, the identity of each dictate station from which a message is dictated, or with the identification of the author of that message, as well as the length of each message, the time at which the message was dictated, the status of that message, the time at which that message was completed and the transcriptionist who has been assigned to transcribe that message all may be accumulated and stored by CPU 44. This information is supplied to display device 46 and selectively displayed on display screen 48 in accordance with particular conditions which are described below. Display device 46 is provided with a keyboard 50 which is coupled to CPU 44 and is adapted to be operated so as to supply the CPU with additional data regarding particular messages, and also to control the CPU such that the information which is supplied to the display device and displayed on display screen 48 is information of a desired type. As will be described, keyboard 50 may be operated to access particular data for display on display screen 48.

In accordance with another advantageous feature of the present invention, the storage and display apparatus is provided with storage disc 52 upon which the data which is received and accumulated by CPU 44 is stored. Thus, in the event of a power failure, information associated with messages which otherwise may be stored in so-called volatile memory devices, such as random access memory devices, is not lost. Also, by providing a magnetic storage disc, the RAM which normally is provided with CPU 44 may be used for data processing and need not be dedicated merely for the storage of subsequently retrieved information.

As also illustrated, an archive magnetic disc 54 is coupled to storage magnetic disc 52. The purpose of archive disc 54 is to store information associated with messages in which changes in the data included in that information normally are not expected. For example, information associated with messages which have been fully transcribed are stored in the archive disc. Such messages, whose status is characterized herein as completed-transcription status, normally are accessed only to ascertain that such messages actually have been fully transcribed, or in accordance with an inquiry which is intended to provide a display of information associated with all messages having a particular parameter. Since such information associated with messages that have been fully transcribed is accessed only infrequently, such messages are stored on archive disc 54 so as to markedly improve the information storage capacity of the apparatus in accordance with the present invention.

The illustrated storage and display apparatus also includes an optional printer 56 which may be of conventional construction. This printer is coupled to CPU 44 and is adapted to print summarizing reports of various activities of the central dictation system in accordance with selected parameters, as provided by keyboard 50. For example, printer 56 may be activated to print summaries of the number and length of messages which are dictated by each author, or onto each recorder, or onto each cassette, or summaries of the amount and length of messages which are transcribed by individual transcriptionists. Such reports may be useful in evaluating the operating efficiency of the central dictation system. Printer 56 also may be operated as a so-called logging printer in which the information associated with a message whose status is changed is printed upon the change in such status.

Before describing the construction and operation of the storage and display apparatus of this invention, an overall description of the operation of the embodiment illustrated in FIG. 1 now follows. As is conventional, when endless-loop recorder 32 or multiple-cassette recorder 34 is seized by a dictate station 20, the seized recorder generates a seizure signal. When the recorder is released, that is, when the dictate station hangs up, the seizure signal terminates. This seizure signal is supplied to interface 42. Also, in order to distinguish between private-wire handsets 22 and telephone-coupled handset 24, a suitable identifying signal is supplied to the interface when one or the other handset is activated. For example, a relatively higher voltage level may be supplied to interface 42 when a private-wire handset 22 is activated, and a relatively lower voltage level may be supplied to the interface when a telephone-coupled handset 24 is activated. With reference to multiple-cassette recorder 34, when a fresh cassette is loaded from supply 36 to the record/playback deck while a used cassette is ejected from the record/playback deck, a cassette change signal is produced. This signal is supplied to interface 42. Also, when a cassette is transported past the optical reader included in multiple-cassette recorder 34 during a loading operation, the optically read indicia which is provided on that cassette is read, and this indicia is supplied to interface 42.

When a central recorder is in the process of recording information on either the endless loop of magnetic tape or the magnetic tape in a cassette, the recorder generates a signal representing that the tape is being advanced, and this signal is supplied to the interface. Also, when a tone encoder 26 is activated, for example, when an author activates the tone encoder to transmit his identity code or to transmit a code representing the type of message which he is dictating, the Touch-Tone signals which are generated by tone encoder 26 are supplied to interface 42. As examples of types of messages, a message may be characterized as a letter, a report, a memorandum, etc.; and each category of message may be identified by a particular code.

Interface 42 receives all of the aforementioned signals which are generated at dictate stations 20 and central recorders 30. A data bus, for example, an 8-bit data bus, may be provided between interface 42 and CPU 44. The interface, under control of the CPU, multiplexes the various signals which are received from the dictate stations and from the central recorders, and supplies these multiplexed signals to CPU 44 as successive 8-bit bytes. As an example, interface 42 may be controlled so as to scan the signal lines which extend between each section of the interface and a respective one of the central recorders in sequence. The various signals which are present on a scanned set of signal lines then are supplied to CPU 44. As an example, each set of signal lines may be scanned for a brief interval during a 25 msec. duration, with a scanning cycle of 400 msec. for the arrangement wherein interface 42 is connected to 16 separate central recorders. Thus, the data represented by the signals which are transmitted by a particular central recorder is updated once every 400 msec. Some of the signal lines included in a set are scanned more often, in the event that information thereon is of the type which changes at a relatively rapid rate. Also, in the event that a control function is to be performed by a central recorder under the control of CPU 44, such as a priority control function, a portion of the scanning period during which a particular set of signal lines is scanned is used to transmit control signals back to the respective central recorder.

Typically, information associated with a message is supplied to CPU 44 from a central recorder at the commencement, during and at the completion of a dictate operation. Also, if a message is dictated by apparatus which is not included in the central dictation system, information associated with that message nevertheless can be supplied to CPU 44 by an operator via keyboard 50. The present discussion initially is directed to the entry of information from a central recorder. This information is, of course, transmitted to CPU 44 by interface 42. When a central recorder is seized by a dictate station, the set of signal lines which is connected to the seized recorder is provided with a seizure signal. When the set of lines is scanned, the seizure signal is detected and the CPU is apprised that the recorder associated with that set of signal lines has been seized. Hence, the identity of the seized recorder, as well as the time at which that recorder is seized, i.e., the time at which dictation commences, is determined. CPU 44 preferably is provided with a so-called real-time system clock, which is driven from the power supply mains, whereby minutes, hours and date (month/day) are monitored. Such timing information thus is used to indicate the time at which dictation commences.

The identity of the particular dictate station connected to the seized central recorder may be supplied, via generated Touch Tone signals, through interface 42 to CPU 44. If the dictate station which is operatively connected to the seized central recorder is provided with a digit-entry device (e.g. a so-called digit entry pad) and tone encoder 26, the author can transmit to CPU 44 tone-encoded signals representing the author's identity and the type of message which he plans on dictating. These tone-encoded signals are decoded and used in CPU 44 as author-identification data and message-type data.

In response to the seizure of a central recorder, CPU 44 also generates in-dictation status data representing that the status of the message which is or will be dictated onto the seized recorder is in dictation. All of this information which is supplied to and generated by CPU 44 is referred to hereinafter as a job record. Thus, it is seen that when a central recorder is seized, a job record automatically is produced. Various parameters included in that job record, such as author identification and message type, are derived in response to the operation of tone encoder 26. This job record is supplied by CPU 44 to display device 46 for display in an appropriate line on display screen 48. In addition to this job record, it is recognized that job records are generated in response to the seizure of other central recorders. If the central dictation system is provided with 16 central recorders, it follows that 16 such job records may be generated.

As will be explained below, during a so-called "normal" display of job records, only a predetermined number of job records having the "in-dictation" status is displayed. The remaining job records of this status are stored for subsequent display. As an example, only five job records having the "in-dictation" status may be displayed, these job records being selected in accordance with the reverse chronological order in which dictation commenced. That is, the job records associated with the newest message, the next newest message, and so on, are displayed. If one of the displayed job records is erased from display screen 48, as will be described below, the next oldest job record of "in-dictation" status is displayed.

CPU 44 is provided with a timing circuit which is responsive to the signal generated by the central recorder representing that tape is being transported for timing the actual length of the message which is being recorded. This time information represents message length, and this message-length data preferably is converted to a representation of the approximate number of lines of transcription which would be printed when the message is transcribed. This message-length data, in terms of lines-of-transcription, is included in the job record which is stored and which is displayed on display screen 48. CPU 44 is responsive to the release of the central recorder, as represented by the termination of the seizure signal, to generate end-of-dictation time data. It is appreciated that the difference between the end-of-dictation time and the start-of-dictation time cannot be used to represent the actual length of the dictated message because this time differential represents the total time duing which the central recorder was seized by the dictate station. If this total time is less than some predetermined amount, for example, twelve seconds, it is assumed that the central recorder was seized unintentionally and that a message was not actually recorded. In this event, the job record which had been generated in response to the seizure of the central recorder is erased.

Let it be assumed that a message is being recorded on endless-loop recorder 32. The job record which is associated with that message has been generated by CPU 44 and is stored therein. If the chronological order of this message is within the predetermined number of messages having the in-dictation status which is displayed on display screen 48, the job record associated therewith is displayed. The displayed job record will include the identity of the author dictating the message, the type of message which is being dictated, the in-dictation status, the identity of endless-loop recorder 32 and the time at which dictation was commenced. When the dictated message is completed, endless-loop recorder 32 will be released by the dictate station. Hence, the seizure signal which had been supplied to CPU 44 by interface 42 terminates. As a result of this release of the endless-loop recorder, CPU 44 generates the end-of-dictation time data and also the message length data, both of which are now incorporated into the job record associated with this message. At the same time, CPU 44 changes the status of this message from its in-dictation status to its assigned-for-transcription status. It is recalled that, in accordance with an initial assumption as to the operation of the central dictation system, a particular transcriptionist may be assigned to transcribe all messages which are dictated on the endless-loop recorder. Since the identity of this assigned transcriptionist is known, it is assumed that, once a message has been fully dictated, its status changes to the assigned-for-transcription status.

With this change in status of the message, the job record associated therewith no longer is displayed on display screen 48. This job record, now containing the assigned-for-transcription status data, is transferred to storage disc 52 whereat it is stored in a location which is used for storing job records associated with messages having a like status. Also, with this change in the status of the message, the job record associated with that message, containing the changed status data, i.e., the assigned-for-transcription status data, is supplied to printer 56 which, in turn, provides a printed copy of the job record.

Let it now be assumed that the transcriptionist has fully transcribed the dictated message. Keyboard 50 may be operated to enter end-of-transcription data, together with one or more parameters to identify the job record associated with the message which has been fully transcribed, to CPU 44. The CPU then retrieves the identified job record from storage disc 52 and changes the status data therein from assigned-for-transcription status to end-of-transcription status. This job record, containing the changed status data, is returned to storage disc 52. Additionally, printer 56 operates to provide a printed copy of the job record whose status has been changed. Subsequently, the job record associated with the message whose transcription has been completed is transferred from storage disc 52 to archive disc 54.

The foregoing has described the operation of the illustrated apparatus when a message is recorded on endless-loop recorder 32. Let it be assumed that the message is being recorded on multiple-cassette recorder 34. Let it be further assumed that this message is the first message which is recorded on the cassette which has been loaded onto the record/playback deck. It is recalled that, when a cassette is loaded onto the record/playback deck, the optically coded indicia provided on the housing of the cassette is read by the optical reader, and the optically read indicia is transmitted as cassette-identifying data to CPU 44 via interface 42. Typically, a cassette is loaded prior to seizure of multiple-cassette recorder 34. When the cassette is loaded, CPU 44 generates initial data which will be included in the job record associated with each message that is to be recorded on this cassette. This initial data may comprise, for example, the identity of the recorder and the identity of the cassette which has been loaded therein.

When multiple-cassette recorder 34 is seized by a dictate station, the seizure signal which is transmitted from the multiple-cassette recorder through interface 42 to CPU 44 results in the generation of additional data by the CPU for inclusion in the job record. This additional data may include the identity of the dictate station which has seized the multiple-cassette recorder, the identity of the author at this dictate station, the type of message which he plans on dictating, the start-of-dictation time and the in-dictation status. This additionally generated data is added to the initial data which had identified the recorder and cassette upon which this message is to be dictated. All of this data constitutes the job record which is stored in CPU 44 and supplied to display device 46 for display on display screen 48.

As was described previously with respect to the message which was recorded on endless-loop recorder 32, when the central recorder, in this case multiple-cassette recorder 34, is released, as when the author "hangs up", CPU 44 generates the end-of-dictation time data. If the length of actual dictation is less than a predetermined amount, the job record associated with this message is erased. However, if this time differential exceeds the predetermined amount, then the status data in the job record associated with this message is changed. Let it be assumed that, following the release of multiple-cassette recorder 34, the cassette which had been loaded into the record/playback deck is not ejected therefrom. This means that subsequent messages are to be recorded on this cassette. Since the cassette has not been ejected from the multiple-cassette recorder, it is not yet in a ready-for-transcription condition. The status data of this job record is changed from the in-dictation status to an end-of-dictation status, referred to hereinafter as the "hang-up" status. In the preferred embodiment of this invention, job records containing the hang-up status data are not displayed. Thus, the job record which had been displayed while its associated message was of the in-dictation status now is erased from display screen 48. The job record, containing the changed status data, i.e., containing the hang-up status data, is stored in storage disc 52. Furthermore, since the status data contained in this job record has changed, printer 56 operates to provide a printed copy of this job record.

Since the cassette has not been ejected from multiple-cassette recorder 34, the initial data which had been generated by CPU 44 relating to the identity of the recorder and the identity of the cassette remains stored in the CPU. When the multiple-cassette recorder next is seized, the time of seizure (i.e., the start-of-dictation time data), the author-identity data, the type-of-message data and the in-dictation status data all are generated by CPU 44 and combined with the initial data which had been stored in the CPU to generate the job record which is associated with the next message to be dictated onto the cassette. As before, when the dictated message is completed, the message-length data is generated, and the status data is changed from in-dictation to hang-up status. This job record, containing the changed status data, is stored in storage disc 52; and printer 56 operates to provide a printed copy of this job record.

The foregoing operation is repeated for each subsequent seizure of multiple-cassette recorder 34 until the cassette is ejected. At that time, multiple-cassette recorder 34 generates a CASSETTE CHANGE signal which is supplied via interface 42 to CPU 44. In one embodiment of this invention, the status data contained in the job record associated with the last-recorded message on the cassette is changed from in-dictation status to ready-for-transcription status in response to the CASSETTE CHANGE signal. In accordance with another embodiment of this invention, the release of multiple-cassette recorder 34 precedes the generation of the CASSETTE CHANGE signal; whereby the status data included in the job record associated with this last-recorded message is changed from in-dictation status to hand-up status, and the job record, containing this changed status data, is stored in storage disc 52, as described above. In either embodiment, CPU 44 responds to the CASSETTE CHANGE signal to retrieve from storage disc 52 the job records of all of the messages which had been recorded on this cassette. The status data in each such job record is changed from hang-up status to ready-for-transcription status. It is appreciated that this is the appropriate status for such messages because, now that the cassette has been ejected from mulitple-cassette recorder 34, all messages which had been recorded thereon now are in condition to be transcribed. In the absence of assigning a particular transcriptionist to this task, the messages merely are "ready-for-transcription".

With this change in the status data of the messages which had been recorded on the cassette now ejected from multiple-cassette recorder 34, printer 56 operates to provide a printed copy of each job record containing status data which has been changed.

Display device 46 is adapted to display the job records associated with a predetermined number of messages which have the ready-for-transcription condition. These job records are selected for display on a chronological basis. That is, the job records associated with the, for example, five oldest messages which are ready for transcription are displayed. If the job records associated with one or more of the messages which are dictated on the cassette which has just been ejected from multiple-cassette recorder 34 are in this category, that is, if they are associated with one of the five oldest messages which are ready for transcription, such job record or records are displayed. Those job records which are associated with the remaining messages that are ready for transcription are transmitted to and stored in storage disc 52.

When the aforedescribed cassette is assigned to a particular transcriptionist for the transcription of the messages recorded thereon, as when a supervisor assigns such cassettes for transcription, the identity of this cassette, together with assigned-for-transcription data, is supplied to CPU 44 by keyboard 50. CPU 44 retrieves all of the job records associated with the messages which are recorded on this cassette and which have the ready-for-transcription status from storage disc 52. The ready-for-transcription status data then is changed to assigned-for-transcription data, and the job records are returned to the storage disc. Also, since a change in status has been effected, printer 56 operates to provide a printed copy of all of these job records.

Display device 46 is adapted to display job records associated with a predetermined number of messages which contain assigned-for-transcription status data. These job records are selected on the basis of the chronological order in which the recording of the messages was completed. That is, the job records associated with the five oldest messages containing the assigned-for-transcription status data are displayed. If the job record associated with one of the messages whose status data has just been changed from ready-for-transcription to assigned-for-transcription is one of these five oldest messages, such job record is displayed. If not, the job record merely is stored in storage disc 52.

Subsequently, when all of the messages which have been recorded on the aforementioned cassette have been fully transcribed, keyboard 50 is operated to supply cassette-identity data and completed-transcription data to CPU 44. The CPU responds to this data to retrieve the job records associated with all messages which have been recorded on the identified cassette, and to change the status data included in such job records from assigned-for-transcription to completed-transcription. With this change in the status data of the job records, printer 56 operates to provide a printed copy of such job records. These job records, now containing the completed-transcription status data, are returned to storage disc 52. Subsequently, such job records are transferred to archive disc 54.

When keyboard 50 is operated to supply changed status data to CPU 44, for example, to supply assigned-for-transcription status data or completed-transcription status data to the CPU, time data representing the time-of-day also is supplied to the CPU. This time data is included in the job record whose status data is changed. This time-of-day data represents the time at which the associated message was assigned for transcription, and if the job record associated with this message is displayed, this time-of-day data also is displayed. If the time-of-day data is entered when the status data of a job record is changed from assigned-for-transcription status to completed-transcription status, such time-of-day data represents the time at which transcription of the associated message had been completed. This completed-time data is included in the job record and, in the event that such job record is displayed, the completed time likewise is displayed.

The foregoing has described the manner in which job records are generated, stored and displayed in according with the status of each associated message. In the present example, it has been assumed that display screen 48 of display device 46 is provided with segregated areas at which job records associated with a predetermined number of messages that are in dictation, job records that are associated with a predetermined number of messages which are ready for transcription and job records which are associated with a predetermined number of messages which have been assigned for transcription are displayed. It has been further assumed that, in each segregated area, the predetermined number is equal to five. If, in any area, the status data associated with one of the five messages is changed, the job record associated with that message is erased from display screen 48. Then, the job record associated with the next oldest message containing this status data is retrieved from storage disc 52 and displayed on display screen 48. In the event that there are no remaining job records containing this status data in storage disc 52, then display screen 48 displays less than five job records of that status. As will be described in greater detail hereinbelow, the job records associated with messages which are in dictation are not stored on storage disc 52. Rather, such job records are stored in the random access memory (RAM) which is provided with CPU 44.

The illustrated storage and display apparatus also is operative to control a priority operation for multiple-cassette recorder 34. While this operation is described in greater detail below, a brief discussion thereof follows. When multiple-cassette recorder 34 is seized by a dictate station, priority status may be requested. Typically, keyboard 50 is operated by the supervisor to supply a priority request signal to CPU 44. It is recalled that, when a fresh cassette is loaded into the record/playback deck, the identity of this cassette is supplied to CPU 44 which, in turn, generates initial data for use in the job records which will be associated with messages that are to be recorded on this cassette. In response to the priority request signal, CPU 44 determines whether any job records are stored which are associated with messages that have been recorded on this cassette. If no messages have been recorded on this cassette, the elevator mechanism (not shown) provided at output store 38 is operated so as to expose priority discharge chute 40. Recording on this cassette then proceeds; and upon the completion of dictation, this cassette is ejected from the record/playback deck and discharged through the priority discharge chute. In addition, CPU 44 responds to the CASSETTE CHANGE signal which is generated when this cassette is ejected so as to change the status associated with this message to ready-for-transcription (priority) status.

In the event that CPU 44 ascertains that one or more messages were previously dictated on the cassette which is loaded into the record/playback deck, for example, the CPU finds one or more job records in storage disc 52 which contain this cassette-identity data, CPU 44 then determines whether the present author has commenced the dictation of a message. This is achieved by examining the aforementioned timing circuit which is incremented when tape is being transported.

If it is determined that the author has not commenced the dictation of a message, CPU 44 supplies an EJECT signal and a PRIORITY CONTROL signal to interface 42. These signals are returned to multiple-cassette recorder 34; whereupon the presently-loaded cassette is ejected from the record/playback deck to output store 38, a fresh cassette is supplied from supply 36 to be loaded into the record/playback deck, and then the elevator provided at output store 38 is raised so as to expose priority discharge chute 40. Priority dictation then may be carried out in the manner discussed previously. Of course, as the cassette which had been loaded into the record/playback deck is ejected therefrom, CPU 44 responds to the CASSETTE CHANGE signal which is generated by the multiple-cassette recorder so as to change the status in the job records associated with each message which had been recorded on this ejected cassette.

Figure 2:
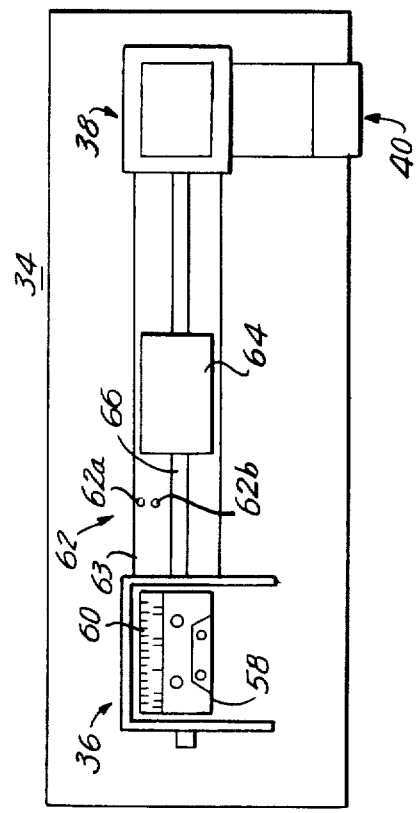
FIG. 2 is a schematic diagram of a portion of the multiple-cassette recorder which can be used with this invention.

Turning now to FIG. 2, there is a schematic representation of multiple-cassette recorder 34, and the optical reader provided therewith. As mentioned previously, multiple-cassette recorder 34 may be of the type disclosed in U.S. Pat. No. 4,099,209. Thus, input store 36 is comprised of a stack of cassettes, the bottom-most cassette 58 being illustrated. Each cassette is provided with optically encoded indicia 60 which, for example, may comprise a bar code printed on a label which is affixed to the housing of the cassette. In one embodiment, this optically encoded indicia is provided on the face-down side of cassette 58, although for convenience, FIG. 2 represents that this indicia is provided on the face-up side. A guide platform 63 extends between supply 36 and output store 38, with record/playback deck 64 interposed between the supply and the output store. A conveyor beld 66, shown as a channel in guide platform 63, is provided with flights (not shown) secured thereto, each flight being adapted to contact the bottom-most cassette to remove that cassette from supply 36 and to push that cassette to record/playback station 64. Concurrently, another flight ejects the cassette which had been loaded previously at record/playback deck 64 and transports this ejected cassette to output store 38. In the path traversed by a cassette from supply 36 to record/playback deck 64 is provided optical reader 62. The optical reader is comprised of a source of light and a light-responsive element which, for example, may be constructed as a fiber-optic device. In the illustrated embodiment, optically coded indicia 60 is comprised of timing data disposed along one track and identifying data disposed along an adjacent track. Optical reader 62 is compatible with the timing and identifying data and, therefore, is comprised of a time-data head 62*a* and an identifying data head 62*b*, each head being comprised of a light source and a light-responsive element. As cassette 58 is transported, the intensity of the light which is transmitted from each light source to its corresponding light-sensitive element is modulated in accordance with the timing and identifying data of indicia 60. Such light modulations are converted to electrical signals, and these signals, which represent the timing and identifying data, are transmitted to CPU 44 via interface 42.

The purpose of the timing data provided in optically encoded indicia 60 is to insure accurate detection of the identifying data. Although not shown with particularity in FIG. 2, the timing data of optically encoded indicia 60 is used to synchronously clock the identifying data into, for example, a storage register. Timing data head 62*a* may be connected to a pulse generator so as to trigger the pulse generator in response to each timing data mark that is sensed thereby. When the pulse generator is triggered, it clocks the signal derived from identifying data head 62*b* into the aforementioned storage register. The pulse generator then is reset in response to a STROBE signal returned thereto from CPU 44, as will be explained below. In this manner, the identifying data which is derived from identifying data head 62b of optical reader 62 is supplied to CPU 44 to identify the cassette which is being loaded into record/playback deck 64.

In the interest of brevity, further description of multiple-cassette recorder 34 is not provided. For a more detailed disclosure of this multiple-cassetted recorder, reference is made to U.S. Pat. No. 4,099,209.

Turning now to FIG. 3, there is illustrated a block diagram of one embodiment of interface 42. In particular, the illustrated apparatus comprises a portionm of a section of the interface. It is recalled that, in a practical embodiment thereof, interface 42 is adapted to be connected to sixteen separate central recorders, each connection being comprised of a set of signal lines. In FIG. 3, the circuits connected to only one set of signal lines are illustrated. These circuits are comprised of a status buffer 68, an operation buffer 70, an encoder buffer 72 and a control buffer 74. These buffers are repeated for each additional set of signal lines which are received from respective central recorders. Hence, in one location of interface 42, there are provided four separate status buffers, four separate operation buffers, four separate encoder buffers and four separate control buffers, each buffer being connected to a portion of the signal lines which are included in a respective set. In addition to these buffers, each section of interface 42 is comprised of multiplexer drivers 76 and 78. Still further, decoders 80, 82 and 84 are used to control the operations of the respective buffers and multiplexer drivers in a manner to be described below.

Status buffer 68 includes a plurality of signal inputs and an enable input. The status buffer is operative in response to an enable signal applied to its enable input to transmit, or pass, the signals which are applied to its signal inputs. In the illustrated embodiment, the signal inputs of status buffer 68 are coupled to a respective central recorder and are adapted to receive the following signals:

The SEIZURE signal is at a relatively high voltage level when the recorder is not seized by a dictate station, and is at a relatively low voltage level when the recorder is seized.

The CASSETTE CHANGE signal is received only if status buffer 68 is connected to a multiple-cassette recorder, and this signal is at a relatively high voltage level when a cassette is being loaded to the record/playback deck while, concurrently, a used cassette is ejected therefrom. The CASSETTE CHANGE signal is at a relatively lower voltage level in the absence of a cassette-changing operation.

The FAIL signal is received in the event of various malfunctions or failures at a central recorder. For example, the FAIL signal is received in the event of a power failure, in the event that the endless loop of magnetic tape in an endless-loop recorder has been exhausted for dictation purposes, in the event that a multiple-cassette recorder has been depleted of fresh cassettes, and so on. In the absence of a failure, the FAIL signal is at a relatively low level.

The PRIVATE WIRE/PHONE signal is at a relatively higher voltage level in the event that the central recorder is communicating with a private-wire handset, and this signal is at a relatively lower voltage level in the event that the central recorder is communicating with a telephone-coupled handset. The information provided by this signal may be used to identify the type of dictate station (e.g. private-wire or remote telephone-coupled) from which the message is recorded, or the type of message (e.g. a telephone-communicated message) which is recorded, as well as for additional purposes, as may be desired.

The TOUCH TONE signal is transmitted when a tone encoder 26 is activated, as when an author transmits his encoded identity as well as an encoded identification of the type of message which he will dictate. This signal is at a relatively higher voltage level when encoder 26 is activated, and is at a relatively lower voltage level when the encoder is not activated.

The enable input of status buffer 68 is connected to receive a status buffer enable signal from decoder 84 so as to transmit the respective signals which are supplied to the signal inputs thereof to input terminals 94a and 94b of multiplexer drivers 76 and 78, respectively.

Operation buffer 70 is provided with a plurality of signal inputs connected to receive respective signals which are transmitted thereto from the central recorder to which the operation buffer is connected, and an enable input which is responsive to an enable signal to transmit, or pass, the signals which are supplied to its signal inputs. The respective signals which are supplied to operation buffer 70 are as follows:

The PRIORITY signal is at a relatively high voltage level only if the recorder to which operation buffer 70 is connected is to be operated as a so-called priority recorder. As described in U.S. Pat. No. 3,984,644, a recorder, such as an endless-loop recorder, may be connected to a separate priority recorder such that, if an author wishes to record a priority message, this message is recorded on the priority recorder so that it can be transcribed immediately. The PRIORITY signal is used by CPU 44 to provide priority status data in the job record associated with the priority message.

The CLUTCH signal is at a relatively low voltage level in the event that tape is being transported in the central recorder to which operation buffer 70 is connected. In both the endless-loop recorder and the multiple-cassette recorder, tape is transported by the combination of a capstan and pinch roller. The pinch roller is solenoid-activated so as to engage the capstan and, thus, transport the tape. When this solenoid is activated, the CLUTCH signal is generated. When tape is not being transported by the recorder, the CLUTCH signal is at a relatively higher voltage level.

The FARTHEST ADVANCE signal is generated only during a recording mode of the central recorder. That is, if a message is in the process of being reviewed by the author, the FARTHEST ADVANCE signal is at a relatively higher voltage level. However, once the magnetic tape has been advanced to its farthest advance position so that fresh tape is being transported, it is assumed that additional dictation is being recorded on this fresh tape and, therefore, the FARTHEST ADVANCE signal is at its relatively lower voltage level. It may be appreciated that when the CLUTCH and FARTHEST ADVANCE signals both are at their relatively low voltage levels, it is assumed that a message is being dictated. These signals are used by CPU 44 to increment a timing circuit which is used to ascertain the total length of a dictated message.

The OPTICAL STROBE signal is supplied with the timing data which is derived from timing head 62a of optical reader 62 (FIG. 2). This timing data, also referred to herein as strobe data, is used by CPU 44 to sense the identifying data which is read from optically coded indicia 60.

The OPTICAL READ signal is the identifying data which is read from coded indicia 60 by identifying data head 62b of optical reader 62. CPU 44 senses the OPTICAL READ signal in response to the OPTICAL STROBE signal.

The enable input of operation buffer 70 is coupled to decoder 84 for receiving the operation buffer enable signal therefrom. This enable signal is generated in a manner described below. In response to the operation buffer enable signal, operation buffer 70 transmits, or passes, the respective signals which are supplied to its signal inputs from the central recorder to which operation buffer 70 is connected, to input terminals 94a and 94b of multiplexer drivers 76 and 78, respectively.

Encoder buffer 72 includes one input connected to changeover switch 73 having a movable contact that is selectively engagable with a first contact C which is adapted to be supplied with a relatively higher voltage level, or with a second contact L which is adapted to be supplied with a relatively lower voltage level, such as ground. In the event that encoder buffer 72 is coupled to a multiple-cassette recorder, change-over switch 73 is operated to engage contact C. Conversely, in the event that encoder buffer 72 is coupled to an endless loop recorder, change-over switch 73 is operated to engage contact L. The encoder buffer is adapted to transmit, or pass, a signal corresponding to the condition of changeover switch 73, this signal being supplied to CPU 44 so as to apprise the CPU of the type of recorder to which buffers 68, 70, 72 and 74 are connected. The remaining signal inputs of encoder buffer 72 are adapted to be supplied with a conventional two-out-of-seven code which represents a particular Touch-Tone signal which has been generated. This two-out-of-seven code may be generated by a suitable decoder in accordance with the author's operation of the Touch-Tone buttons of his telephone handset 24, to represent author-identifying data and message-type data, respectively. Thus, the encoder buffer is adapted to transmit, or pass, decoded signals representing author-identity and messagetype, all as generated by an author.

Encoder buffer 72 additionally includes an enable input terminal which is adapted to receive a Touch-Tone buffer enable signal from decoder 84. In response to this Touch-Tone buffer enable signal, encoder buffer 72 is enabled to transmit, or pass, the decoded Touch-Tone signals, as well as the recorder-type signal, which are applied to its signal inputs. These signals are transmitted by encoder buffer 72 to input terminals 94a and 94b of multiplexer drivers 76 and 78, respectively.

Preferably, each of buffers 68, 70 and 72 is adapted, when enabled, to produce an 8-bit output signal, each bit being a binary "1" or a binary "0" depending upon the voltage level of the signal which is supplied to the corresponding input of that buffer. In the illustrated embodiment, status buffer 68 and operation buffer 70 are provided with less than eight inputs. It may be appreciated that, if desired, additional signals may be supplied to such remaining inputs or, if desired, preset, constant voltage levels may be supplied thereto. As an example, each of these buffers may comprise a conventional tri-state buffer. Each 8-bit signal is supplied to four input terminals 94a of multiplexer driver 76 and to four input terminals 94b of multiplexer driver 78. These multiplexer drivers may be conventional bi-directional bus drivers which, typically, are provided with only four input terminals to receive data and to transmit that received data to a data bus. Of course, if a multiplexer driver is provided with eight such input terminals, only one multiplexer driver need be used.

As illustrated, each multiplexer driver 76 and 78 is provided with output terminals 96a and 96b, respectively. These output terminals are adapted to supply data which is received from CPU 44 via the data bus to control buffer 74. In the illustrated embodiment, output terminals 96a and 96b are comprised of three output terminals for each multiplexer driver, resulting in a 6-bit signal which may be supplied to the control buffer. Control buffer 74 may be comprised of six independent, triggerable flip-flop circuits, such as a so-called "hex flip-flop" circuit. In particular, control buffer 74 includes signal inputs for receiving the 6-bit signal transmitted from CPU 44 through multiplexer drivers 76 and 78, and signal outputs which are coupled to the central recorder to which control buffer 74 is connected. In addition, the control buffer includes a clock input for receiving a control buffer clock signal from decoder 82. The output signals supplied to the central recorder by control buffer 74 are as follows:

The BUSY OUT signal is at a relatively lower voltage level and is adapted to control the recorder to simulate a so-called "busy" condition which prevents the recorder from being seized by a dictate station. This busy condition is desired when CPU 44 is in the process of updating the job record associated with a message received from that recorder. With this busy condition, CPU 44 will not be interrupted by the seizure of the recorder at this time.

The PRIORITY CONTROL signal is supplied to a multiple-cassette recorder and is adapted to raise the elevator provided at output store 38 such that the multiple-cassette recorder is conditioned for a subsequent priority discharge operation. Thus, when the PRIORITY CONTROL signal is produced, a priority message can be recorded onto a cassette which is designated a priority cassette, and this priority cassette can be promptly discharged from the multiple-cassette recorder to facilitate the quick transcription of the priority message.

The EJECT signal is adapted to be supplied to a multiple-cassette recorder for initiating a changing operation therein. This EJECT signal is generated in the event that an author wishes to dictate a priority message, but a cassette having previously recorded messages thereon remains loaded in the record/playback deck. The multiple-cassette recorder is responsive to the EJECT signal to eject this cassette from the record/playback deck and to load a fresh cassette therein so as to enable a priority message to be dictated onto that fresh cassette.

The STROBE RESET signal is adapted to be transmitted to the aforedescribed pulse generator which is included in the optical reader provided in a multiple-cassette recorder. Typically, when a cassette is transported past the optical reader, a timing mark included in the timing data of the optically coded indicia is transmitted to operation buffer 70 as the OPTICAL STROBE signal. This OPTICAL STROBE signal conditions a storage register in CPU 44 to receive and store the OPTICAL READ signal, which may be a binary "1" or "0", that is generated in response to the optically sensed identifying data of the optically coded indicia. Then, CPU 44 returns the STROBE RESET signal to control buffer 74, this STROBE RESET signal being used to reset the pulse generator in the optical reader so as to condition the optical reader to generate the next OPTICAL STROBE signal in response to the next sensed timing mark.

The ID INTERVAL signal is adapted to inhibit the normal dictate functions of the central recorder to which control buffer 74 is connected during a predetermined interval following the seizure of that recorder. This establishes a time duration during which the author is permitted to enter various identifying data, such as his author identity code and a message-type code. It is recalled that this data is entered either by tone encoders 26 which are provided with private-wire handsets 22, or by Touch-Tone signals which are generated at a telephone-coupled handset. This data also may be derived from a rotary-dial telephone-coupled handset.

The ID TONE signal is generated concurrently with the ID INTERVAL signal and is adapted to trigger a tone generator (not shown) to which control buffer 74 is connected. This tone generator returns a corresponding tone to the dictate station which has seized the recorder so as to apprise the author of the existence of the ID interval, and also apprises him that he should enter the respective identifying data.

Control buffer 74 additionally includes a clock input which is adapted to receive a control buffer clock signal. In response to this control buffer clock signal, the control buffer "latches" and transmits the 6-bit signal supplied thereto via output terminals 96a and 96b of multiplexer drivers 76 and 78, respectively, to its signal outputs which are connected to a respective central recorder.

As mentioned above, multiplexer drivers 76 and 78 may comprise conventional bi-directional bus drivers. It is appreciated that CPU 44 is connected to multiplexer drivers 76 and 78 via an 8-bit data bus. This data bus is divided between the multiplexer drivers such that four bits of data are adapted to be transmitted between the CPU and each multiplexer driver. Each multiplexer driver includes a direction control input terminal adapted to receive a direction control signal from CPU 44 to determine whether data signals are to be transmitted from the multiplexer drivers to the CPU or whether data signals are to be received from the CPU by the multiplexer drivers. A control line 87a is connected in common to the direction control input terminals of the multiplexer drivers. Each multiplexer driver additionally includes an enable input terminal for receiving an enable signal from decoder 80. Thus, it is seen that when a TRANSMIT direction control signal is applied to the direction control inputs of multiplexer drivers 76 and 78 concurrently with an enable signal, the multiplexer drivers transmit an 8-bit data signal to CPU 44 via the data bus. This 8-bit signal is constructed from the signals which are supplied to data input terminals 94a and 94b by a particular one of buffers 68, 70 and 72, depending upon which buffer is enabled. Conversely, if a RECEIVE direction control signal is applied to the direction control inputs of multiplexer drivers 76 and 78 by CPU 44 concurrently with an enable signal, the data signal which is received by the multiplexer drivers from the CPU is applied, via output terminals 96a and 96b, to control buffer 74. If the control buffer is, in turn, clocked, this data signal is returned to the central recorder to which the control buffer is connected.

Decoders 80 and 82 are conventional 2-bit decoders and are adapted to receive respective 2-bit address signals from CPU 44, together with respective clock signals. The 2-bit address signals are generated by the CPU in accordance with its programmed operation. Decoder 80 is provided with output terminals 86a, 86b, 86c and 86d. Each of these output terminals is connected to the enable input terminal of multiplexer drivers 76 and 78 which are provided in respective sections of interface 42. As illustrated, enable output 86a is adapted to supply an ENABLE signal to multiplexer drivers 76 and 78. This ENABLE signal enables the multiplexer drivers either to transmit data over the data bus to CPU 44 or to receive data from the CPU and to transfer that received data to control buffer 74, depending upon the state of the direction control signal which is received from the CPU at line 87a.

It may be appreciated that each section of interface 42 is provided with a respective pair of multiplexer drivers 76 and 78. Decoder 80 functions to enable only one of these pairs of multiplexer drivers at a given time. Thus, depending upon which pair of multiplexer drivers is enabled, that particular section of interface 42 is conditioned either to transmit data from a central recorder connected thereto to CPU 44 or to transfer data from the CPU to such central recorder. As mentioned above, each section of interface 42 also is provided with four respective sets of buffers 68, 70, 72 and 74. Only one buffer in each set is conditioned at a particular time; and it is the combination of the conditioned buffer and the enabled pair of multiplexer drivers which determine the specific central recorder that can communicate with CPU 44.

Decoder 82 is similar to decoder 80 and is provided with clock outputs 88a, 88b, 88c and 88d. Clock output 88a is connected to the clock input of control buffer 74 in each section of interface 42. Thus, it is recognized that clock output 88a is connected to four different control buffers, all similar to control buffer 74, each of these four control buffers being provided in a respective section of the interface. Similarly, each of clock outputs 88b, 88c and 88d is connected to a respective set of each of our control buffers which are provided in the four respective sections of interface 42, each of these buffers in each interface section being included in a set that differs from the set in which illustrated control buffer 74 is disposed. It is assumed herein that each section of the interface is provided with four sets of buffers. Since each set includes a control buffer similar to control buffer 74, clock outputs 88b, 88c and 88d are connected to the respective control buffer in each of these sets in each section of interface 42. Thus, it is seen that each control buffer output of decoder 82 is connected in common to four control buffers 74, each of these control buffers being included in a different respective section of interface 42. When the clock output is provided with a CONTROL BUFFER CLOCK signal, which is decoded from the two-bit address received from CPU 44, the corresponding control buffer 74 in each section of interface 42 is latched if, prior to the latching of the control buffer in a section, the pair of multiplexer drivers 76, 78 in that section is enabled and conditioned to receive data from CPU 44. This data is received by the multiplexer drivers, latched in control buffer 74 and then returned to the particular central recorder which is connected to the control buffer.

Decoder 84 is, for example, a 4-bit decoder adapted to decode the 4-bit address signal which is supplied thereto from CPU 44. Decoder 84 is provided with four sets of enable outputs 90a, 90b, 90c and 90d, each set being constituted by three respective leads, referred to herein as buffer enable outputs 92a, 92b and 92c. Each buffer enable output 92a . . . 92c of an enable output 90 is connected to a respective status buffer 68, operation buffer 70 and encoder buffer 72. More particularly, enable output 90a is connected to these buffers in one set of buffers of each section of interface 42. Enable output 90b is connected to these buffers in another set in each section of interface 42. Similarly, enable outputs 90c and 90d are connected to respective sets of such buffers in each section of the interface. Thus, when one of the buffer enable outputs 92a . . . 92c of one of the enable outputs 90a . . . 90d is provided with an ENABLE signal, such as a STATUS BUFFER ENABLE signal, an OPERATION BUFFER ENABLE signal or a TOUCH-TONE BUFFER ENABLE signal, one of the status, operation and encoder buffers, respectively, in a particular set in each section of interface 42 is enabled. For example, if the 4-bit address supplied to decoder 84 from CPU 44 results in a STATUS BUFFER ENABLE signal at buffer enable output 92b of enable output 90a, status buffer 68 in, for example, set #1 of each section of interface 42 is enabled. If the 4-bit address supplied to the decoder from the CPU results in, for example, the OPERATION BUFFER ENABLE signal at buffer enable output 92a of enable output 90b, operation buffer 70 in set #2 of each section of interface 42 is enabled. Thus, it is recognized that data is transmitted from a particular central recorder to CPU 44 if a status, operation or encoder buffer connected to that central recorder is enabled concurrently with the enabling of the pair of multiplexer drivers 76, 78 which are connected to those buffers. In this manner, a particular one of the sixteen central recorders can communicate with CPU 44.

In operation, address signals are supplied are supplied to decoders 80, 82 and 84 from CPU 44 in accordance with the programming of the CPU. These address signals are decoded by the respective decoders to supply the ENABLE signal to the pair of multiplexer drivers 76, 78 in each section of interface 42 in, for example, sequence. That is, multiplexer drivers 76, 78 in section #1 are enabled, followed by the enabling of the multiplexer drivers in section #2, and so on. Concurrently with the enabling of a pair of multiplexer drivers in a particular section, decoder 84 supplies the STATUS BUFFER ENABLE, OPERATION BUFFER ENABLE and TOUCH-TONE BUFFER ENABLE signals to status buffer 68, operation buffer 70 and encoder 72, respectively, in sequence and in each set of these buffers in all sections. Following the sequential enabling of the status, operation and encoder buffers, decoder 82 produces the CONTROL BUFFER CLOCK signal which, in turn, latches control buffer 74 in a particular set of all sections of interface 42. Of course, data is transmitted from only one section of the interface to CPU 44 and is returned to that section from the CPU, depending upon the particular pair of multiplexer drivers 76, 78 which is enabled.

When each of status, operation and encoder buffers 68, 70 and 72 is enabled, the data supplied thereto effectively is sampled, and this sampled data is transmitted to CPU 44 via the enabled pair of multiplexer drivers. The respective enable signals which are produced by decoders 80, 82 and 84 have a time duration determined by the clock signals which are supplied to such decoders. These clock signals are produced by the system clock of, for example, CPU 44, and exhibit a relatively narrow pulse width. Thus, the "sampling" times of the respective buffers likewise are relatively brief.

When a recorder is seized, the SEIZURE signal is supplied to status buffer 68. When this status buffer is enabled by the STATUS BUFFER ENABLE signal, produced by decoder 84, the respective signals which are supplied to the status buffer, i.e., the SEIZURE signal as well as the PRIVATE WIRE/PHONE signal are transmitted via multiplexer drivers 76, 78 to CPU 44. The particular address signals which result in the sampling of status buffer 68 and the enabling of multiplexing drivers 76, 78 are seen to identify the particular recorder from which the transmitted data has been derived. Thus, CPU 44 is provided with recorder-identity data in response to the reception of seizure data. Also, data representing the time of day is generated by the CPU from its real time clock, in response to the received seizure signal. When encoder buffer 72 is enabled by the TOUCH-TONE BUFFER ENABLE signal, the CPU is provided with data representing the type of recorder, as determined by the position of change-over switch 73. Hence, the CPU is apprised of whether this recorder is an endless-loop recorder or a multiple-cassette recorder.

Once CPU 44 is apprised of the seizure of this recorder, it may return data to multiplexer drivers 76, 78 which, in turn, are supplied to control buffer 74. When this control buffer is latched by the CONTROL BUFFER CLOCK signal, such data is returned to the central recorder. Typically, following the seizure of this recorder, CPU 44 returns the ID INTERVAL and ID TONE signals to the recorder. It is recalled that the ID TONE signal alerts the author to transmit Touch-Tone signals representing his identity and the type of message which he plans on dictating. This information is transmitted to CPU 44 during the predetermined interval which is established by the ID INTERVAL signal. This ID INTERVAL signal is terminated either when the CPU receives all of the necessary identifying data from the author, or at the completion of the predetermined time interval, whichever occurs first.

The Touch-Tone signals which are transmitted from a remote telephone are decoded by the coupler/interface (not shown) normally connected to the telephone line, and are supplied through encoder buffer 72 to CPU 44, while those signals which are transmitted from the private-wire dictate station to interface 42 are decoded, as will be described below with respect to FIG. 4. These decoded signals, which are in a conventional two-out-of-seven code, are also applied to CPU 44. Concurrently with the Touch-Tone signals which are transmitted to interface 42 from the private-wire dictate station, a TOUCH-TONE signal, representing that these identifying signals are being transmitted, is supplied to status buffer 68. This TOUCH-TONE SIGNAL occupies a particular position in the 8-bit output of status buffer 68 and, when the status buffer is enabled, the presence or absence of this TOUCH-TONE signal is represented and transmitted to CPU 44.

If the central recorder to which the status, operation, encoder and control buffers are connected is an endless-loop recorder, the CASSETTE CHANGE, OPTICAL STROBE and OPTICAL READ signals are not supplied to the status and operation buffers. Also, since CPU 44 is apprised of the fact that the central recorder is an endless loop recorder, the STROBE RESET signal is not returned to the central recorder by control buffer 74. As dictation proceeds, the CLUTCH and FARTHEST ADVANCE signals are applied to operation buffer 70, and when this operation buffer is enabled, the corresponding bits in the multi-bit signal produced by the operation buffer are transmitted to CPU 44 via multiplexer drivers 76, 78. The existence of these signals is used by the CPU to time, i.e., measure, the length of the message which is being dictated. If the recorder is designated by, for example, supervisory personnel, or by the specifications of the central dictation system, a "priority" recorder, the PRIORITY signal is applied to operation buffer 70, and the corresponding bit in the output signal produced by this operation buffer represents this PRIORITY signal.

At the completion of a dictated message, the central recorder is released by the dictate station, thus terminating the SEIZURE signal. This results in a change in the bit of the multi-bit signal produced by status buffer 68 and corresponding to the seizure signal. When the status buffer is enabled, and the multi-bit signal produced thereby is transmitted via multiplexer drivers 76, 78 to CPU 44, this end-of-dictation is detected. Also, data representing this time of completion is generated and displayed as part of the job record associated with this dictated message.

In the event that CPU 44 has not fully processed the data which is supplied thereto upon the release of the central recorder, the CPU will return the BUSY OUT signal to control buffer 74. This BUSY OUT signal, when applied to the recorder, simulates a "busy" condition which prevents the subsequent seizure of the recorder until the BUSY OUT signal terminates. This prevents additional data relating to the seizure of the recorder from being supplied to the CPU until the CPU has fully processed the data relating to the preceding dictated message.

If the recorder is a multiple-cassette recorder, the cassette upon which the previously dictated message has been recorded may be ejected therefrom, and the record/playback deck then will be loaded with a fresh cassette. During this loading operation, the CASSETTE CHANGE signal will be applied to status buffer 68, and the bit representing this signal will be included in the multi-bit signal of the status buffer which is transmitted to CPU 44. It is recalled that, as a fresh cassette is loaded onto the record/playback deck, the optically coded indicia on the cassette, which represents its identity, is read by the optical reader. When the timing mark is sensed, the OPTICAL STROBE signal is applied to operation buffer 70, and when the data mark is read, the OPTICAL READ signal is produced. The OPTICAL STROBE and OPTICAL READ signals are transmitted to CPU 44. The CPU returns the STROBE RESET signal to control buffer 74, this STROBE RESET signal being returned to the multiple-cassette recorder for resetting the timing strobe generator of the optical reader. This, in turn, enables the optical reader to read the next data mark in the optically coded indicia.

In the event that the author who has seized the multiple-cassette recorder wishes to dictate a "priority" message, the supervisor will supply keyboard-entered data to CPU 44, representing that a priority operation should be carried out. If the cassette which then is loaded on the record/playback deck has no previously recorded messages thereon, as determined by the CPU, the CPU returns the PRIORITY CONTROL signal via the data bus, through multiplexer drivers 76, 78, to control buffer 74, and thence to the multiple-cassette recorder. This PRIORITY CONTROL signal results in raising the elevator at the output store of the multiple-cassette recorder, thereby exposing the discharge chute to the cassette. This means that, following the dictation of a message, this cassette will be ejected from the record/playback deck and discharged from the recorder via the discharge chute for prompt transcription. However, if the CPU determines that one or more messages have been recorded on the cassette which then is loaded on the record/playback deck, the CPU returns the EJECT signal to control buffer 74, this EJECT signal being supplied to the multiple-cassette recorder to initiate an eject operation. Thus, the cassette which had been loaded on the record/playback deck is ejected therefrom, and a fresh cassette is loaded. The completion of a loading operation is represented by the termination of the CASSETTE CHANGE signal. When the CPU senses the termination of the CASSETTE CHANGE signal, it returns the PRIORITY SIGNAL to control buffer 74, and thence to the multiple cassette recorder; whereupon the elevator at the output store is raised, as discussed above.

Thus, it is seen that interface 42 serves as a multiplexing circuit to transmit data from each of the cassette recorders connected thereto to CPU 44; and to return data from the CPU to respective ones of the recorders. The particular recorder with which the CPU communicates is determined by the address signals supplied to decoders 80, 82 and 84.

Figure 4:
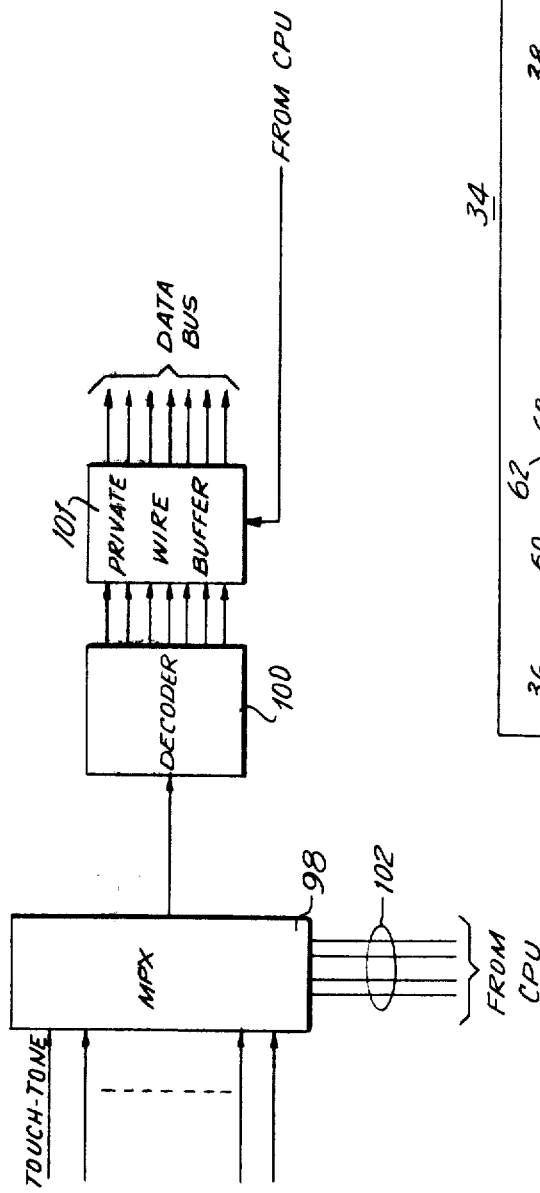
FIG. 4 is a block diagram of a tone decoder which is used with this invention.

Turning now to FIG. 4, there is illustrated a block diagram of the manner in which each Touch-Tone signal received from a private-wire dictate station is decoded to a two-out-of-seven code to be supplied to the data bus, and thence to CPU 44. This decoding apparatus includes an analog multiplexer 98 and a tone decoder 100, both being of conventional construction. Analog multiplexer 98 includes a plurality of input terminals, each being connected to receive the Touch-Tone identifying signals which are supplied from a private-wire dictate station that has seized a corresponding recorder. Thus, in the example discussed herein wherein the present invention is operable with sixteen central recorders, analog multiplexer 98 is provided with sixteen input terminals. A 4-bit control signal is supplied from CPU 44 to control inputs 102 of analog multiplexer 98. Depending upon the address of this 4-bit signal, the Touch-Tone signal which is applied to a corresponding input of the analog multiplexer is transmitted, or passed therethrough, to tone decoder 100.

The tone decoder is adapted to decode the Touch-Tone signal supplied thereto to a two-out-of-seven code. This 7-bit code, which represents the Touch-Tone identifying signal which then is supplied to analog multiplexer 98, is supplied to private wire buffer 101, and then to the data bus. It should be appreciated that the address signals which are supplied to control inputs 102 of analog multiplexer 98 by CPU 44 are associated with the same recorders whose signals are supplied to buffers 68 and 70 (FIG. 3), as then addressed by the CPU. Consequently, the Touch-Tone signal which is transmitted by a private-wire dictate station connected to the central recorder that then is in communication with the CPU will be decoded, and this decoded Touch-Tone signal also will be transmitted to the CPU.

Figure 5:
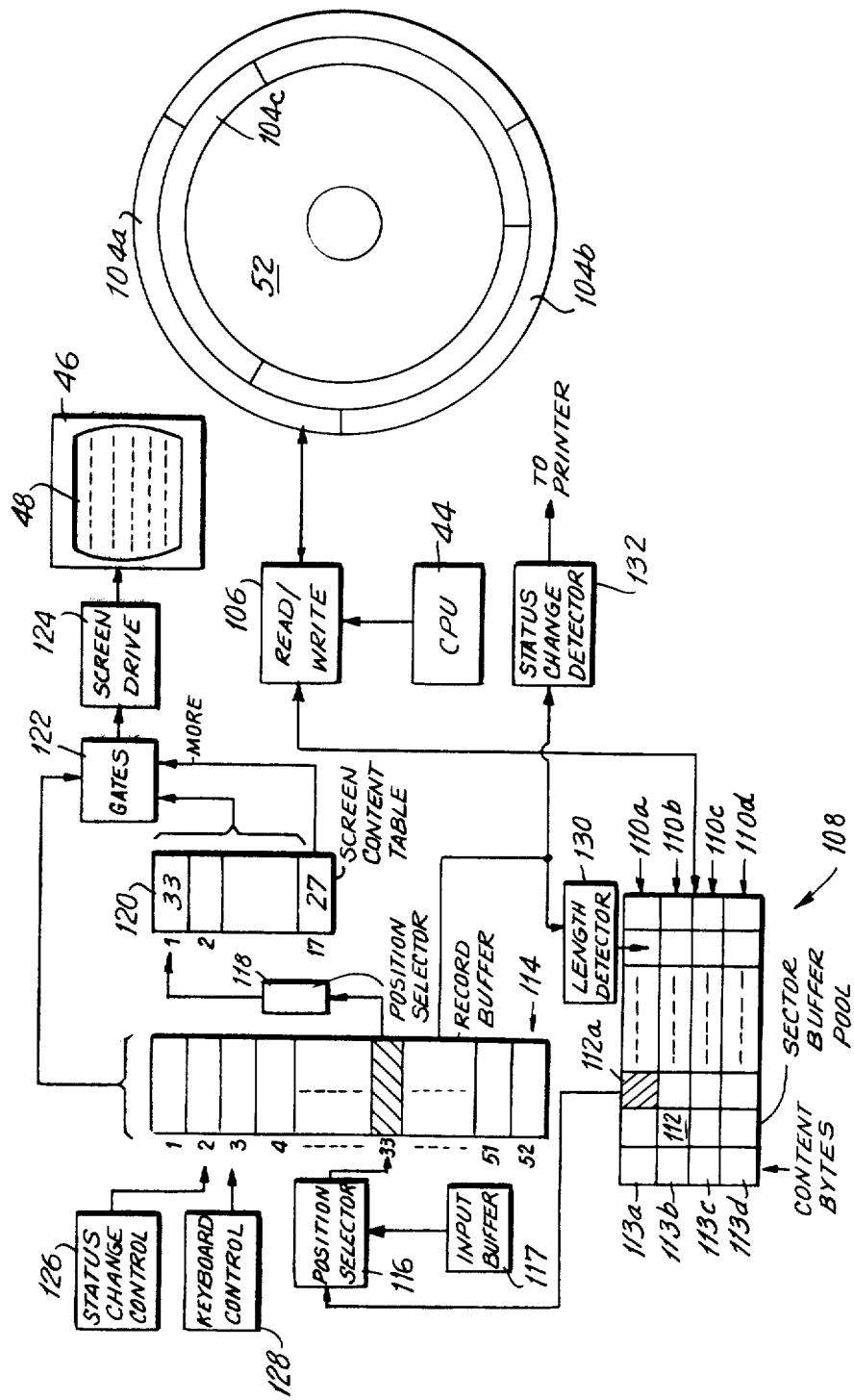
FIG. 5 is a block diagram representing the manner in which information is stored, processed and displayed in accordance with the present invention.

Referring now to FIG. 5, there is illustrated, as a partial block diagram, one embodiment wherein job records are stored and displayed. The functional blocks illustrated herein preferably are included within the microprocessor which is used to carry out the instant invention. Alternatively, each block may be constructed of discrete circuitry. For the purpose of the present discussion, it will be assumed that the functional blocks all are part of the programmed microprocessor; however such blocks will be referred to as circuits, such as control circuits, selector circuits, and the like. Magnetic disc 52 is divided into a plurality of sectors 104, three of which are designated as sectors 104a, 104b and 104c, each sector being adapted to store eight discrete job records. Since each job record contains the various parameters and information relating to a specific dictated message, it is appreciated that each sector 104 is adapted to store such parameters and information relating to eight individual messages. Preferably, the status of the messages whose job records are stored in a particular sector are all the same. Depending upon the number of job records which contain the same status data, a number of sectors may be provided for job records associated with messages of a given status. In that event, all of such sectors in which job records contain the same status may, cumulatively, be referred to as a storage location. Thus, it is appreciated that job records containing different statuses are stored in correspondingly different storage locations.

The embodiment shown in FIG. 5 also includes a read/write circuit 106, a sector buffer pool 108, a record buffer 114, a screen content table 120 and display device 46 having display screen 48. Read/write circuit 106 is coupled to storage disc 52 and is adapted to write job records into particular sectors, and to read job records therefrom. The read operation is a non-destructive readout operation wherein the job record is transferred from the disc, but is not destroyed. The read/write circuit 106 is coupled to CPU 44 and its read and write operations are controlled by the CPU in accordance with the programmed operation thereof. More particularly, and as will be described, CPU 44 directs read/write circuit 106 to a particular sector in disc 52 to read out the job records from that sector, and also to write in job records thereto. When a particular sector of disc 52 is accessed, all of the job records stored therein are read out. In the preferred embodiment of the present invention, piecemeal readout of job records is avoided.

Read/write circuit 106 is coupled to sector buffer pool 108. The sector buffer pool may comprise a random access memory, such as a section of the RAM normally provided with the microprocessor. Sector buffer pool 108 is adapted to store the job records contained in four separate sectors. Accordingly, the sector buffer pool is provided with four separate rows of storage locations, designated rows 110a, 110b, 110c and 110d. Each row is adapted to store the job records which are contained in a sector read from or written to disc 52. Thus, in the present embodiment, since eight separate job records, that is, job records associated with eight different messages, are stored in a sector, each row of storage location 110a . . . 110d is adapted to store eight job records. Each row of storage locations thus is provided with eight separate job record storage locations 112. In addition to the eight job record storage locations 112 in each row of storage locations 110a . . . 110d, each row of storage locations also is provided with a content byte storage location 113a . . . 113d, respectively. Each content byte storage location is adapted to store a content byte which, essentially, is an 8-bit character representing which storage locations 112 in a corresponding row 110a . . . 110d are filled with a job record and which storage locations are empty. As an example, if a job record is stored in a particular storage location of a row, the bit associated with that storage location is a binary "1". If a storage location is empty, that is, if a job record is not stored therein, the corresponding bit in the content byte is a binary "0". The content bytes stored in content byte storage locations 113a . . . 113d are used to determine which, if any, storage location in a row in sector buffer pool 108 is available to receive a job record. This means that if a sector is read from disc 52 to sector buffer pool 108, the content byte associated with that sector represents whether any storage locations in that sector are available to have a job record stored therein.

Whenever a sector is read from disc 52, it is transferred into an available row of sector buffer pool 108. If all rows are filled, the oldest sector which is stored in the sector buffer pool is "discarded", or erased, and the row which had been occupied by that sector now is occupied by the sector being read from disc 52. In addition, whenever a sector is written to disc 52, it is written from sector buffer pool 108. This will be described in greater detail below.

Record buffer 114 is coupled to sector buffer pool 108 by a position selector circuit 116. The record buffer is provided with a plurality of storage locations in which respective job records can be stored. Hence, the record buffer may comprise a random access memory, such as a section of the RAM normally provided with the microprocessor. For the purpose of the present discussion, it is assumed that record buffer 114 is provided with fifty-two separate storage locations. As will be described, all job records associated with messages having the in-dictation status are stored in record buffer 114. Such job records are not transferred to sector buffer pool 108 and written to disc 52 until such status is changed. Thus, since the present invention has been assumed to be operable with sixteen separate records, sixteen of the fifty-two storage locations of the record buffer can be used for storing such job records. Furthermore, and as will be described, display screen 48 is adapted to display up to a maximum of sixteen job records, each job record being displayed in a corresponding line. In the event that more than sixteen job records must be displayed in response to a particular inquiry relating to a selected parameter, it is preferred that record buffer 114 have a storage capacity sufficient to store sixteen job records plus another sixteen job records, for a total of thirty-two job records. The remaining four storage locations in record buffer 114 are adapted to store job records whose statuses may be changed, but such job records might not be displayed on display screen 48.

Position selector 116 is adapted to shift a job record from a particular storage location 112 in a row 110a . . . 10d of sector buffer pool 108 to an appropriate storage location in record buffer 114. The position selector also is coupled to an input buffer 117 to receive storage location commands from the input buffer directing the storage locations of the record buffer into which job records are to be inserted. For example, if a particular job record is to be displayed on display screen 48, that job record may be contained in a sector which is read from disc 52 to sector buffer pool 108. That job record, which then is stored in a particular storage location 112 in a selected row 110a . . . 10d of the sector buffer pool is shifted from that job record storage location into an available storage location in record buffer 114 by position selector 116. Also, in the event that a new job record is generated, for example, a job record which is generated in response to the seizure of a central recorder, that new job record is shifted from input buffer 117 into an appropriate storage location in record buffer 114 by position selector 116. It is appreciated that this new job record which is supplied to the input buffer is generated by CPU 44, as discussed above.

In the event that a job record which is stored in a particular storage location in record buffer 114 is to be written to disc 52, this job record first must be inserted into an available location in a sector. It is recalled that sectors containing job records are written to disc 52 from sector buffer pool 108. Hence, a job record which is to be written to the disc is inserted into an appropriate job record storage location 112 in a row 110a . . . 110d. In some instances, the length of the dictated message with which the job record that is inserted into a job record storage location must be greater than some predetermined minimum length. To this effect, a message length detector 130 is provided for sensing whether this minimimum length criteria is exceeded. If not, the job record is not permitted to be inserted into the job record storage location. As an example, if the status of a message changes from in-dictation to hang-up (or to assigned-for-transcription), an available sector in disc 52 in which this job record can be stored is read out to sector buffer pool 108. The available job record storage location 112 in the row 110 in which that sector is stored then is adapted to receive the job record having this changed status. However, if the length of the dictated message, as determined by message length detector 130, is less than the predetermined minimum length, the job record associated with this message, and stored in a storage location in record buffer 114, is not shifted into the job record storage location 112 in the appropriate row 110 of sector buffer pool 108. On the other hand, if the length of this dictated message exceeds the predetermined minimum length, the job record associated with this message, and containing the changed status, is shifted from its storage location in record buffer 114 into job record storage location 112 in the row 110 of sector buffer pool 108 in which the appropriate sector is stored.

Whenever the status data in a job record is changed, this change in status is carried out in record buffer 114. Typically, when a change in status is detected, as by the release of a central recorder, or by the keyboard entry of status data, the appropriate sector which contains the job record prior to this status change is read from disc 52 to sector buffer pool 108. The appropriate job record then is shifted into an available storage location in record buffer 114 wherein the status data is changed. Then, the sector in which the job record containing the changed status data is to be stored is read from disc 52 to sector buffer pool 108 wherein the sector is stored in a selected row 110a . . . 110d. The particular job record storage location 112 in that row which is available to store the job record containing the changed status, as determined by the content byte associated with that row, then is supplied with the job record from record buffer 114. Thereafter, the sector, with this job record inserted therein, is written to disc 52 by read/write circuit 106. A status change detector 132 is coupled to the output of record buffer 114 to detect when a job record having a changed status is shifted into sector buffer pool 108. When such a change in status data is detected, the job record containing that changed status is supplied by status change detector 132 to printer 56. Hence, the job record associated with a message whose status is changed is printed.

As mentioned above, display screen 48, in the present example, has a capacity sufficient to display a maximum of sixteen lines of information, each line of information corresponding to a job record. Screen content table 120 is adapted to store an index of record buffer storage locations representing those job records which are to be displayed on the display screen. For example, during a normal display, the job records associated with up to five messages that have been assigned for transcription, plus the job records associated with up to five messages that are ready for transcription, plus the job records associated with up to five messages that are in dictation are displayed. Typically, each of the job records associated with messages that have been assigned for transcription or that are ready for transcription are read from disc 52 and are supplied, via sector buffer pool 108, and position selector 116, into respective locations of record buffer 114. The identities of these locations are stored in screen content table 120, together with the identities of the locations in which are stored the job records associated with the five latest messages which are in dictation, the latter being stored in up to sixteen storage locations in record buffer 114. The record buffer index locations are supplied to screen content table 120 by screen content table position selector 118. Although the job records which are stored in record buffer 114 may be stored in random locations, screen content table position selector 118 selects the index of the proper storage location to be stored in the appropriate location in screen content table 120. For example, the first location in screen content table 120 may be provided with the index of the storage location in record buffer 114 in which the job record associated with the oldest message that has been assigned for transcription is stored. The screen content table position selector may store, in the second position of screen content table 120, the index of the storage location of record buffer 114 in which the job record associated with the next oldest message that has been assigned for transcription is stored. Screen content table position selector 118 functions in an analogous manner to supply the indices of the storage locations in record buffer 114 in which the job records associated with the five oldest messages that are ready for transcription are stored, as well as the indices in which the job records associated with the five newest messages in dictation are stored. Thus, screen content table 120 is provided, in order, with the indices of the storage locations of record buffer 114 in which the desired job records are stored.

Gate circuits 122 is adapted to supply to a screen drive 124 the job records which are to be displayed by display screen 48 in the order of such display. It is recognized that the order of display is represented by the indices which are stored in locations 1–17 of screen content table 120. Depending upon the index of record buffer 114 which is stored in the first location of screen content table 120, gate circuit 122 supplies screen drive 124 with the job record that is stored in the indexed storage location of record buffer 114. Screen drive 124 then drives display screen 48 to display this job record. Similarly, gate circuit 122 is responsive to the index stored in location #2 of screen content table 120 to supply the job record which is stored in the indexed storage location of record buffer 114 to screen drive 124. This, in turn, results in the display on line 2 of this job record. In similar manner, gate circuit 122 is responsive to the indices stored in locations #3-16, respectively, of screen content table 120 to supply the job records which are stored in these indexed storage locations in record buffer 114 to screen drive 124. In the event that an index of record buffer 114 is stored in location #17 of the screen content table, gate circuit 122 responds thereto to supply the predetermined character "more" to screen drive 124. This character is displayed on display screen 48 to apprise the operator that, in addition to the sixteen lines of displayed job records, additional job records are available for display, which additional job records satisfy the particular parameter or parameters which have been used to obtain the presently displayed job records.

Status change control circuit 126 and keyboard control circuit 128 are shown as being coupled to record buffer 114. The purpose of status change control circuit 126 is to supply changed status data automatically to the record buffer in the event that a message whose associated job record is stored in the record buffer undergoes a change in status. For example, if a job record associated with a message which is in dictation is stored in record buffer 114, when the status of this message is changed to, for example, the hang-up status, this change is detected by status change control circuit 126 and serves to change the status data contained in this job record from the in-dictation status to the hang-up status. Similarly, if a message whose job record is stored in record buffer 114 is changed from the in-dictation status to a ready-for-transcription status, status change control circuit 126 effects a corresponding change in the status data of this job record. Keyboard control circuit 128 performs a similar function in the event that the change in status data is entered by way of keyboard 50. For example, if the status of a message is changed from ready-for-transcription to assigned-for-transcription, keyboard control circuit 128 is responsive to this change in status data to initiate a read operation, whereby the job sector containing the appropriate job record is read from disc 52 to sector buffer pool 108, the job record then is transferred to record buffer 114, and the status data is changed from ready-for-transcription to assigned-for-transcription.

The manner in which the embodiment of FIG. 5 operates now will be described with reference to various different types of operations. Let it be assumed, initially, that a central recorder is seized. As discussed hereinabove, CPU 44 responds to the seizure of a central recorder to generate initial data which is included in a job record, for example, for identify of the seized recorder, the time at which the recorder is seized, the in-dictation status data and, if the author transmits Touch-Tone identifying signals, the identity of the author and the type of message which he plans on dictating. This job record data is stored in an available location in record buffer 114. At the completion of dictation, that is, when the central recorder is released, CPU 44 generates message length data as well as time-of-completion data. This additional data also is stored with the job record in record buffer 114. If the message had been dictated on an endless loop recorder, status change control circuit 126 responds to the completion of dictation to change the status data contained in the job record associated with this message from the in-dictation status to the assigned-for-transcription status. Alternatively, if the message had been dictated for a multiple-cassette recorder, status change control 126 responds to the completion of dictation either to change the status contained in the job record associated with this message from in-dictation status to hang-up status, in the event that the cassette is not ejected; or to change the status from in-dictation status to ready-for-transcription in the event that the cassette is ejected. It is recalled that the ejection of the cassette is represented by the CASSETTE CHANGE signal.

The job record associated with this message containing the changed status data is stored in a particular location in record buffer 114. Since the status contained in this job record has changed, status change detector 132 supplied this job record information to printer 56 whereat the job record is printed. Furthermore, in response to the new status data which now is contained in the job record, read/write circuit 106 retrieves a sector 104 from disc 52 in which job records of like status are stored, which sector contains an available location for the storage of this new job record. Then, this sector, containing the available storage space, is read from disc 52 to sector buffer pool 108. Let it be assumed that this sector is stored in row 110b of the sector buffer pool. The content byte in content byte storage location 113b is examined to determine which job record storage location 112 in row 110b is available for the storage of the job record which still is in record buffer 114. When this available storage location is ascertained, the job record is shifted from the record buffer to this available storage location in row 110b of sector buffer pool 108. Of course, the bit in the content byte which is associated with this storage location is changed from, for example, a binary "0" to a binary "1" to represent that this location no longer is available. Then, the sector which is stored in row 110b, and which now includes the added job record, is written by read/write circuit 106 back into disc 52. This writing from the sector buffer pool is accomplished with non-destructive readout. That is, although a sector is returned from the sector buffer pool back into disc 52, the job records which had been stored in the sector buffer pool are not erased therefrom. More particularly, such job records are not erased until it is necessary to utilize the row in the sector buffer pool to store other sectors.

Let it be assumed that a message is being dictated on a cassette in a multiple-cassette recorder, and that this cassette has previously dictated messages stored thereon. At the end of dictation, CPU 44 responds to the termination of the SEIZURE signal and to the CASSETTE CHANGE signal to scan all sectors in which job records associated with messages containing the hang-up status are stored. The sectors are additionally scanned to locate the one sector or sectors in which job records associated with messages which had been dictated onto the cassette which now is ejected from the multiple-cassette recorder are stored. These sector(s) are read, individually, from disc 52 to sector buffer pool 108. The job record containing the identity of the cassette which has been ejected is shifted from the sector buffer pool to an available location in record buffer 114. Status change control circuit 126 operates to change the status data of this job record from the hang-up status to the ready-for-transcription status. Then, an available sector in which job records containing the ready-for-transcription status are stored is retrieved from disc 52. This available sector is stored in a row of sector buffer pool 108. The location in this sector which is adapted to store a job record is determined by the content byte associated with this row. The job record which now contains the changed status data is shifted from record buffer 114 to this available location in sector buffer pool 108. Then, the sector is written from sector buffer pool 108 back to disc 52.

The next job record containing the hang-up status data and the same cassette identity data then must be read into sector buffer pool 108. It is recalled that a sector previously had been read from disc 52 into the sector buffer pool. Before accessing disc 52 for another sector, this previously stored sector, which remains temporarily in the sector buffer pool, is examined to determine whether a job record containing the hang-up status data and the appropriate cassette-identity data is stored therein. If so, this job record is shifted to record buffer 114, and the status data is changed in the manner described above. If the appropriate job record is not stored in sector buffer pool 108, then disc 52 must be accessed to retrieve the appropriate sector containing this job record. This sector then is read from the disc to sector buffer pool 108 as described previously.

In the foregoing manner, the job records associated with all messages which had been dictated onto the cassette which now is ejected undergo status change operations. That is, the status data in each such job record is changed from the hang-up status to the ready-for-transcription status. Once the status change has been made, the job record then is inserted into an available location in a sector which is used to store job records associated with messages of like status. Such sectors are read from disc 52 to sector buffer pool 108, and the job record containing the changed status is inserted into this sector to be written back into disc 52. As was the case when a job record was shifted from a sector to record buffer 114, prior to accessing disc 52 for a sector in which the job record containing the changed status data is to be stored, sector buffer pool 108 first is examined. If an available sector is found in the sector buffer pool, the job record containing the changed status data is inserted therein. If no available sector is found in sector buffer pool 108, then disc 52 must be accessed to read an appropriate sector from the disc to the sector buffer pool. Thus, and consistent with the present example, if, for example, job records associated with four messages are to undergo status change operations from the hang-up status to the ready-for-transcription status, and if a sector having available locations for storing such job records is found, that sector is read from disc 52 into sector buffer pool 108. Then, as each job record undergoes a status change operation, that job record, containing the changed status data, is inserted into an available location in this sector which remains stored temporarily in this sector buffer pool.

While the foregoing has described a status change operation from the hang-up status to the ready-for-transcription status, it may be appreciated that the last-dictated message on the cassette prior to the ejection thereof undergoes a change in status from in-dictation to ready-for-transcription. The job record associated with this last message is stored in record buffer 114. It is recalled that all job records that are associated with messages which are in dictation are stored in the record buffer. Hence, when the cassette is ejected, the status data contained in this job record merely is changed from the in-dictation status to the ready-for-transcription status. Sector buffer pool 108 first is examined to determine whether a sector is stored therein in which this job record can be stored. If so, the job record merely is inserted into the available location in this sector in sector buffer pool 108. If not, the available sector is read from disc 52 into the sector buffer pool; and then this job record is inserted thereinto. Once the job record is inserted into the appropriate sector, the sector is written from sector buffer pool 108 to disc 52. It is recalled that this write operation is a non-destructive operation such that this sector remains stored temporarily in sector buffer pool 108. Hence, if a job record containing the ready-for-transcription data is to be shifted into record buffer 114, this sector, which has been stored temporarily in sector buffer pool 108, first is examined to ascertain whether the desired job record is stored therein. Similarly, if a job record is stored in record buffer 114 containing the ready-for-transcription status data, sector buffer pool 108 first is examined to ascertain whether a sector available for the storage of that job record is present therein. If so, the job record merely is inserted into that sector. If not, disc 52 is accessed to read the appropriate sector therefrom to sector buffer pool 108; and then the job record is inserted into this sector in the sector buffer pool. It may be appreciated, therefore, that the purpose of temporarily storing sectors in sector buffer pool 108 is to minimize, if possible, the accessing of disc 52.

Let it now be assumed that a cassette which contains a number of dictated messages has been assigned to a particular transcriptionist for the transcription of such messages. The supervisor will enter, by way of keyboard 50, the identity of the transcriptionist, and the fact that the status of all messages on this cassette is changed from ready-for-transcription status to assigned-for-transcription status. Keyboard control circuit 128 responds to this data to operate CPU 44, whereupon sector buffer pool 108 is examined to ascertain whether any sectors are stored therein in which job records containing the ready-for-transcription status data are stored. If so, each such job record is examined to determine whether the cassette-identity is the same as the identity of the cassette which now has been assigned for transcription. In the event that such job records are not found, the sectors of disc 52 in which job records containing the ready-for-transcription data are retrieved. Such sectors are examined to determine whether any job records stored therein contain the cassette-identity which is the same as the identity of the cassette which had been assigned for transcription. If so, the entire sector is read from disc 52 to sector buffer pool 108. Then, the job records associated with the messages which are dictated on this cassette are transferred, one-at-a-time, from sector buffer pool 108 to record buffer 114. A job record which is transferred to the record buffer pool has its status data changed from ready-for-transcription status to assigned-for-transcription status. After this change in status, sector buffer pool 108 is scanned to ascertain whether it has stored therein a sector associated with the assigned-for-transcription status and, if so, whether an available location is present in that sector. If so, the job record containing the changed status data is stored therein. If not, an available sector associated with the assigned-for-transcription status is read from disc 52 to sector buffer pool 108; and then this job record is stored in that sector. The foregoing operation continues, viz. reading a sector from disc 52 in which the appropriate job record containing the ready-for-transcription status data and the cassette-identity data is stored, transferring this sector to sector buffer pool 108, shifting the job record from the sector buffer pool to record buffer 114, changing the ready-for-transcription status data to assigned-for-transcription status data, reading an available assigned-for-transcription sector from disc 52 to sector buffer pool 108, inserting the job record containing the changed assigned-to-transcription status data into the available location of the sector stored in sector buffer pool 108 from record buffer 114, and writing this sector, containing the inserted job record, into disc 52, until all of the job records associated with messages on the cassette which has been assigned for transcription are so modified.

A similar operation is carried out when transcription of the cassette is completed. At that time, the supervisor enters, by way of keyboard 50, the fact that this cassette has been transcribed, together with the time at which transcription has been completed. Then, the job records associated with such transcribed messages are read from disc 52 to sector buffer pool 108, and thence to record buffer 114 whereat their status data is changed, and whereat the time-of-completion of transcription data is generated and added to the job record, and then an available completed-transcription sector is read from disc 52 to sector buffer pool 108, the job record is inserted into this sector, and the sector, containing the inserted job record, is returned to disc 52. In the interest of brevity, a further detailed explanation is not provided. Of course, as before, before a sector actually is read from disc 52, sector buffer pool 108 is examined to determine whether the appropriate sector is stored therein.

. The manner in which the embodiment illustrated in FIG. 5 operates to display job records now will be described. Initially, let it be assumed that a so-called normal, or standard, display is selected. In this normal display, display screen 48 displays job records associated with up to five messages which have the assigned-for-transcription status, job records associated with up to five messages which have the ready-for-transcription status, and job records associated with up to five messages which have the in-dictation status. If less than five messages having a respective status is stored, then, of course, display screen 48 will display less than five job records. It is recalled that the job records associated with all messages which are in dictation are stored in record buffer 114. The job records may be stored at random locations in the record buffer; and the record buffer indices in which the five newest job records are stored are transferred by position selector 118 to screen content table 120. Specifically, the job records associated with messages which are in dictation are displayed on the bottom five lines of display screen 48, that is, lines 13, 14, 15, 16 and 17. Accordingly, these indices are stored in locations #13, 14, 15, 16 and 17 of the screen content table. More particularly, the job record associated with the newest message which is in dictation is stored in location #17, the job record associated with the next older message in dictation is stored in location #16, and so on.

In accordance with the normal display, CPU 44 controls read/write circuit 106 to read the sectors from disc 52 in which job records associated with messages which are ready-for-transcription are stored. The sectors in which such job records are stored are identified, as will be described below, and each such identified sector is examined to determine whether it contains a job record associated with the oldest message which is ready-for-transcription. Once this sector is found, it is read from the disc to sector buffer pool 108. Then, the job record associated with the oldest message which is ready-for-transcription is shifted from the appropriate job record storage location 112 to an available position in record buffer 114 by position selector 116. It is preferable that job records are stored in a sector in chronological order. That is, in the sector which stores job records associated with messages which are ready-for-transcription, the job record associated with the oldest message will be stored in one location of that sector, the job record associated with the next oldest message will be stored in the next location, and so on. If the storage capacity of a sector is filled, then the next sector which is used for storing job records associated with messages that are ready-for-transcription likewise will be occupied with such job records in chronological order. Therefore, in accordance with the normal display operation, the sector containing job records associated with messages which are ready-for-transcription which has been read from disc 52 to sector buffer pool 108 is the sector in which the job records associated with the oldest messages are stored. After the job record associated with the oldest of these messages has been shifted from the sector buffer pool to record buffer 114, the job record associated with the next oldest message is shifted into the record buffer, and so on, until the job records associated with the five oldest messages which are ready-for-transcription have been shifted from sector buffer pool 108 to locations in record buffer 114. Position selector 118 then shifts the index of record buffer 114 in which the job record associated with the oldest message which is ready-for-transcription is stored into location #7 of screen content table 120. Then, the index of the record buffer in which the job record associated with the next oldest message which is ready-for-transcription is stored is shifted into location #8 of the screen content table. This operation continues such that locations #7, 8, 9, 10 and 11 store the indices of record buffer 114 in which the job records associated with the five oldest messages which are ready-for-transcription are stored.

CPU 44 also controls read/write circuit 106 to scan disc 52 for the sector in which job records associated with the oldest messages which have been assigned-for-transcription are stored. Once this sector is found, it is read from the disc to sector buffer pool 108. Then, in the manner discussed above with respect to job records associated with messages which are ready-for-transcription, the job records associated with the five oldest messages which have been assigned-for-transcription are shifted, in chronological sequence, from respective job record storage locations 112 of the sector buffer pool into available storage locations of record buffer 114 by position selector 116. Then, the indices of the storage locations of the record buffer in which these job records associated with messages which have been assigned-for-transcription are stored are shifted, by position selector 118, into locations #1, 2, 3, 4 and 5 of screen content table 120. The record buffer index which represents the storage location in the second buffer in which is stored the job record associated with the oldest message which has been assigned-for-transcription is stored in location #1 of screen content table 120. The indices of the storage locations of the record buffer in which the job records associated with the next older messages which have been assigned-for-transcription are stored are shifted into storage locations #2, 3, 4 and 5.

As a further explanatory example, let it be assumed that the sector in which the job records which are associated with the oldest messages which had been assigned-for-transcription is stored is read from disc 52 to sector buffer pool 108, and this sector is stored in row 110*a*. Let it be further assumed that, as determined by the content byte in content byte storage location 113*a*, that job record storage location 112*a* is the first job record storage location in row 110*a* in which a job record is stored. This job record is associated with the oldest message which has been assigned-for-transcription. Accordingly, position selector 116 shifts this job record from job record storage location 112*a* into an available storage location in record buffer 114, such as storage location #33. Screen content table position selector 118, in turn, loads record buffer index #33 into location #1 of screen content table 120. Then, the next job record stored in row 110*a* of sector buffer pool 108 is shifted into an available location of record buffer 114 by position selector 116, and the record buffer index associated with this job record is loaded into location #2 of screen content table 120. This operation is repeated until five job records which are associated with messages that have been assigned-for-transcription are shifted into the record buffer, and the record buffer indices that indentify the storage locations in which such job records are stored are loaded into locations #1-5 of the screen content table.

From the foregoing description, it is appreciated that the screen content table has stored therein the record buffer indices of those job records which are to be displayed on display screen 48. Furthermore, such record buffer indices are stored in particular locations of the screen content table which correspond to the specific lines in which such job records are to be displayed by the display screen. Gate circuit 122 then gates the respective job records from record buffer 114 in accordance with the record buffer indices which are stored in screen content table 120. Thus, and in accordance with the example assumed herein, the job record stored in storage location #33 of record buffer 114 is gated by gate circuit 122 to screen drive 124 for display on line #1 of display screen 48. The job record which is stored in the storage location of record buffer 114 corresponding to the record buffer index which is stored in location #2 of screen content table 120 is gated by gate circuit 122 to screen drive 124 for display on line #2 of the display screen. Gate circuit 122 continues to operate in this manner so that the appropriate job records which are stored in record buffer 114 are displayed.

Let it now be assumed that the status of a message whose associated job record is displayed on display screen 48 is changed. For example, let it be assumed that a message which has been assigned-for-transcription is fully transcribed. As a consequence thereof, the status of this message changes from assigned-for-transcription to completed transcription. It is further assumed that the job record associated with this message is stored in location #33 of record buffer 114 and, therefore, the information contained in this job record had been displayed on the first line of the display screen. It is recalled that status data relating to this type of change in status is entered by way of keyboard 50. Keyboard control 128 thus changes the status data in the job record stored in storage location #33 of record buffer 114 from the assigned-for-transcription status data to the completed transcription status data. With this change in the status data of the job record stored in location #33, this job record no longer is to be displayed. Consequently, the record buffer index which had been stored in location #1 of screen content table 120 is erased therefrom. The record buffer indices which had been stored in locations #2-5 of the screen content table all are shifted upward by one location, i.e., these record buffer indices are "bubbled-up". This means that the job records which are displayed on lines 2-5 of display screen 48 are similarly "bubbled-up" and now are displayed on lines 1-4. This leaves an available location, i.e., location #5, in screen content table 120 to receive a record buffer index identifying the storage location in record buffer 114 in which a further job record associated with another message that has been assigned-for-transcription can be stored. Sector buffer pool 108 is examined to determined if a sector remains stored therein in which the job record associated with the next oldest message which had been assigned-for-transcription is found. If so, this job record is shifted into an available location in record buffer 114, and the record buffer index which identifies the location in which this job record is stored is loaded into, for example, location #5 of screen content table 120. Gate circuit 122 thus gates this new job record to screen drive 124, whereby this job record is displayed on line #5 of display screen 48. It is appreciated that, if the sector containing the appropriate job record associated with the next oldest message which had been assigned-for-transcription is not stored in sector buffer pool 108, disc 52 is accessed for this sector, and the sector then is read from the disc to the sector buffer pool, in the manner discussed above.

Returning now to the job record in record buffer 114 whose status data had been changed from assigned-for-transcription to completed transcription, sector buffer pool 108 is examined to determine if a sector is stored therein for receiving this job record. Typically, such a sector would contain job records which are associated with the newest messages that had been fully transcribed. If the appropriate sector is not stored in the sector buffer pool, disc 52 is accessed; and the appropriate sector is read therefrom into the sector buffer pool. For example, if this sector is read into row 110*d*, and if a particular job record storage location 112 in that row is available to receive this job record, as represented by the state of the bit associated therewith, in the content byte which is stored in content byte storage location 113*d*, then the job record is shifted from record buffer 114 into this job record storage location. The state of the associated bit in the content byte is changed to represent that this job record storage location now is occupied. Then, the sector stored in row 110*d* of sector buffer pool 108 is written to disc 52, whereby this job record having its changed status data is stored on the disc.

In addition to the foregoing, the sector which had contained the job record associated with the message which had been assigned-for-transcription must be modified to the extent that this job record is effectively erased therefrom. Sector buffer pool 108 first is examined to determined if this sector is stored therein. If not, the sector must be retrieved from disc 52. Let is be assumed that this sector is stored in row 110*a* of the sector buffer pool, either because this sector remains in this row from its previous retrieval from disc 52 or because this sector now is retrieved from the disc. In either event, let it be further assumed that this job record, which had been stored in storage location #33 of record buffer 114, also had been stored in job record storage location 112*a* of row 110*a*. The bit associated with job record storage location 112*a* in the content byte stored in content byte storage location 113*a* is changed from, for example, a binary "1" to a binary "0". This represents that job record storage location 112a now is available for storing a subsequent job record therein. The content byte corresponding to this sector, that is, to the sector stored in row 110a, represents which of the job record storage locations are occupied and which are "free". In accordance with the preferred operation, since job records are stored in chronological order in a particular sector, even though some job record storage locations in that sector may become free, or available, a job record that is not in the proper chronological order is not stored therein. It is, therefore, possible that a sector may be occupied by only a single job record. Of course, this fact is represented by the content byte that is associated with that sector.

The sector stored in row 110a, as now modified by the effective "erasure" of the job record from job record storage location 112a, is written to disc 52. Hence, the job record data stored on the disc always is updated. Furthermore, since the foregoing operation has been carried out in connection with the change in the status of a particular job record, this change in status is detected by status change detector 132, and the modified job record is printed by printer 56.

It may be seen that, whenever the status of a message is changed, regardless of whether the job record associated with that message is displayed on display screen 48, the foregoing operation relating to a change in status is carried out. Changes in the status data are made in record buffer 114. The job record whose status data is to be changed is shifted from sector buffer pool 108 to an available storage location in record buffer 114. Then, with the modification in the job record completed, the new sector in which this job record is to be stored is read from disc 52 to sector buffer pool 108, and the modified job record is inserted into this sector. Then, the sector containing the modified job record is written to disc 52. Since a sector stored in a particular row of the sector buffer pool remains therein until it is "overwritten" by a new sector read from disc 52, it is possible that, in some instances, the sector from which a job record is to be shifted to the record buffer or which is to receive a job record from the record buffer already is stored in the sector buffer pool and need not be transferred thereto from the disc. As mentioned above, this conserves the amount of access of disc 52 which is needed.

The operation of a so-called inquiry display now will be explained. In one embodiment of the present invention, each job record contains the following data, referred to herein as respective parameters: Author identification, identification of the type of message, identification of the cassette on which the message is recorded, identification of the recorder which was used to record the message, message length, identification of the transcriptionist assigned to transcribe the message, the status of the message, the date and time at which a message was dictated, or at which the dictation was completed, the date and time at which the message was assigned for transcription and the date and time at which the transcription was completed. Job records associated with any one or more of these parameters may be selected and displayed on display screen 48. Let it be assumed that a supervisor wishes to display job records which are associated with all messages that have been dictated by a particular author. These job records will be displayed in chronological order. That is, all messages which had been dictated by that author and which had been fully transcribed will be displayed, in order, from the oldest to the newest; followed by job records associated with all messages which had been dictated by this author and which had been assigned for transcription, in order, from the oldest such message to the newest; followed by job records associated with all messages dictated by this author which are ready for transcription, in order, from the oldest to the newest; followed by job records associated with all messages which had been dictated by this author onto a cassette which had not yet been ejected from a multiple-cassette recorder. In response to this inquiry, which is entered by way of keyboard 50, CPU 44 controls read/write circuit 106 to access disc 52 to ascertain the sectors which contain job records associated with messages that have been fully transcribed. The sector containing job records which are associated with the oldest of these messages is examined to determine whether any job record therein contains the identification of this author. If so, that sector is read from disc 52 to sector buffer pool 108, and the job record in question is shifted from the sector buffer pool to an available storage location in record buffer 114. The record buffer index identifying the storage location in the record buffer in which this job record is stored is loaded into location #1 of screen content table 120. Then, the sector which is stored in the sector buffer pool is examined to determine if it contains the next job record having the identification of this author. If so, that job record is shifted into an available storage location in record buffer 114, and the index of this storage location is loaded into location #2 of screen content table 120. If the sector stored in sector buffer pool 108 does not contain this next job record, then the next sector in disc 52 containing the job record in question is read therefrom and stored in another row in the sector buffer pool. This operation continues until up to seventeen storage locations in record buffer 114 contain job records which include the identification of this author. It is recalled that display screen 48 is adapted to display sixteen lines of information, i.e., sixteen separate job records. It is assumed that a full display screen, that is, a display of sixteen lines of information, corresponds to a "page".

Screen content table 120 is provided with seventeen locations, even though only the first sixteen locations are used to gate job records to screen drive 124 for display on the display screen. If a record buffer index is stored in location #17 of the screen content table, gate circuit 122 responds to this index to energize screen drive 124 to display the term "more" at the bottom of the page of information which is displayed on display screen 48. This apprises the supervisor that additional records are stored which satisfy the selected parameters. In the example assumed herein, if one page of job records is displayed, and if the expression "more" is displayed, the supervisor is apprised that additional job records which contain the identification of this author are stored. If a "page forward" key is operated, the record buffer indices which identify the storage locations in the record buffer in which the next sixteen job records are stored are shifted into locations #1-16 of screen content table 120. Gate circuit 122 responds to these record buffer indices to gate the corresponding job records to screen drive 124, whereupon these job records are displayed.

Let it be assumed that, to satisfy the inquiry as to all job records associated with messages which had been dictated by this particular author, more than thirty-two job records have been found. Hence, in addition to the thirty-two job records which are stored in record buffer 114, a thirty-third job record also is stored therein. Thus, when the second page of information is displayed on display screen 48, the record buffer index identifies the storage location in the record buffer in which this thirty-third job record is stored and is loaded into location #17 of screen content table 120. As before, the presence of a record buffer index in location #17 of the screen content table results in the display of the expression "more" at the bottom of the displayed page. If the supervisor now operates the page forward key once again, disc 52 is accessed to retrieve additional sectors which contain job records that satisfy the inquired parameter. These job records are shifted from sector buffer pool 108 to those storage locations in record buffer 114 in which the first sixteen job records have been stored. That is, these new job records replace the first sixteen job records in the record buffer. Then, the record buffer indices which identify the storage locations in the record buffer in which these next jobs are stored are loaded into the first sixteen locations of screen content table 120. Hence, the next page of job records is displayed on display screen 48. Since two pages of job records remain stored in record buffer 114, the supervisor may return to the immediately preceding page of displayed information. If still further job records are present which would satisfy the inquired parameter, location #17 of screen content table 120 stores a record buffer index which identifies the storage location in record buffer 114 in which a further job record is stored. The presence of the record buffer index in location #17 of the screen content table results in the display of the expression "more" at the bottom of the displayed page on display screen 48. Accordingly, if the supervisor wishes to display still further job records, the page forward key is activated and disc 52 once again is accessed to retrieve additional sectors which contain the job records that satisfy the inquired parameter. As before, as a sector is read from disc 52 to sector buffer pool 108, the job record which satisfies the inquired parameter is shifted from the sector buffer pool to a location in record buffer 114 which had been occupied by a previous job record. This operation continues until the last job record is found, or until the operator no longer wishes to advance to the next page of displayed information.

While the foregoing has described the manner in which job records which satisfy a particular parameter are retrieved and displayed, it should be readily appreciated that more than one parameter may be inquired. For example, rather than displaying all job records which are associated with messages that had been dictated by a particular author, the inquiry may be further limited by seeking only those job records which had been dictated and which had been fully transcribed, or which are ready for transcription, or which had been dictated prior to a particular time, or which exceed a certain length, and so on. By inquiring as to multiple parameters, it is appreciated that the number of job records which satisfy such parameters is reduced. By selecting appropriate parameters for the display of job records, the status and whereabouts of desired messages can be readily ascertained and displayed.

Even while information is displayed in response to an inquiry, changes in the status data of job records can be implemented in the manner discussed previously. That is, since a maximum of thirty-three storage locations of record buffer 114 can be occupied by job records which satisfy a particular inquiry, and since a maximum of sixteen storage locations in the record buffer can be occupied by job records associated with messages that are in dictation, three storage locations remain to process job records in which the status data contained therein should be changed.

In the interest of brevity, the operation of the embodiment illustrated in FIG. 5 in response to an inquiry based upon different parameters of a job record will not be described. It is sufficient to note that such an inquired display is carried out in the same manner as that discussed above with respect to the display of job records associated with messages that have been dictated by a particular author.

Although not shown in FIG. 5, read/write circuit 106 also is adapted to communicate with archive disc 54 (FIG. 1) to store job records associated with messages which have been fully transcribed and to retrieve therefrom such records which satisfy an inquiry based upon a particular parameter or parameters. When a sector is filled, that is, when eight job records which are associated with messages that have been fully transcribed are stored, this sector is transferred to the archive disc. In response to an inquiry based upon a parameter which requires that archived job records associated with messages that have been fully transcribed be scanned, the archive disc may be accessed to retrieve such job records. Sectors are read from the archive disc to sector buffer pool 108 in the same manner as discussed above with respect to the reading of sectors from disc 52.

In addition to the normal and inquired displays discussed above, display device 46 also is adapted to display various alert conditions. As used herein, an "alert" condition includes a power failure, the fact that archive disc 54 either is filled or is not present, the fact that disc 52 is filled, an off-hook condition wherein a recorder remains seized for more than a predetermined time, but a message is not dictated, a malfunction in a particular recorder, a malfunction in printer 56, and a malfunction in the disc drive apparatus which is adapted to drive disc 52. Referring now to FIG. 6, there is illustrated an alert buffer 134 which is adapted to receive and store indications of the aforementioned alert conditons from CPU 44. Alert buffer 134 is provided with a plurality of storage locations, each being dedicated to storing, for example, a binary "1" when a respective alert condition is present and a binary "0" when that alert condition is not present. A decoder 138 is connected to each of the storage locations of alert buffer 134 and is adapted to supply a predetermined alert indication to display device 46 depending upon which storage location in alert buffer 134 is provided with a binary "1". Thus, depending upon which alert condition is present, as represented by the particular storage location in the alert buffer in which a binary "1" is stored, display device 46 is driven so as to display an indication of the corresponding alert condition.

For example, if the first storage location of alert buffer 134 is dedicated to storing a binary "1" in the event of a power failure; then, if a power failure occurs, CPU 44 supplies a binary "1" to the first storage location of the alert buffer. Decoder 138 responds to the binary "1" which is stored in this first storage location of the alert buffer to drive display device 46 such that display screen 48 displays a corresponding alert indication, such as a "power off" display. In a similar manner, depending upon whether a binary "1" is stored in any of the remaining storage locations of alert buffer 134, decoder 138 decodes such binary signals to drive display device 46 to display corresponding alert indications.

The illustrated apparatus also is provided with an off-hook timer 136 having one input connected to receive the SEIZURE signal and a reset input connected to receive the CLUTCH signal. That is, if a particular central recorder is seized such that the SEIZURE signal is supplied to CPU 44, a representation of this SEIZURE signal activates timer 136. In response to the activation thereof, timer 136 is incremented by, for example, timing pulses which are derived from the system clock. When the timer reaches a predetermined time-out condition, for example, if the timer has been incremented for approximately fifteen minutes, a binary "1" is generated thereby and stored in the "off-hook" location in alert buffer 134. However, each time that recording is in progress, off-hook timer 136 is reset to zero. The fact that a recording operation is in progress is represented by the CLUTCH signal which is generated by the recorder when tape is transported therein. CPU 44 supplies the reset input of off-hook timer 136 with a binary representation of the CLUTCH signal in order to reset this timer. Thus, it is seen that, if a dictate station accidentally is placed in the off-hook condition, whereby a central recorder is seized, an alert is displayed indicating that there is an off-hook condition at that recorder. However, if the recorder is seized intentionally, the fact that the CLUTCH signal will be generated prior to the time that off-hook timer 136 times out means that the off-hook alert condition will not be displayed.

In accordance with another advantageous aspect of the present invention, control over a priority recording operation on a multiple-cassette recorder is achieved automatically. It is recalled that, if a multiple-cassette recorder is seized, a cassette generally will be loaded on the record/playback deck thereof. If a priority message is to be recorded on that cassette, thereby designating that cassette a "priority" cassette, it is necessary to raise the elevator at the output store so as to expose the discharge chute. When dictation on this cassette is completed, it is ejected from the record/playback deck and transported to the discharge chute from which it is discharged from the recorder. However, if at the time that the multiple-cassette recorder is seized, the cassette which is loaded on the record/playback deck contains one or more previously dictated messages thereon, that cassette first must be ejected, and then a fresh cassette must be loaded on the record/playback deck prior to raising the elevator at the output store. The apparatus illustrated in FIG. 7 controls the foregoing operations.

The illustrated apparatus is comprised of flag circuits 140, these flag circuits being formed of, for example, flip-flop circuits $140_1, 140_2, \ldots 140_{16}$, that is, the number of flip-flop circuits is equal to the number of central recorders to which the storage and display apparatus of this invention can be connected. Each flip-flop circuit $140_1 \ldots 140_{16} \ldots$ may be of the so-called RS type, each having its set input connected to receive the CLUTCH signal generated by the corresponding central recorder, or a binary representation thereof, and having its reset input connected to receive the CASSETTE CHANGE signal, or binary representation thereof. Gate circuits 142 are connected to the outputs of flag circuits 140 and, more particularly, an AND gate $142_{1a}$ is connected to the 1 output of flip-flop circuit $140_1$ and an AND gate $142_{1b}$ is connected to 0 output of this flip-flop circuit. Another input of AND gates $142_{1a}$ and $142_{1b}$ is connected in common to receive a PRIORITY REQUEST signal which is generated by the supervisor when the message is to be designated a priority message. The PRIORITY REQUEST signal may be generated by suitable operation of keyboard 50.

A dictation counter 144 is connected to receive a clock signal generated from, for example, the system clock. The dictation counter is adapted to be incremented in response to this clock signal. Furthermore, dictation counter 144 includes an enable input connected to receive the CLUTCH signal as an enable signal. Particularly, the dictation counter is incremented in response to the clock signal supplied thereto only if it has been enabled by the clutch signal. The purpose of the dictation counter is to time a dictated message. Thus, as a message is dictated, dictation counter 144 is incremented. Although not shown herein, the count attained by dictation counter 144 is adapted to be reset to zero in response to the termination of the SEIZURE signal. Thus, when a multiple-cassette recorder is seized, the count of dictation counter 144 is zero. If the recording of a message commences, the count is incremented. Hence, depending upon whether the count of dictation counter 144 is zero, it can be determined whether the author who is communicating with the multiple-cassette recorder has commenced the dictation of a message. The output of this dictation counter, as well as the output of AND gate $142_{1a}$, are connected to respective inputs of an eject gate 146, the latter preferably being an AND gate.

Although gate circuits 142, dictation counter 144 and eject gate 146 have been illustrated as being connected only to flip-flop circuit $140_1$, it should be appreciated that similar gates and counters are to be connected to those flip-flop circuits which are associated with multiple-cassette recorders. For example, if flip-flop circuit $140_2$ is associated with a multiple-cassette recorder, then gate circuits 142, a dictation counter 144 and an eject gate 146 will be connected to the 1 and 0 outputs of this flip-flop circuit. For those flip-flop circuits which are associated with an endless loop recorder, such gate circuits and counters need not be provided.

In operation, whenever a fresh cassette is loaded on the record/playback deck of the multiple-cassette recorder, the CASSETTE CHANGE signal resets the associated flag circuit. For example, flip-flop circuit $140_1$ is reset when a fresh cassette is loaded onto the record/playback deck of the multiple-cassette recorder associated with this flip-flop circuit. When this flip-flop circuit is reset, AND gate $142_{1b}$ is conditioned. If the author who first seizes this multiple-cassette recorder wishes to dictate a priority message, the supervisor generates the PRIORITY REQUEST signal. This signal energizes conditioned AND gate $142_{1b}$ to produce the PRIORITY CONTROL signal. It is recalled, from FIG. 3, that this PRIORITY CONTROL signal is returned to the multiple-cassette recorder so as to raise the elevator at the output store thereof. The author now can proceed with the dictation of his priority message and, upon completion thereof, the priority cassette is ejected from the record/playback deck and is discharged from the multiple-cassette recorder by the priority discharge chute.

Let it now be assumed that the first author who has seized the multiple-cassette recorder following the loading of a fresh cassette on the record/playback deck does not wish to dictate a priority message. As his dictation of a normal message proceeds, the CLUTCH signal which is generated sets flip-flop circuit $140_1$. As a consequence thereof, AND gate $142_{1b}$ is disabled and AND gate $142_{1a}$ now is conditioned. At the completion of this dictated message, flip-flop circuit $140_1$ remains in its set state. It is recognized that the flip-flop circuit is reset only when a fresh cassette is loaded on the multiple-cassette recorder.

Now, if the next author which seizes this multiple-cassette recorder wishes to dictate a priority message, the PRIORITY REQUEST signal is generated, as discussed above. This energizes conditioned AND gate $142_{1a}$ to condition eject gate 146. If the request for priority dictation was made before the author commenced his message, the count of dictation counter 144 will remain at zero. This is because the CLUTCH signal would not have been produced during this seizure and, therefore, the dictation counter would not be enabled to be incremented in response to the clock signal. With the count of dictation counter 144 at zero, eject gate 146 is energized to produce the EJECT signal. However, if the author had commenced the dictation of his message and then had decided to request that this message be designated a priority message, the fact that dictation had commenced means that the CLUTCH signal would have enabled dictation counter 144 to be incremented. Thus, at the time that the PRIORITY REQUEST signal is produced, although AND gate $142_{1a}$ would be energized, eject gate 146 would remain disabled by reason of the non-zero count attained by dictation counter 144. Consequently, if dictation had commenced prior to the request for priority dictation, the EJECT signal would not be produced.

The EJECT signal is returned to the multiple-cassette recorder, as shown in FIG. 3, to eject the cassette which then is loaded on the record/playback deck. The EJECT signal also commences a cassette change operation, whereupon a fresh cassette is loaded onto the record/playback deck. As this cassette-change operation is carried out, the CASSETTE CHANGE signal is produced so as to reset flip-flop circuit $140_1$. This, in turn, conditions AND gate $142_{1b}$, and this AND gate now is energized by the PRIORITY REQUEST signal to produce the PRIORITY CONTROL signal. Consequently, after the fresh cassette is loaded onto the record/playback deck the elevator of the output store is raised. The author now can commence the dictation of his priority message which, upon completion, the priority cassette will be ejected from the record/playback deck and discharged from the multiple-cassette recorder by the priority discharge chute.

Thus, it may be seen that the apparatus illustrated in FIG. 7 is effective to initiate a priority dictation operation either if the request for priority dictation is made by the first author which seizes the multiple-cassette recorder, or if a cassette containing previously recorded messages is present on the record/playback deck at the time that the priority request is made. However, if an author has commenced the dictation of his message, he cannot subsequently request that the message be designated a priority message. The fact that he has commenced dictation is represented by the non-zero count of dictation counter 144 which prevents eject gate 146 from being energized.

Figure 8:
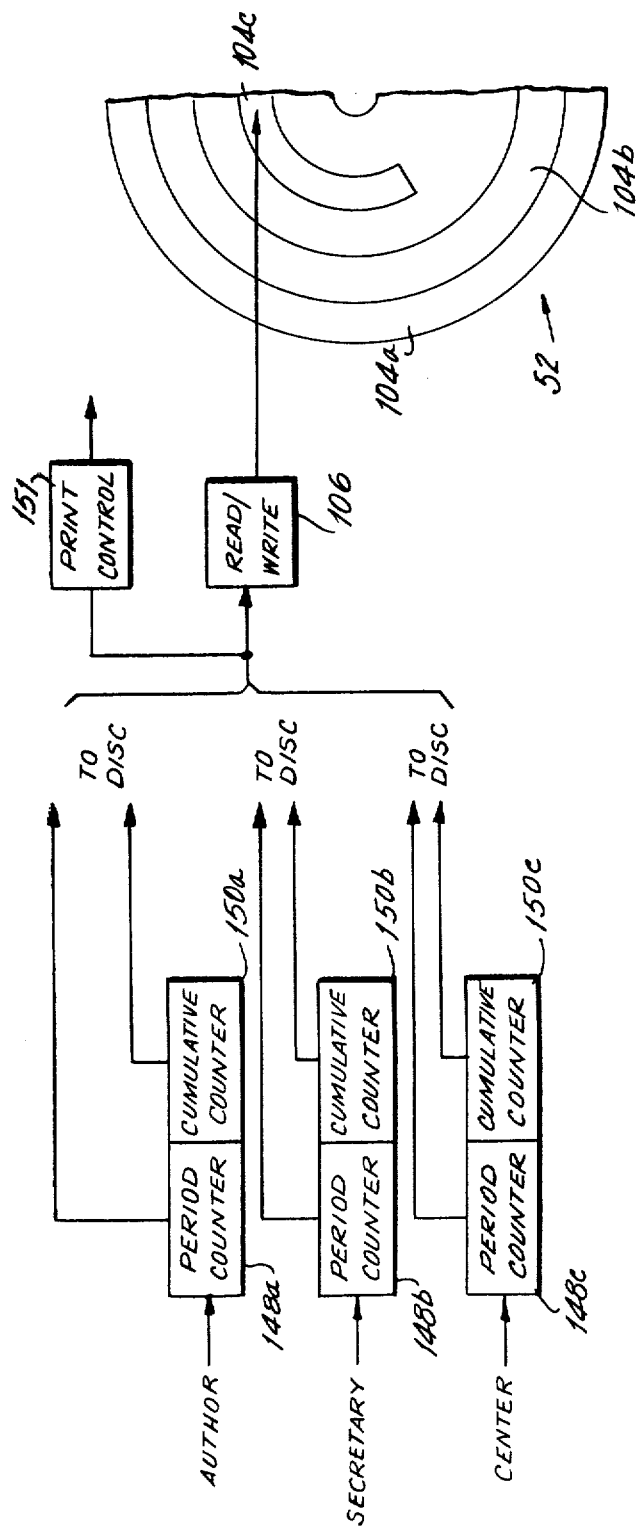
FIG. 8 is a block diagram representing the manner in which use of the central dictation system is summarized by the apparatus of this invention.

Another aspect of this invention is represented in FIG. 8 wherein the amount of dictation from each author, the amount of transcription from each transcriptionist and the total amount of activity of the central dictation system are accumulated. This is achieved by providing counters for the authors, transcriptionists (referred to herein as secretaries) and the overall central dictation system. These counters are comprised of separate files in the random access memory and are divided into period counters 148 and cumulative counters 150. After a message recorded by a particular author has been fully transcribed the period counter associated with that author may be incremented so as to store a representation of the number of messages which he has dictated during a predetermined period, such as a day, a week, or the like, as well as the length of each message. As more messages which have been dictated by this author are transcribed, the totals which are being accumulated in the period counter associated with him are updated. In addition to storing these so-called running totals in the period counter, the cumulative counter associated with this author likewise is updated over a longer period of time, such as a week, a month, a calendar quarter and the like.

In addition to maintaining a count of the number of messages and total length of dictation produced by each author, the author's identification also is stored.

Similarly, the period counters associated with respective secretaries store the number of messages which are transcribed by each, and the total length of the transcribed messages. These running totals are stored on a periodic basis in period counter 148b, as well as on a longer cumulative basis in cumulative counter 150b. In addition, the identities of the transcriptionists also are stored so as to correlate the period and cumulative totals with the respective transcriptionist.

Similarly, the total length of all messages which are recorded on each central recorder are stored in a period counter 148c and in cumulative counter 150c. Also, the total length of each type of message which is dictated is stored in a separate section of period counter 148c and in a separate section of cumulative counter 150c.

It may be appreciated that a separate location in the random access memory is provided for each period counter 148a that is associated with each author, for each cumulative counter 150a that is associated with each author, for each period counter 148b that is associated with each transcriptionist, for each cumulative counter 150b that is associated with each transcriptionist, for each period counter 148c that is associated with each recorder and that is associated with each type of message, and for each cumulative counter that is associated with each recorder and with each type of message. Hence, running totals as to the number of messages and length of such messages are maintained by author, by transcriptionist, by recorder and by type of message, both for a short period of time and for a longer, cumulative period of time.

The period and cumulative counters 148 and 150 are coupled via read/write circuit 106 to disc 52. Periodically, such as on the order of every twenty minutes, the contents of the period and cumulative counters are transferred to predetermined storage locations, or sectors, in disc 52. Thus, although the period and cumulative counters are updated substantially continuously, the totals of dictation and transcription activity stored in disc 52 are updated only periodically.

It may be appreciated that period counter 148a and cumulative counter 150a for each author are updated from the job record which is produced upon the transcription of a dictated message. Period counter 140c and cumulative counter 150c are updated from the job records which are produced when a dictated message is completed. The running totals of period counter 148b and cumulative counter 150b are updated by the supervisor in response to the completed transcription of each dictated message by each of the transcriptionists. This too can be ascertained from the job record in which the ex-status data is changed from assiged-for-transcription to completed transcription. That is, whenever a message has been fully transcribed, the change in status of the job record associated therewith results in updating respective period counters 148a and 148b and cumulative counters 150a and 150b.

In addition to being coupled to disc 52, the contents of period counters 148 and cumulative counters 150 are connected to a print control circuit 151. The print control circuit is operated in accordance with a conventional print routine performed by CPU 44 in response to a print inquiry. That is, if the supervisor wishes to provide a printed report of a summary of author activity, keyboard 50 is operated, and CPU 44 controls print control circuit 151 such that printer 56 prints a summary of the total number of messages and the total length of dictation produced by each author either for a period or for a longer "cumulative" period, depending upon which summary is selected. In a similar manner, print control circuit 151 may be operated to control printer 56 so as to print a summary of the total number of messages and the total length of such messages which are transcribed by each transcriptionist either for a relatively short period or for a longer "cumulative" period, as desired. It may be appreciated that, when the summaries of author activity and transcriptionist activity are printed, each author and each transcriptionist is identified in accordance with the identifying data associated therewith.

Print control circuit 151 also may be operated to control printer 56 so as to print a summary of the periodic and "cumulative" period activity of the overall central dictation system. This will result in a printed report of the total length of dictated messages which are recorded in each recorder, both for a period and for a "cumulative" period, as well as the total length of each type of message which is recorded in the central system.

In addition to printing these summaries of activity, printer 56 may be controlled, in conventional manner, to provide a printed copy of whatever information is displayed on display screen 48 at any given time. Since this print routine is conventional, further description thereof is not provided.

Referring now to FIG. 9, a representation of a job record is illustrated. The job record, as stored in a sector and in sector buffer pool 108, is comprised of fourteen 8-bit bytes. Typically, byte 0 contains the author identifying data, which may extend into bits 0 and 1 of byte 1. Bits 2-5 of byte 1 are provided with the message-type identity. Byte 2 is provided with the identity of the cassette, and this cassette-identifying data may extend to include bits 0-3 of byte 3. Bits 4-7 of byte 3 are provided with the recorder identifying data. Bytes 4 and 5 effectively are a 16-bit representation of the length of the dictated message. Byte 6 is provided with the transcriptionist-identifying data. Byte 7 is provided with data representing the status of the message, whether the message is a priority message, the type of recorder on which the message had been recorded, whether the message had been started on another cassette and whether the message was recorded externally of the central dictation system. Accordingly, bits 0-2 of byte 7 represent the status data, bit 3 represents whether the message is a priority message, bit 4 represents the type of recorder upon which the message was recorded, bit 6 represents whether the beginning of the message was commenced on another cassette and bit 7 represents whether the message was recorded on a so-called "external" recorder (i.e. a recorder that is not connected to the interface 42 of FIG. 1). Byte 8 is provided with data representing the month in which the message was dictated or the month in which the message was completed and was in condition for transcription. Byte 9 is provided with data representing the month in which the message was assigned for transcription or the month in which the transcription of that message was completed, and this data may extend to include bits 0-2 of byte 11. Byte 11 is provided with data which represents the day on which dictation of the message commenced or the day on which dictation of the message was completed. Byte 12 represents the hour and minute in which the dictated message was assigned for transcription or the hour and minute in which transcription of that message was completed. This data may extend to include bits 0-2 of byte 13. Byte 13 is provided with data which represents the day on which the message was assigned for transcription, or the day on which the transcription of that message was completed.

Bytes 14 and 15 are added to bytes 0-13 of the job record when the job record is stored in record buffer 114. Byte 14 is provided with data which represents the sector address, that is, the address of the sector on the disc, and byte 15 represents the positions in that sector which contain job records.

The manner in which the data is entered into and changed in bytes 0-13 now will be described. When a recorder is seized by a dictate station, the identity of the recorder is stored in byte 3, and the type of recorder is represented by a binary "1" or "0" in bit 4 of byte 7. Also, the month, day and time at which the recorder was seized is stored in byte 8, byte 11 and byte 10, respective. If the author transmits his identity code, as well as a code representing the type of message which he plans on dictating, his identity code is stored in byte 0 and the code representing the message is stored in byte 1. Furthermore, the in-dictation status data is stored in byte 7. If this message is a priority message, the priority bit is stored in bit 3 of byte 7. Still further, if the seized central recorder is a multiple-cassette recorder, the identity of the cassette which is loaded on the record/playback deck, as determined by the optical reader described above, is stored in byte 2. If the seized recorder is an endless-loop recorder, a message number identifying this message is stored in byte 2.

At the completion of the dictated message, the central recorder is released. This does not affect the author identity stored in byte 0, the message type stored in byte 1, the cassette number stored in byte 2, or the recorder number stored in byte 3. Now, however, the length of the dictated message can be ascertained; and this message-length data is stored in bytes 4 and 5. Also, since the status of the message has changed from in-dictation to end-of-dictation, the status data stored in byte 7 is changed. If the message had been dictated onto a cassette, the status data is changed from in-dictation status data to end-of-dictation status data. Alternatively, if the message had been dictated on an endless loop recorder, the status data is changed from indictation status data to assigned-for-transcription status data. At the same time, since a particular transcriptionist generally is designated to transcribe all messages which are recorded on a particular recorder, the identity of this transcriptionist is stored in byte 6. Still further, the month, day and time data representing the start of dictation, and stored in bytes 8, 11 and 10, respectively, are changed to represent the month, day and time at which dictation was completed. If the message is assigned for transcription, such as if the message had been dictated on an endless loop recorder, or if the message had been dictated on a cassette which is assigned to be transcribed by a particular transcriptionist, the month, day and time at which the message had been assigned for transcription is entered and stored in bytes 9, 13 and 12, respectively.

When the transcription of the messages is completed, the status data stored in byte 7 is changed from the assigned-for-transcription status data to the completed-transcription status data. Also, the month, day and time data stored in bytes 9, 13 and 12, respectively, which represent the time at which the message had been assiged for transcription, now is changed to represent the time at which the transcription of the message had been completed.

The job record shown in FIG. 9 (bytes 0-13), containing the various data portions thereof which are changed as the status of the message is changed, is the job record which is stored in disc 52, transferred between the disc and sector buffer pool 108 and shifted between the sector buffer pool and record buffer 114. Furthermore, it is this same job data that is stored on archive disc 54 when transcription of the message is completed.

The sector address stored in byte 14 and the position address stored in byte 15, when the job record is stored in record buffer 114, are generated by CPU 44 when the proper sector in which this job record is to be stored is located, such as when the sector is located on disc 52 or when the sector is located in the sector buffer pool. This establishes the precise storage location in which the job record is to be stored.

Turning now to FIG. 10, there is illustrated apparatus which is used in accordance with the present invention to ascertain the length of a dictated message. This apparatus is comprised of a dictation counter 152 and a time-to-length converter 154. Dictation counter 152 is adapted to be supplied with clock pulses (not shown) from, for example, the system clock and to be incremented in response to such clock pulses. Accordingly, the count exhibited by the dictation counter represents time. Dictation counter 152 is supplied with the CLUTCH signal, or binary representation thereof, as supplied to CPU 44 from a respective central recorder. It should be appreciated that, in accordance with the present invention, a plurality of dictation counters is provided, each dictation counter being associated with a respective central recorder. Only one of such dictation counters is illustrated in FIG. 10.

Time-to-length converter 154 may comprise a multiplying circuit and, in one embodiment, a plurality of time-to-length converters is provided, each being connected to a respective dictation counter 152. In another embodiment, a single time-to-length converter is provided, this single time-to-length converter being connected to all of the dictation counters via, for example, a multiplexing circuit. In either embodiment, time-to-length converter 154 is adapted to receive the count attained by dictation counter 152, this count being representative of time, and to multiply this count by a preset factor to produce an output product. Specifically, this preset factor is established by the supervisor and represents an average, or approximate lines per time conversion coefficient. That is, the number of lines of transcribed dictation which can be produced in unit time by the "average" transcriptionist is used to multiply the time-representing count supplied to time-to-length converter 154 by dictation counter 152. As an example, if the count supplied to the time-to-length converter is in terms of seconds, and if it is known that one line of transcription is produced for each five seconds of dictation, the lines per time coefficient which is preset by the supervisor is $1/5 = 0.2$. It is, therefore, appreciated that if the total time of a dictated message, as represented by the count attained by dictation counter 152, is equal to, for example, five minutes, or three hundred seconds, this time-representing count is multiplied in time-to-length converter 154 by the lines per time coefficient of 0.2 to produce an output binary signal corresponding to an estimated sixty lines of transcribed material. It is this message-length data representing the number of lines of transcribed material that is stored in bytes 4 and 5 of the job record shown in FIG. 9.

Thus, when dictation of a respective message is completed, dictation counter 152 determines the time duration of that message, and this time duration is converted to a message-length representation in terms of lines of transcription by time-to-length converter 154. This message length representation is stored in the job record which had been generated for that message. Subsequently, upon the completion of transcription of that message, if it is determined that the actual message length differs from the estimated message length, the latter having been produced by time-to-length converter 154, the supervisor may, if desired, modify the message-length data stored in bytes 4 and 5 of the job record by entering the actual message-length data via keyboard 50.

Turning now to FIG. 11, there is presented a representative illustration of a queue sector table 156 and a queue head table 158 which are provided in, for example, read/write circuit 106 to ascertain the appropriate sector or sectors which must be retrieved from disc 52 during, for example, a display operation or a status-change operation, as described above. It is understood that job records are stored in respective sectors on disc 52 in accordance with the particular status of the associated messages. Thus, a group of sectors (a group being constituted by one or more sectors) is provided for storing job records which are associated with messages that have been fully transcribed. Another group of sectors is provided for storing job records associated with messages that have been assigned-for-transcription. Yet another group of sectors is provided for storing job records associated with messages that are ready-for-transcription. An additional group of sectors is provided for storing job records associated with messages that have been dictated onto a cassette in a multiple-cassette recorder, but that cassette has not yet been ejected from the recorder. This group of sectors is referred to as the hang-up group to indicate that the associated messages have been fully dictated, but the cassette on which they have been dictated is not yet ready to be transcribed. Finally, there is a group of free sectors which are available to store job records associated with messages that have been fully transcribed (referred to herein as "finished" messages), assigned-for-transcription, ready-for-transcription or the aforementioned "hang-up" messages. Each group of sectors is designed a "queue" of sectors. For ease of description, it is appreciated that, in accordance with the foregoing explanation, disc 52 is provided with a "free" queue, a "finished" queue, an "assigned" queue, a "ready" queue and a "hang-up" queue.

Preferably, sectors are not specifically dedicated to a particular queue. Rather, when a job record must be stored in a particular queue, a sector from the "free" queue may be used to receive and store that job record. This sector then is transferred from the "free" queue to the queue in which this job record is stored. Also, and as mentioned above, job records are stored in a sector in a particular queue in chronological order. Each sector is adapted to store eight job records, each job record being constituted by fourteen bytes as represented in FIG. 9. Thus, in the first sector of a queue, for example, the "assigned" queue, the first position in that sector is occupied by the job record associated with the oldest message that has been assigned-for-transcription. The second position in that sector is occupied by the job record associated with the next oldest message, and so on. If more than eight job records are stored in this queue, additional sectors are used. The next sector, which is the next oldest sector, in this queue stores the next eight job records in continuing chronological order. Then, the next older job records are stored in the next older sector, and so on, until all job records associated with messages that have been assigned-for-transcription are stored. This technique also is used in the "finished" queue, the "ready" queue and the "hang-up" queue.

When a job record is shifted from one queue to another, for example, when a job record is shifted from the "ready" to the "assigned" queue, although the position which that job record had occupied in a sector in the "ready" queue becomes available to store another job record, a new job record is not inserted therein. This is because the new job record would not be in the proper chronological sequence. Rather than disrupt the chronological order in which job records are stored, this new job record would be stored in the newest sector of the "ready" queue, that is, the sector in which the newest job records are stored. If all eight positions in this newest sector are occupied, then a sector in the "free" queue is transferred to the "ready" queue and is used to store this newest job record as well as the next seven job records which are associated with messages that become ready-for-transcription.

Each sector is provided with an identifying designator, or address. Queue sector table 156 may comprise a section of the random access member of CPU 44 and is adapted to store the designators of the respective sectors which are in each queue. The oldest sector of a queue, that is, the sector in which job records associated with the oldest messages in that queue, has its designator stored at the bottom of a queue section of queue sector table 156, and the newest sector in that queue has its designator stored at the top of this section. For example, let it be assumed that sector 13 is the first, or oldest, sector in the "ready" queue. Thus designator 13 is provided at the bottom of the "ready" queue section of queue sector table 156. If sector 96 is the next older sector in the "ready" queue, designator 96 is stored just above designator 13 in the "ready" queue section of queue sector table 156. Similarly, if sector 24 is the newest sector in the "ready" queue, designator 24 is stored at the top of the "ready" section of the queue sector table. In an analogous manner, the sector designators of the "assigned" queue are stored in the "assigned" section of the queue sector table with the oldest sector designator stored at the bottom of this section and the newest sector designator stored at the top of this section. Sector designators are stored in the remaining queue sections of queue sector table 156. Thus, the queue sector table keeps account of those sectors which are in the respective queues, as well as those sectors which are in the "free" queue and are available to be used for storing new job records.

Queue head table 158 is adapted to store the storage locations, or "slots" of queue sector table 156 in which those sector designators that are provided at the top, or head, of each queue section are stored. Thus, the contents of the queue head table are utilized to ascertain the beginning of each queue section in the queue sector table. As illustrated, since the head of the "hang-up" queue is stored in slot U of queue sector table 156, queue head table 158 represents that slot 0 is at the head of this hang-up queue. Similarly, since the fourth slot of the queue sector table is provided in the head of the "ready" queue section of the queue sector table, queue head table 158 represents that the fourth slot has the head of the "ready" queue stored therein. Also, it is assumed that the queue sector table stores the head of the "assigned" queue in slot number 10 thereof and accordingly, the queue head table represents that this slot is provided with the head of the "assigned" queue. Similarly, queue head table 158 represents that slot 15 of queue sector table 156 is provided with the head of the "finished" queue, and that slot 24 of the queue sector table is provided with the head of the "free" queue. The purpose of queue head table 158 is to indicate demarcations between the respective queue sections in queue sector table 156. Hence, a particular queue section may be expanded or contracted as job records are added or removed therefrom, and the queue head table keeps account of such expansion and contraction. If no job records are stored in a given queue section, the slot number stored in queue head table 158 is the same as the immediately preceding slot number.

Let it be assumed that, in accordance with a change-of-status operation or a display operation, the job record associated with the oldest message which has been assigned-for-transcription must be shifted to record buffer 114. In accordance with the chronological order in which job records are stored, this oldest job record in the "assigned" queue is stored in the oldest sector. From queue sector table 156, it is seen that the oldest sector in the "assigned" queue is sector 47 whose sector designator is provided at the bottom of the "assigned" queue section of the queue sector table. Initially, queue head table 158 is scanned to locate the slot in queue sector table 156 at which the beginning of the "assigned" queue is stored. In the illustrative example, slot 10 represents the head of the "assigned" queue. Thus, the beginning of the "assigned" queue, as represented by the queue sector table slots stored in queue head table 158 is ascertained. Then, successive designators in the "assigned" queue section of queue sector table 156 are examined until designator 47 is found. If it is not known that sector 47 is the oldest sector in the "assigned" queue, the designator in the next following slot is detected. This next following slot is slot number 15, and is known from queue head table 158, this represents the head of the "finished" queue. Consequently, it is appreciated that the designator which is stored in slot member 14 in queue sector table 156 represents the oldest sector in the "assigned" queue. Consequently, sector 47 is read from disc 52, this sector being the correct sector which contains the job record associated with the oldest message in the "assigned" queue. Sector 47 is read from the disc to sector buffer pool 108, and the desired job record is shifted from the sector buffer pool to record buffer 114.

In the event that, for example, a job record stored in the "ready" queue having a particular parameter is to have its status data changed, the location of the "ready" queue section in queue sector table 156 is determined by scanning queue head table 158 until slot number 4 is found. Then, sector 24 (whose designator is stored in slot number 4 of queue sector table 156) on disc 52 is examined to determine whether a job record stored therein contains the chosen parameter. If not, the next sector in the "ready" queue is examined. It is known from the queue sector table that this next sector is sector 96. If the job record having the chosen parameter still is not found, the next sector in the "ready" queue is examined, i.e., sector 13, as determined from queue sector table 156, is examined. This process continues until the job record having the chosen parameter is found. At that time, the sector in which this job record is stored is read from the disc to the sector buffer pool; and then the job record is shifted from the sector buffer pool to record buffer 114.

Let it now be assumed that a job record associated with a message whose status has been changed to assigned-for-transcription status is to be stored in the assigned queue. Queue head table 158 is scanned to determine the head of the "assigned" queue. From the queue head table, it is recognized that sector 115, which is stored in slot number 10 of the queue sector table, is at the head of the "assigned" queue, and this sector is read from the disc to sector buffer pool 108 and examined to determine whether it has an available location to store this new job record. The new job record is inserted into the available location therein. However, if sector 115 is "filled", that is, it does not contain an available location in which to store an additional job record, queue head table 158 is examined to ascertain the next sector in the "free" queue. From the queue head table, it is seen that sector 19, which is stored in slot number 24 of the queue sector table, is the next free sector, and this sector is read from disc 52 to sector buffer pool 108 to receive the new job record. At the same time, designator 19 is shifted from the "free" queue section of sector table 156 to the head of the "assigned" queue section at slot number 10 of the queue sector table. Also, the slot numbers representing the heads of the "finished" and "free" queue sections of the queue sector table as stored in the queue head table, are changed from 15 and 24 to 16 and 25, respectively, to reflect the expansion of the assigned queue section.

Whenever all of the job records in the sector of a particular queue have been read out therefrom, that is, such job records have been shifted to other queues, the sector which then becomes available in that queue is shifted therefrom to the bottom of the "free" queue. This shifting of sectors is represented by a change in the queue section of queue sector table 156 from which that queue is shifted, and by a change in the "free" queue section of the queue sector table which now additionally stores the designator of the sector which has become "free". Also, the slot numbers stored in queue head table 158 are changed to reflect the contraction of a preceding queue section. Thus, queue sector table 156 and queue head table 158 are used to keep account of those sectors in which respective job records are stored, as well as those sectors which are available to store new job records. This simplifies the read/write operations performed by read/write circuit 106 with respect to disc 52.

In the interest of simplification, queue sector table 156 and queue head table 158 are illustrated as being associated merely with the "hang-up" queue, the "ready" queue, the "assigned" queue, the "finished" queue and the "free" queue. In addition to these queues, messages having a "priority" status may be stored in separate queues. Thus, in addition to those illustrated in FIG. 11, the queue sector table and the queue head table also may be provided with "priority ready" queues and "priority assigned" queues. Furthermore, the "finished" queues may be divided into "finished-and-not archived" queues and "finished-and-archived" queues, respectively.

Typical examples of displays which may be provided on display screen 48 are illustrated in FIGS. 12, 13 and 14. FIG. 12 represents a normal display in which, as mentioned above, the job records associated with a predetermined number of messages, for example, five messages, are displayed for those messages which have been assigned-for-transcription, those messages which are ready-for-transcription and those messages which are in-dictation. The displayed job records are stored in record buffer 114 and are displayed in lines on display screen 48 as determined by screen content table 120. Preferably, but not necessarily, the displayed job records are associated with the oldest messages which have been assigned-for-transcription, the oldest messages which are ready-for-transcription and the newest messages which are in-dictation. Furthermore, job records which are associated with those messages that have the "priority" status are displayed above all other job records, except for those job records containing the in-dictation status.

In addition to displaying the job records, display screen 48 also displays information relating to the overall operation of the central display system. Thus, at the top line in FIG. 12, there are displayed the capacity of disc 52 which has been filled with job records associated with messages which have not yet been fully transcribed, the capacity of archive disc 54 which has been filled with job records, the length (in terms of lines of transcription) of the total backlog of the central dictation system, the turnaround time (in terms of hours) of the central dictation system, the hourly output rate (in terms of lines of transcription) of the system, and the date and time. Specifically, this information is represented as follows:

S-13% means that 13% of disc 52 has been filled with job records associated with messages that have not yet been transcribed. This information can be ascertained by counting the number of sectors which are stored in the assigned and ready and hang-up queues of queue sector table 156, and dividing this number by the total number of sectors which are provided on disc 52. CPU 44 is readily adapted to perform this function.

A-68% means that 68% of the capacity of archive disc 54 is filled with job records. This percentage may be ascertained in a manner similar to that described above to determine the percent of disc 52 which is filled.

BACKLOG = 2800 means that the total length of all dictated messages which have not yet been fully transcribed is approximately equal to 2800 lines of transcription. This figure can be ascertained by summing the message length of each job record that is stored in the "hang-up" queue, the "ready" queue and the "assigned" queue.

TURNAROUND = 4.0 means that the total length of time, based upon the present operation of the central dictation system, from the time that a new author begins to dictate a message until that message has been transcribed is equal to four hours. This figure can be determined by approximating the rate at which all transcriptionists in the central dictation system transcribe dictation. This approximation is entered by the supervisor by keyboard 50. As an example, if all transcriptionists operate so as to produce approximately 700 lines of transcription per hour, then the turnaround time of four hours is determined by dividing the detected backlog of 2800 lines by the system transcription rate of 700 lines per hour.

RATE = 700 is the aforementioned transcription rate of the entire central dictation system.

The date and time which are displayed by display screen 48 is the real time which is maintained by, for example, the system clock.

Display screen 48 also provides a display of particular alert conditions of the type mentioned above with respect to FIG. 6. In the illustrated representation, the alert condition that recorder 1 is offhook means that this recorder has been seized for more than a predetermined amount of time (e.g. fifteen minutes) and no dictation has taken place. If more than one alert condition is present, the display screen displays, in sequence, approximately every fifteen seconds, each of these alert conditions.

The display screen also provides a "Command" display, whereby an inquiry as to a predetermined one or more parameters is displayed so as to apprise the supervisor of the particular inquiry which has been made. In the normal display, no inquiry is made and, therefore, the display "Command" is illustrated.

In the illustrated display of job records, it may be appreciated that the message identification number within a predetermined range (e.g. 4500 to 4999) for a particular job record means that the recorder on which the message was dictated is an endless-loop recorder. Furthermore, in the column designated "time in", the displayed time for those job records associated with messages which are in dictation refers to the time at which the respective recorder was seized. The time included in those job records which are associated with messages that are ready-for-transcription refers to the time at which dictation was completed and the message was made ready for transcription. Since all of these illustrated job records are associated with messages that have been recorded on multiple-cassette recorders, the "time in" data refers to the times at which the respective cassettes were ejected. Similarly, for those job records which are associated with messages that have been assigned-for-transcription, the "time in" data refers to the time at which the messages were ready for transcription. For the endless-loop recorder, this time is the same as the time at which the message was completed. For messages which were dictated on a multiple-cassette recorder this time refers to the time at which the cassette was ejected.

The column designated "time out" refers to the times at which the respective messages were assigned-for-transcription. For messages which were recorded on an endless-loop recorder, since a pre-established transcriptionist normally is assigned to transcribe all messages which are recorded on that recorder, the "time out" data is identical to the time at which the message was completed. For those job records which are associated with messages that were recorded on a multiple-cassette recorder, the "time out" data refers to the times at which the cassettes were assigned to a transciptionist. Although not shown herein, the "time out" data contained in job records which are associated with messages that have been assigned-for-transcription subsequently are changed when the messages are fully transcribed to represent the respective times at which transcription thereof is completed. This change in the "time out" data normally is entered by the supervisor via keyboard 50.

The column identified as "N" merely refers to the line number of display screen 48 on which the information contained in the job record is displayed.

The column identified as "DEPT" represents the particular organizationed department of which each author is a member. This information need not be included in the job record but, rather, may be stored in a so-called look-up table associated with respective authors of that department. Hence, when the author's identity is known, his department can be ascertained easily from this look-up table, and displayed.

FIG. 13 represents the display on display screen 48 in response to an inquiry concerning a particular author, such as author "201". This inquiry is entered into CPU 44 by keyboard 50. In response to this inquiry, record buffer 114, sector buffer pool 108 and disc 52 are scanned for all job records which contain the author identification "201". When each such job record is found, it is stored in record buffer 114, and screen content table 120 determines the order in which such job records are to be supplied to screen drive 124 for display on display screen 48. In accordance with the convention assumed herein, these job records are displayed in chronological order. As shown in the upper left corner of FIG. 13, the legend "Command" has been changed to "Inquiry D 201" to apprise the supervisor that the displayed job records correspond to this inquired parameter. It is seen that the first job record is associated with a message that has been fully transcribed, the second job record is associated with a message that has been assigned-for-transcription and the third job record is associated with a message that is ready-for-transcription. No other job records that are associated with messages which have been dictated by this author have been found.

FIG. 14 represents the display of job records which have been ascertained in response to an inquiry relating to a particular recorder, such as recorder #1. As shown in the upper left corner of this figure, the "Command" display has been replaced by "Inquiry R1" to apprise the supervisor that the displayed job records have been found in response to this particular inquiry. As may be seen, the displayed job records are associated with all messages which have been recorded on recorder #1. It has been assumed that this recorder is an endless-loop recorder and, therefore, cassette identifications are not provided. As may be expected, although display screen 48 is capable of displaying only sixteen lines of information, more than sixteen job records that satisfy this inquired parameter have been found. It is recalled that thirty-three job records which satisfy an inquiry may be stored, at one time, in record buffer 114. The first sixteen job records which are stored in this record buffer are displayed and, since a seventeenth job record is stored, gate circuit 122 responds to the record buffer index which is stored in location #17 of screen content table 120 to result in the display of the character "more" beneath line 16. If the supervisor wishes, the display screen may be advanced to display the next page of information which would be constituted by the next sixteen job records stored in record buffer 114. If thirty-three job records had been stored in the record buffer, then the display of the next sixteen job records will be accompanied once again by the display of the character "more". If the supervisor now wishes to display still further job records which have been found to satisfy this inquiry, disc 52 first must be accessed so that the remaining job records (up to sixteen) can be transferred from the disc through sector buffer pool 108 to record buffer 114. Then, the next set of sixteen job records will be displayed. If still further job records are available which satisfy the inquired parameter, the foregoing operation is repeated until all of such job records have been displayed. Of course, and as mentioned above, record buffer 114 can store a maximum of thirty-three job records. Thus, if additional job records must be shifted into the record buffer, the sixteen oldest job records which had been stored therein are erased. Consequently, display screen 48 may advance to the next page or may revert to the preceding page; but the display screen cannot be reversed to display two preceding pages of information. This is because the second preceding page had been erased from the record buffer.

Although not shown in FIGS. 13 and 14, the information regarding the various system parameters, such as the capacity of disc 52 which has been filled, the capacity of disc 54 which has been filled, the overall backlog, the overall turnaround time, the overall transcription rate and the date and time, are displayed. This information is displayed in the manner shown in FIG. 12.

In the foregoing description of, for example, FIGS. 3-8, specific circuitry which is used to shift data from one device to another, and the specific circuitry which is used to scan and detect particular job records have not been described in detail. This is because it is intended that the present invention be implemented by a conventional microprocessor, such as the aforementioned Model 8080 microprocessor manufactured by Intel Corp. Inherent in such microprocessors are the necessary apparatus and devices which perform the aforementioned data gating, scanning and shifting operations. Furthermore, if the present invention is implemented by discrete logic circuits, the construction of such gating, scanning and shifting circuitry will be readily apparent to those of ordinary skill in the art without undue experimentation. For these reasons, and in the interest of brevity and simplification, the instant disclosure is not obfuscated by a detailed description of such conventional circuits.

In the preferred embodiment thereof, the present invention is implemented by a microprocessor. This microprocessor is suitably programmed to carry out various routines by which job records are generated, stored, manipulated and displayed. Typical of such routines are the dictation display routine, wherein those job records which are associated with messages that are in-dictation are displayed, the data update routine for hang-up wherein the data contained in a job record is updated when the associated message has been dictated onto a cassette in a multiple-cassette recorder, the data update routine for keyboard entry wherein the job record associated with a message is updated when the status of that message is changed, and the display routine wherein a particular job record is displayed. Flow chart diagrams representing each of these routines for a suitably programmed microprocessor now will be described. Such flow chart diagrams will enable those of ordinary skill in the art to satisfactorily program a microprocessor in order to carry out such routines.

Figure 15:
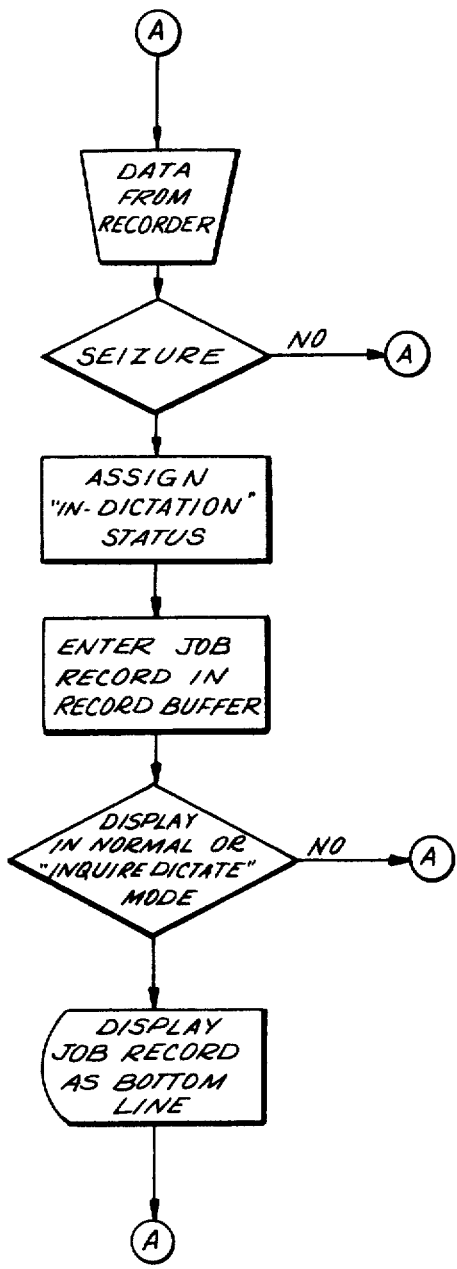
FIG. 15 is a flow diagram representing the manner in which information associated with messages being dictated is displayed.

Turning now to FIG. 15, there is illustrated a flow chart diagram of the dictation display routine. CPU 44 periodically senses whether data is being received from each of the central recorders to which the CPU is connected. The manner in which data from a recorder is supplied to the CPU has been described in detail hereinabove with respect to FIG. 3. If data is received from a recorder, it is queried as to whether this data represents the seizure of that recorder. If not, then it is assumed that this data is associated with a message whose dictation is in progress, and that the job record associated with this message already has been established.

If the CPU detects that the recorder has just been seized, then the initial data which is used in the job record for the associated message is generated. As mentioned above, this initial data includes the identity of the author, the type of message which is being dictated, the identity of the recorder on which the message is being dictated, the identity of the cassette in the event that the message is being dictated onto a cassette in a multiple-cassette recorder, and the date and time at which dictation of the message commenced. This initial data is entered in record buffer 114 so as to form the job record associated with this message. Furthermore, CPU 44 responds to the seizure of the recorder to produce indictation status data which also is stored in the job record in record buffer 114.

In addition to generating this job record and storing the same in the record buffer, the CPU senses whether display device 46 is being operated in its normal display mode or in its inquiry-for-dictation ("QD") mode. If in its normal display mode, this newly created job record, which is the newest job record in the record buffer 114, is displayed as the bottom line on display screen 48, as illustrated in, for example, FIG. 12. If display device 46 is operated in its QD mode, and the newly created job record satisfies the particular parameters which have been inquired, then this new job record is displayed. The CPU then returns to the step in its program wherein data from this and other recorders is sensed. If, however, display device 46 is not operated in its normal or QD display modes, this job record might not be displayed. In that event, the CPU again returns to the step whereby data from the respective recorders is sensed. When the display device returns to its normal display mode, this job record is displayed, provided it is associated with one of the five newest messages which are in dictation.

Figure 16:
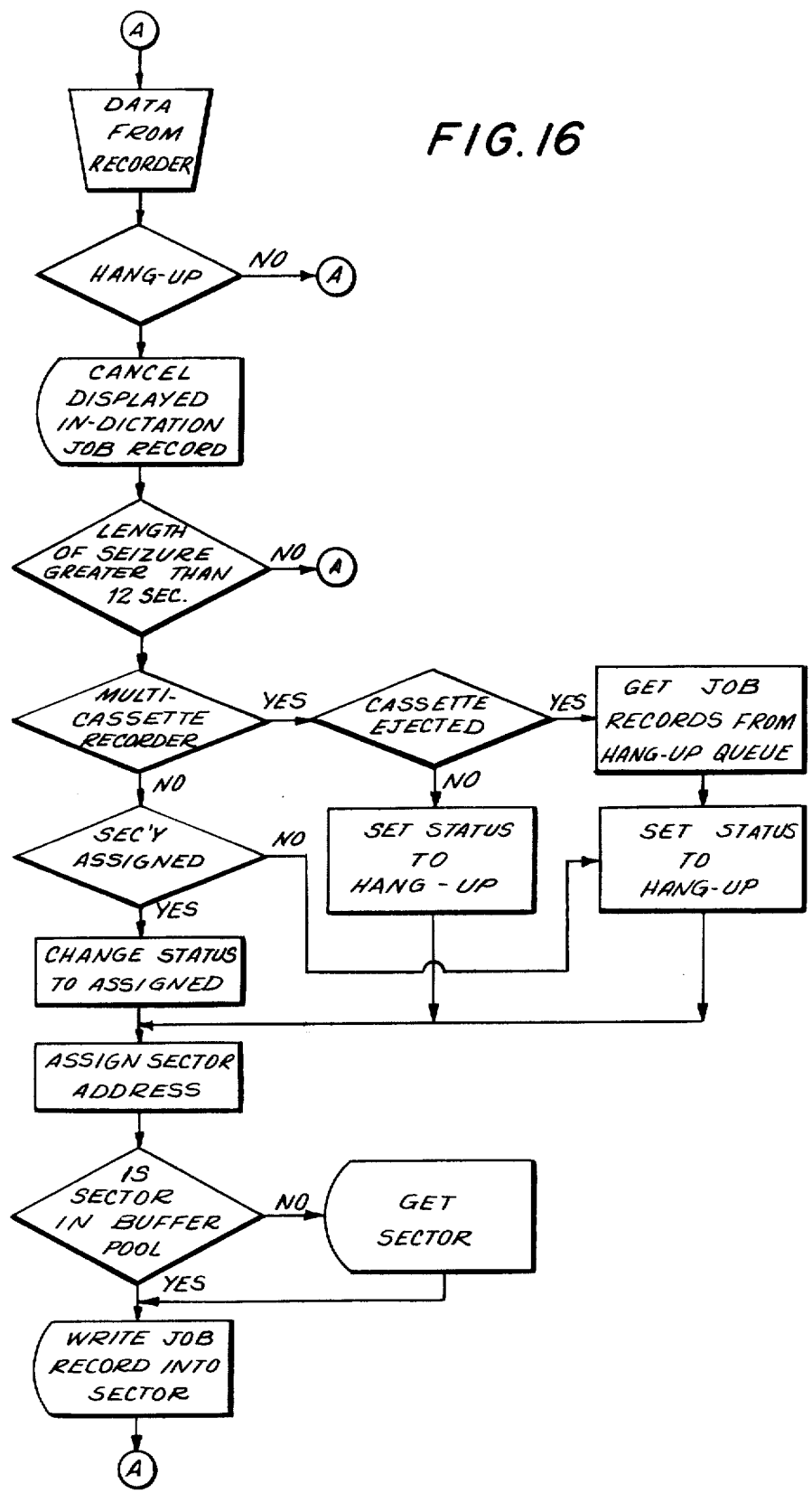
FIG. 16 is a flow diagram representing the manner in which information associated with a message is updated upon the completion of dictation of that message.

Turning now to FIG. 16, there is illustrated a flow chart diagram of the data update routine in the event that a dictate station is in communication with a recorder, and then the recorder is released following the completion of a dictated message. The CPU senses data which is received from the recorder. This data is queried to determine whether there is a termination of the SEIZURE signal. If not, the CPU continues to sense this incoming data. Once the release of the recorder is detected, that is, once the hang-up condition is sensed, the display of the job record associated with this message is erased from display screen 48, and the job record is cancelled. The CPU then queries whether the message length is less than some predetermined amount. If it is determined that the message length is less than, for example, twelve seconds, the CPU returns to the condition whereby incoming data from that recorder is sensed.

However, if it is determined that the recorder had been seized for more than twelve seconds, CPU 44 queries whether this recorder is a multiple-cassette recorder. This, of course, can be ascertained from the data which is supplied to the CPU from change-over switch 73, discussed above with respect to FIG. 3. If it is concluded that this recorder is not a multiple-cassette recorder, the CPU queries whether a secretary, or transcriptionist, has been assigned to transcribe the dictated message. If so, then the status data contained in the job record associated with the message that had been dictated is changed to assigned-for-transcription status. If a secretary has not been assigned, the status data is changed to ready-for-transcription. After the status data is changed, a sector address and a position address identifying the newest sector in the "assigned" or "ready" queues and the available position in that sector, are entered into bytes 14 and 15 of the job record. This identifies the specific location in the correct sector in which this job record is to be stored. It is recalled that the sector address is ascertained from queue head table 158 and queue sector table 156. In the event that this sector does not contain any available positions within which the job record can be stored, the next "free" sector is used as the head of the "assigned" queue to store the job record. Thus, the correct sector address and position address can be determined and stored in bytes 14 and 15 of the job record contained in record buffer 114.

Once the appropriate sector in which this job record is to be stored is identified, sector buffer pool 108 is examined to determine whether this sector is found therein. If not, this sector is retrieved from disc 52 into the sector buffer pool. Then, the job record is shifted into the appropriate position of this sector, as identified by the position address of byte 15 of the job record. The sector containing this inserted job record then is written onto disc 52.

In the event that the CPU had determined that the recorder which has been released is a multiple-cassette recorder, rather than an endless loop recorder, it is established whether the cassette upon which the message had been recorded is ejected. This can be determined by sensing the CASSETTE CHANGE signal which is supplied to the CPU by the multiple-cassette recorder, as described above with respect to FIG. 3. If the cassette is ejected, then the job records associated with all messages which have been recorded on that cassette are retrieved from the "hang up" queue where they are stored following the completion of dictation and awaiting ejection of the cassette, and the status data contained in those job records are changed to the ready-for-transcription status. The appropriate sector which is available to store these job records is determined, as described peviously, and the address of this sector, together with the addresses of the positions in this sector in which the job records are to be stored, are entered into bytes 14 and 15 of the job records. The identified sector is located, and the job records are inserted therein.

Now that the status of the job records are changed, the address of the appropriate sector in the "ready" queue into which these job records are to be stored, together with the addresses of the positions of those job records in this sector, are inserted into bytes 14 and 15 of the job records. The sector identified by this address is retrieved, and the job records are stored therein, one at a time, for all job records that are associated with messages which have been dictated onto this cassette. Thus, each such job record, containing the changed status, is inserted into an available sector in the "ready" queue.

If CPU 44 senses that, in response to the hang-up condition, the cassette is not ejected from the multiple-cassette recorder, that is, the CASSETTE CHANGE signal is not received, then the status contained in the job record associated with this message is changed from the in-dictation status to the hang-up status. Bytes 14 and 15 of the job record, which still is stored in record buffer 114, are provided with the sector and position addresses, repsectively, of the appropriate sector in the "hang-up" queue into which this job record is to be stored. It is recalled that the sector address corresponds to the sector which is at the head of the "hang-up" queue; or if this sector is filled, the sector address corresponds to the next available "free" sector which will be used as the new head of the "hang-up" queue. Once the appropriate sector and position addresses have been determined, the identified sector is retrieved and the job record, containing the hang-up status data, is inserted therein.

From the foregoing description of FIG. 16, it is appreciated that, when a hang-up condition is sensed, the length of time that the recorder had been seized first is determined. If the duration of seizure exceeds a predetermined minimum duration, then the status data contained in the job record associated with the message is changed from the in-dictation status to the assigned-for-transcription status in the event that the seized recorder was an endless-loop recorder; or the in-dictation status data is changed to the hang-up status data in the event that the seized recorder was a multiple-cassette recorder and the cassette upon which the message was dictated has not been ejected; or the status data in this job record, together with the status data in all other job records associated with messages which have been dictated onto this cassette, is changed from the in-dictation status to the ready-for-transcription status in the event that the cassette was ejected upon release of the multiple-cassette recorder. Furthermore, each job record, containing the changed status data, is inserted into an appropriate sector in the queue which is used to store job records that are associated with messages of this status. The sector containing this inserted job record is written to disc 52. Also, if necessary, the queue sector and queue head tables are updated to reflect the change which may have occurred in the sectors included in the respective queues.

Figure 17:
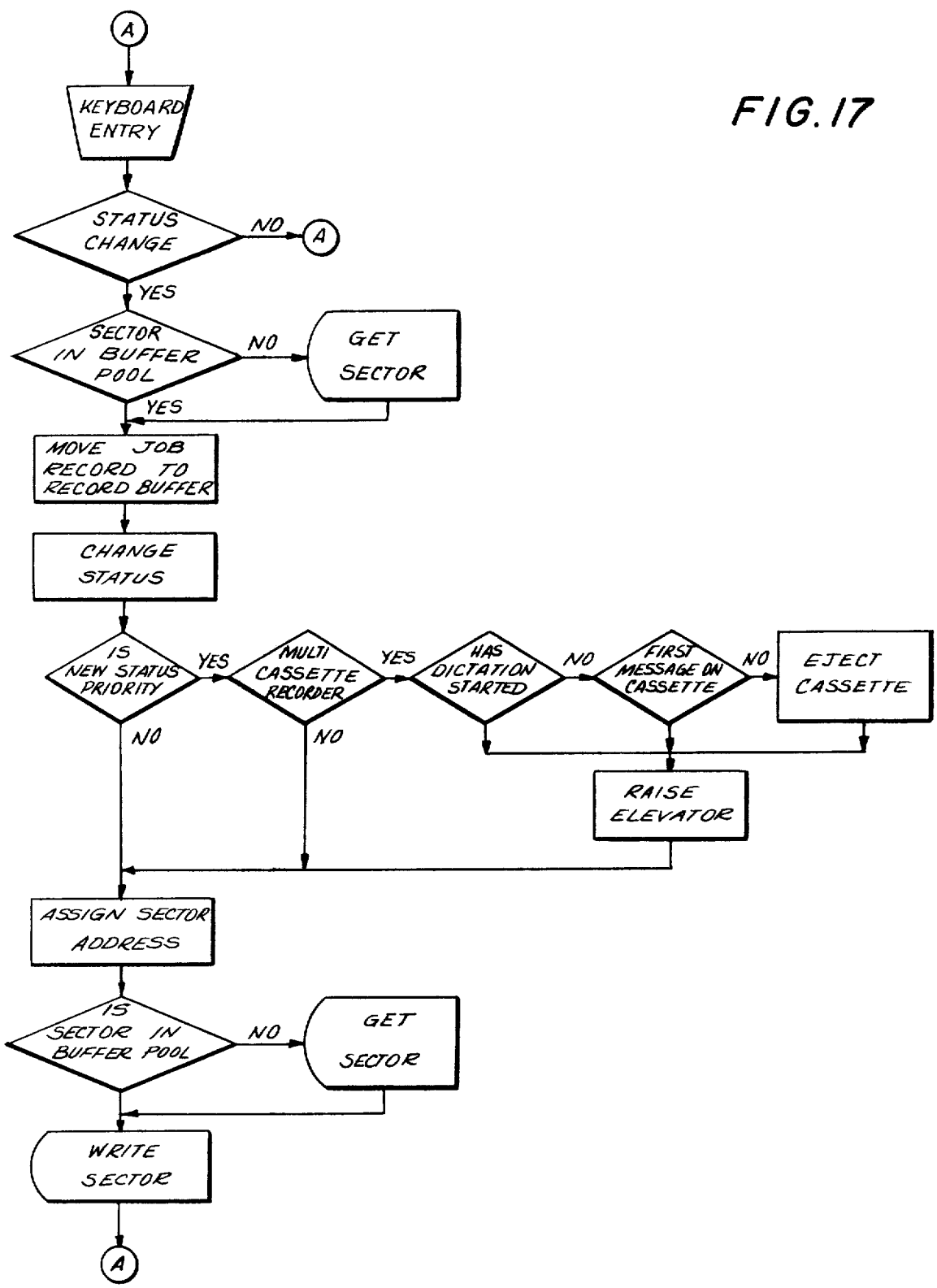
FIG. 17 is a flow diagram representing the manner in which information associated with a message is updated in response to keyboard-entered data.

The data update routine in response to a keyboard entry now will be described with respect to FIG. 17. The previous discussion explained the manner in which status data contained in a job record is updated in response to data received from the recorder, i.e., in response to a hang-up condition. The present discussion will explain the manner in which status data is changed in response to a keyboard entry, for example, when a cassette has been assigned for transcription or when a dictated messsage has been fully transcribed. CPU 44 senses whether data is being entered therein from keyboard 50. If so, such data is examined to ascertain whether it relates to a change in status. If not, subsequent entries from the keyboard are examined. However, if the entered data relates to a change in status, a search for the appropriate job record is initiated. Generally, when a change in status data is entered, one or more parameters also will be entered in order to identify the appropriate job record. For example, if a cassette is to be assigned-for-transcription, in addition to entry of the assigned-for-transcription status data, the supervisor also will enter the identity of that cassette. If a message which had been recorded on an endless-loop recorder is fully transcribed, the supervisor will enter both the completed-transcription status data and the identification of the recorder, or the author, or the time at which the dictated message had been completed. If only the recorder identity is known, the supervisor may, preliminarily, display all job records which are associated with messages that have been recorded on that recorder and that have been assigned-for-transcription. Once the proper message has been ascertained from this display, the identity of that message can be entered.

Once sufficient information has been entered in order to identify the specific job record whose status data is to be changed, sector buffer pool 108 is examined to determine if it contains a sector in which this job record is stored. If not, disc 52 is accessed to locate the proper sector, and to read this sector from the disc into the sector buffer pool. Once the sector containing the job record in question is stored in the sector buffer pool, the job record whose status is to be changes is shifted into record buffer 114. There, the status data is changed. For example, if the job record is associated with a message that has been recorded on a cassette, the status data may be changed from the ready-for-transcription status to the assigned-for-transcription status. As another example, if the job record is associated with a messsge that has been fully transcribed, the status data contained in that job record is changed from the assigned-for-transcription status to the completed-transcription status. The sector containing the job record prior to its change in status data is stored in sector buffer pool 108, and the job record is shifted into record buffer 114. Then, the status data is changed (e.g., from ready-for-transcription to assigned-for-transcription, or from assigned-for-transcription to completed-transcription, or the like), and the sector and position addresses are inserted into bytes 14 and 15 of the job record (shown in FIG. 9) to identify the correct position in the appropriate sector in which this job record, containing the changed status data, is to be stored.

The foregoing change in the status data is inhibited for a particular case wherein a message which is in dictation is to be changed to a priority message. This will be described below. For the purpose of the present discussion, let it be assumed that the changed status data of the job record is not to priority status. Accordingly, the new sector is inserted into byte 14, as mentioned above, and sector buffer pool 108 is scanned to determine whether the new sector, as identified by this sector address, is stored therein. If it is, the job record, containing the changed status data, is inserted into a position in this sector as determined by the position address of byte 15. However, if the identified sector is not presently in the sector buffer pool, disc 52 is accessed, in the manner described previously with respect to, for example, FIG. 11, to locate the identified sector, and this sector then is read from the disc to the sector buffer pool. The job record containing the changed status data then is inserted into the position identified by the position address of byte 15 of this sector. The sector containing this job record then is written to disc 52.

Returning to the step wherein the status data of the job record stored in record buffer 114 is changed in accordance with the keyboard entry, the new status data is examined to determine whether this new status is a priority status. Typically, if a message is to be designated a priority message, the author communicates with the supervisor of the central dictation system to request such priority designation. If the message is to be accorded priority status, priority status is entered from keyboard 50. If it is ascertained that the status data is to be changed to priority status, CPU 44 determines whether the recorder upon which this message had been dictated is a multiple-cassette recorder. This can be established by correlating the identity of the recorder, in byte 3 of the job record, with a pre-stored table of the type of each recorder to which the CPU is connected. If it is determined that the recorder is a multiple-cassette recorder, the CPU senses whether dictation of the message has commenced. As discussed above with respect to FIG. 7, if dictation has begun, the count of dictation counter 144 will not be zero. If dictation has not begun, the count of this dictation counter wll be zero, and the EJECT signal will be generated by eject gate 146 if there are any prior messages recorded on this cassette. The EJECT signal is returned to the multiple-cassette recorder to eject the cassette which is loaded on the record/playback deck thereof and to load a fresh cassette thereon. Then, the elevator at the output store is raised. This means that, once the author has completed his message on the fresh cassette, it will be ejected from the record/playback deck and will be discharged from the multiple-cassette recorder by the priority discharge chute. If it is determined that the author already has commenced direction, that is, the count of dictation counter 44 is not zero, this cassette still can be designated a priority cassette. The elevator at the output store is raised so that, once dictation is completed this priority cassette will be discharged promptly. The message is designated a priority message and the job record associated therewith is stored in the appropriate sector (e.g. a sector in the "ready" queue or a sector in the "assigned" queue).

Figure 18:
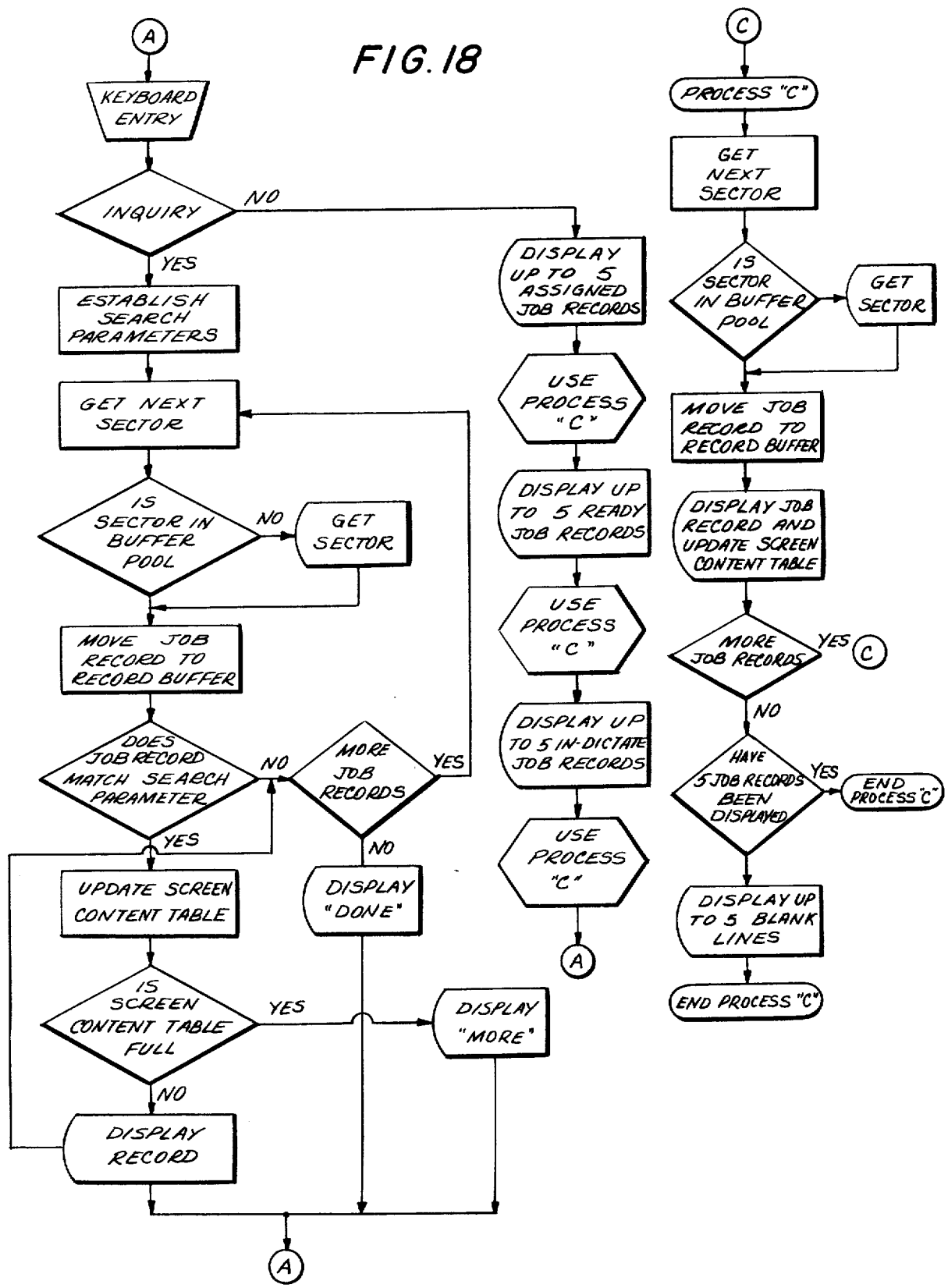
FIG. 18 is a flow chart representing the manner in which information is displayed in response to an inquiry related to a particular parameter.

Referring now to FIG. 18, there is illustrated a flow chart diagram representing the display routine carried out by CPU 44 either for an inquiry display or for a normal display. The CPU senses whether data is entered therein from keyboard 50. If so, this data is examined to ascertain whether it is a command for an inquiry related to one or more selected parameters. If this is not such an inquiry, then the data is further examined to determine whether a normal display operation is requested. The normal display routine is described below.

If CPU 44 concludes that an inquired display is to be carried out, the particular search criteria, or parameters, are established. Based upon these criteria, the appropriate queues are scanned to ascertain whether they contain sectors in which the job records which satisfy the chosen parameters are stored. Initially, as is true with all scanning operations, sector buffer pool 108 is examined to determine if the appropriate sector is stored therein. If so, the job record in this sector which contains the parameters which will satisfy the inquiry is shifted into record buffer 114. If the sector buffer pool does not contain the appropriate sector, then this sector must be retrieved from disc 52 in the manner discussed previously. The retrieved sector is read from the disc to the sector buffer pool, and the job record which satisfies the inquired parameters then is shifted from the sector buffer pool to the record buffer.

The record buffer index which identifies the storge location in the record buffer in which this job record is stored is loaded into a respective location of screen content table 120 in accordance with the established hierarchy by which the job records are to be displayed. As discussed above, this means that the indices of the record buffer storage locations in which the job records are stored chronologically are loaded into locations #1-17 of the screen content table. Gate circuit 122 then gates the job records in the order established by screen content table 120 to screen drive 124 which, in turn, drives display screen 48 to display the job records in successive lines such as shown in FIG. 13 or FIG. 14, or in accordance with the particular parameters which are chosen for display.

Location #17 of screen content table 120 is examined to determine if a record buffer index is stored therein, which would indicate that the screen content table is full. This examination is used to determine whether there are more than sixteen job records in record buffer 114. That is, this determines whether there are more job records to be displayed than there are available display lines. It is recalled that if more than sixteen job records have been shifted to record buffer 114, then location #17 of screen content table 120 will store a record buffer index. This, in turn, activates gate circuit 122 to drive screen drive 124 to display the character "more" on the display screen. This character is displayed only during an inquired display and not during a normal display operation. CPU 44 then senses whether the supervisor has actuated the page forward key. If so, the CPU inquires as to whether this is the first time that the page forward key has been actuated, and if this is the first time, then the next group of sixteen record buffer indices which identify the storage locations in which the next group of sixteen job records are stored is shifted into location #1-16 of the screen content table. Also, the record buffer index which identifies the storege location of the record buffer in which the thirty-third job record to be displayed is stored is shifted into location #17 of the screen content table. Thus, display screen 48 displays the next sixteen job records which satisfy the chosen parameter, together with the character "more".

If the page forward key is actuated once again, the CPU determines that this is not the first time that this key has been actuated and, therefore, disc 52 is accessed to retrieve those sectors which store the next group of sixteen job records which are to be displayed. These sectors are read from the disc to the sector buffer pool, and the proper job records are shifted from the sector buffer pool to the record buffer. Then, as before, the record buffer indices which identify the storage locations of the record buffer in which the next group of sixteen job records are stored are loaded into locations #1-16 of the screen content table, one at a time as each job record is shifted to the record buffer. If more than sixteen job records have been shifted into the record buffer, then location #17 of the screen content table is provided with a record buffer index indicating that the screen content table is full. The contents of the screen content table are used to drive display screen 48 so as to display the next group of sixteen job records, together with the character "more". Then, the aforedescribed operation is repeated in the event that the page forward key is actuated once again. This operation continues until either the page forward key is not actuated, even through the character "more" is displayed, or until all of the job records which satisfy the chosen parameters have been displayed.

If the screen content table is not full, the CPU inquires as to whether there are additional job records that satisfy the search criteria. If so, such job records are retrieved, as discussed above, and displayed. If all job records to satisfy the particular inquiry have been retrieved, display screen 48 displays the character "done". The next keyboard-entered inquiry, or normal display mode, is awaited.

Let it be assumed that the normal display routine is to be carried out, referred to as process "B" in FIG. 18. First, up to five of the oldest job records having the assigned-for-transcription status are retrieved, then up to five of the oldest job records having the ready-for-transcription status are retrieved, and finally up to five of the most recent job records having the in-dictation status are retrieved. Each retrieval for each of these statuses is carried out as shown in process "C" of FIG. 18 now to be described.

In process "C", the particular queue which is under inquiry, i.e., the "assigned" queue or the "ready" queue, is scanned, as discussed above until the oldest sector therein is found. If job records having the in-dictation status are queried, record buffer 114 is scanned for the newest such job record. When the appropriate job record is found, it is shifted into record buffer 114; and the record buffer index identifying the storage location in which that job record is stored is shifted to screen content table 120. More particularly, the record buffer index which identifies the storage location in record buffer 114 in which the oldest job record having the assigned-for-transcription status is stored is shifted into location #1 of screen content table 120. This results in displaying this job record in line #1 on display screen 48. The record buffer index which identifies the storage location in the record buffer in which the next oldest job record having the assigned-for-transcription status is stored is shifted into location #2 of the screen content table, for display of this job record in line #2 on the display screen. This process proceeds, that is, successive job records are transferred to record buffer 114 and their record buffer indices are stored in screen content table 120, until all of the queried job records have been displayed, or until five such job records have been displayed. If all of the queried job records have been displayed, that is, if all of the job records having the assigned-for-transciption status have been displayed, and this totals less than five job records, blank lines (up to a maximum of five lines) are displayed and then the foregoing process "C" is repeated for job records having the ready-for-transcripton status. After five lines of job records (or blank lines) have been displayed for messages that are ready-for-transcription, process "C" is repeated for job records stored in record buffer 114 having the in-dication status.

Thus, process "C", in combination with process "B", effects the normal display of up to five job records having the assigned-for-transcription status, up to five job records having the ready-for-transcription status, and up to five job records having the in-dictation status.

As mentioned previously, in order to simplify the description of the present invention, and in order to avoid obfuscation thereof, the apparatus and circuitry which are provided to gate, shift and scan data have not been discussed. Such apparatus and circuitry are known to those of ordinary skill in the art and may be implemented without undue experimentation. Preferably, CPU 44 is comprised of a microprocessor which may be programmed in order to carry out the aforementioned operations and routines. Such programming also will be implemented without undue experimentation by one of ordinary skill. CPU 44 may comprise a Model 8080 microprocessor manufactured by Intel Corp., together with an associated system clock, read only memories and random access memories. As an alternative, CPU 44 may comprise a Model SBC-80/20 Intel computer board together with a Model SBC-016 Intel memory board. Display device 46, together with its attendant keyboard 50, may comprise a Model ADM-3A CRT/Keyboard Terminal manufactured by Lear Seigler Inc. Storage disc 52 and archive disc 54 may comprise the so-called "floppy" discs and may be driven by minifloppy disc drives, such as the Model SA 400 disc drive manufactured by Shugart Crop., Incorporating a Model FD-0302-M "Ministreaker" manufactured by SMS Corp. Printer 56 may comprise a Telpar PS 48C thermal printer.

While the present invention has been particularly shown and described with reference to a preferred embodiment thereof, it should be readily apparent to those of ordinary skill in the art that various changes and modifications in form and details may be made without departing from the spirit and scope of the invention. It is, therefore, intended, that the appended claims be interpreted as including all such changes and modifications.

What is claimed is:

1. Apparatus for storing and displaying the status of individual dictated messages in a central dictation system of the type having at least one recorder, a plurality of dictate stations operatively connected to and adapted to seize said recorder, and at least one transcribe station assignable to transcribe said dictated messages, said apparatus comprising station sensing means coupled at least to said recorder for sensing when a dictate station seizes a recorder to commence the recording to a dictated message; and display means including a display screen for displaying information identifying predetermined parameters related to said message being recorded, said displayed information including the completion status of said message, immediately following the seizure of said recorder by said dictate station.

2. The apparatus of claim 1 wherein said recorder includes a seizure signal source for supplying a seizure signal when said recorder is seized by a dictate station; and wherein said station sensing meanscomprises buffer means for receiving said seizure signal.

3. The apparatus of claim 2 wherein said display means comprises central processing means coupled to said buffer means for receiving the seizure signal received by said buffer means and for generating recorder-identifying data representing the identity of said recorder, said central processing means including timing means for generating time data representing the time at which said recorder is seized and including status generating means for generating status data representing that a dictated message is being recorded by said seized recorder; and said display screen is responsive to said identifying data, said time data and said status data for displaying information representing the identity of said recorder, the time at which said recorder is seized and that a message is being recorded by said recorder.

4. The apparatus of claim 3 wherein said central dictation system has a plurality of recorders; and wherein said buffer means comprises a plurality of buffers, each associated with a respective recorder, said buffers being arranged in groups; a plurality of multiplexing means, each coupled to a respective group of buffers for transmitting said seizure signal to said central processing means; and means for selectively energizing each of said buffers and each of said multiplexing means in a predetermined sequence to enable the seizure signal supplied from respective recorders to be transmitted to said central processing means.

5. The apparatus of claim 4, further comprising encoding means provided at at least some of said dictate stations, each being manually operable by a dictator to supply to a respective buffer a dictator-identity signal representing the identity of said dictator at said dictate station, said dictator-identity signal being transmitted to said central processing means by said multiplexing means when said buffer and said multiplexing means are energized; and wherein said central processing means generates dictator-identity data in response to the received dictator-identity signal, said dictator-identity signal being associated with the message being recorded, and said display screen displays the identity of said dictator in response to said dictator-identity data.

6. The apparatus of claim 5 wherein said central processing means further comprises means for measuring the lengths of messages being recorded and for generating message-length data representative thereof, said display means being responsive to said message-length data to display the lengths of said messages being recorded.

7. The apparatus of claim 6 wherein the seizure signal source of a respective recorder terminates said seizure signal when said recorder is released by said dictate station following the completion of a message; and wherein said control processing means is responsive to the termination of said seizure signal for generating completion-time data representing the time at which said recorder is released and for generating modified status data representing the completion of said message.

8. The apparatus of claim 7 wherein said central processing means includes memory means, and means responsive to the release of said recorder for storing said dictate-identity data, recorder-identifying data, message-length data, completion-time data and modified status data in said memory means.

9. The apparatus of claim 6 wherein said respective recorder is of the type having a supply of fresh storage media, each being selectively transported, in sequence, to recording means whereat a selectable number of messages are recorded thereon, and means for ejecting a storage medium from said recording means while transporting a fresh medium thereto, each storage medium having an optically readable identifying code thereon, and an optical reader for reading said optically readable identifying code of a fresh storage medium as the latter is transported to said recording means, the optically read identifying code being transmitted by said buffer and multiplexing means to said central processing means; said central processing means generating medium-identifying data representing the identity of said fresh storage medium in response to said optically read code; and wherein said display screen displays the identity of said storage medium, in response to said medium-identifying data, when said message is being recorded.

10. The apparatus of claim 9 wherein said recorder includes means for generating an eject signal when a storage medium is ejected from said recording means, said eject signal being transmitted by said buffer and said multiplexing means to said central processing means; and wherein said central processing means comprises means responsive to said eject signal for changing the status data associated with the last-recorded message on said ejected storage medium from the status representing that said message is being recorded to the status representing that said message is ready for transcription.

11. The apparatus of claim 10 wherein said central processing means includes memory means, means responsive to the release of said recorder for each message recorded on said storage medium prior to said last-recorded message for changing the status data associated with each said message from the status representing that the respective message is being recorded to the status representing that said respective message is completed, and means responsive to the release of said recorder for each said message to store the dictator-identifying data, recorder-identifying data, medium-identifying data, message-length data, completion-time data and message-completion status data associated with said message in said memory means.

12. The apparatus of claim 11 wherein said central processing means includes means responsive to said eject signal for changing the status data in said memory means associated with all of said messages recorded on said storage meduim from the status representing message-completion to the status representing ready-for-transcription.

13. The apparatus of claims 8 or 12 wherein said memory means comprises a magnetic disc including at least a first area for storing data associated with messages having message-completion status and a second area for storing data associated with messages having ready-for-transcription status; write means for writing into said first area of said magnetic disc data associated with a message whose status is changed to message-completion and for writing into said second area of said magnetic disc data associated with a message whose status is changed to ready-for-transcription; read means for reading from said first area of said magnetic disc data associated with a message whose status is to be changed from message-completion; and temporary store means for temporarily storing the data read from said magnetic disc and the data to be written into said magnetic disc for modifying the status data of said data temporarily stored therein.

14. The apparatus of claim 13 further comprising means for inhibiting said write means from writing into said magnetic disc data associated with a message whose length is less than a predetermined amount.

15. The apparatus of claim 6 wherein said central processing means includes temporary store means for storing the data associated with all messages being recorded; means for supplying said display screen with said data stored in said temporary store means and associated with the messages being recorded; and means for no longer supplying to said display screen the data stored in said temporary store means and associated with a message being recorded when the recording of said message is completed.

16. Apparatus for storing and displaying the status of individual dictated messages in a central dictation system of the type having a plurality of recorders, a plurality of dictate stations selectively coupled to and adapted to seize selected ones of said recorders, and a plurality of transcribe stations assignable to transcribe said dictated messages, said apparatus comprising display means for displaying information of predetermined parameters associated with said messages, including the status of said messages, the information associated with a respective message being displayed in a corresponding line, said displayed lines being segregated into respective areas as a function of the particular status of the associated messages; and means operably coupled to said display means for transferring a line of displayed information from one segregated area to another as the status of the associated message changes.

17. The apparatus of claim 16 wherein said means for transferring a line of displayed information comprises central processing means responsive to status data supplied thereto and including storage means for storing information associated with a predetermined number of messages for each of different selected statuses; means for supplying the information associated with each of the predetermined number of messages to said display means for display in said respective areas; and means for supplying the information associated with a message whose status is changed to said display means for display in the area which is a function of said changed status if the number of messages in said storage means which are of said changed status is less than said predetermined number.

18. The apparatus of claim 17 wherein said central processing means includes memory means having different locations therein for storing information associated with messages of correspondingly different statuses; means for transmitting information associated with a predetermined number of messages in accordance with a pre-established hierarchy determined by said parameters from each of selected ones of said different locations to said storage means; and means for shifting information associated with a message whose status is changed into a location of said memory means corresponding to said changed status.

19. The apparatus of claim 18 further comprising multiplexing means interconnected between said plurality of recorders and said central processing means for supplying in-dictation data to said central processing means when a corresponding recorder is seized and end-of-dictation data to said central processing means when said corresponding recorder is released; and wherein said central processing means includes means responsive to said end-of-dictation data of said corresponding recorder for generating completion-time data representing the time of occurrence of the end of dictation and ready-for transcription status data representing that the dictated message is ready to be transcribed, and means for measuring the length of said dictated message for generating message-length data representative thereof, said completion-time data, ready-for-transcription status data and message length data being included in the information associated with said message.

20. The apparatus of claim 19 further comprising means coupled to said central processing means for supplying thereto signals representing that a respective dictated message has been assigned for transcription, said central processing means being responsive to said signals for generating assigned-for-transcription status data, the latter status data being included in the information associated with said messages, and wherein said memory means includes a ready-for transcription location for storing information associated with dictated messages that are ready for transcription and an assigned-for-transcription location for storing information associated with dictated messages that have been assigned for transcription, the information associated with a predetermined number of dictated messages that have been assigned for transcription being transmitted from said assigned-for-transcription location to said storage means in the order of said end-of-dictation data for display by said display means and the information associated with a predetermined number of dictated messages that are ready for transcription being transmitted from said ready-for-transcription location to said storage means in the order of said end-of-dictation data for display by said display means.

21. The apparatus of claim 20 wherein said central processing means is responsive to a signal representing that a dictated message has been assigned for transcription to determine if the information associated with that message is stored in said storage means and, if not, to transmit said information associated with said message from said ready-for-transcription location of said memory means to said storage means, said central processing means replacing said ready-for-transcription status data of said information associated with said message with said assigned-for transcription status data in said storage means and shifting said information associated with said message now containing said assigned-for-transcription status data from said storage means to said assigned-for-transcription location of said memory means.

22. The apparatus of claim 21 wherein said memory means comprises a magnetic disc having a predetermined number of sectors for storing information associated with a plurality of messages in each sector, selected ones of said sectors comprising said assigned-for-transcription location and selected others of said sectors comprising said ready-for-transcription location.

23. The apparatus of claim 22 wherein said central processing means includes means responsive to said in-dictation data associated with a message being dictated for generating start-of-dictation time data and for storing the information associated with said message being dictated, including in-dictation status data and start-of-dictation time data, in said storage means, said display means displaying said information associated with said predetermined number of messages being dictated in chronological order as determined by said start-of-dictation time data.

24. The apparatus of claim 23 wherein said central processing means is operative in response to the end-of-dictation data of a corresponding recorder to replace said in-dictation status data in the information associated with the message dictated on said recorder with a selected one of said ready-for-transcription and said assigned-for-transcription data and for transmitting said information containing said replaced data to a sector included in said ready-for-transcription location or said assigned-for-transcription location, respectively, of said magnetic disc.

25. The apparatus of claim 24 wherein said central processing means is operative in response to the shifting from said storage means to a sector of information associated with a message and containing status data changed from ready-for-transcription to assigned-for-transcription to replace the shifted information with new information associated with a different message transmitted to said storage means from a sector and containing ready-for-transcription status data.

26. The apparatus of claim 25 further comprising means for supplying to said central processing means signals representing the completion of transcription of a respective message which had been assigned for transcription, said central processing means being responsive to said last-mentioned signals for generating completed-transcription status data and for scanning said storage means to determine if the information associated with said respective message is stored therein and for transmitting information associated with said respective message from a sector to said storage means in the event that said information associated with said respective message is not stored in said storage means, said central processing means being operative to replace the assigned-for-transcription status data of the information in said storage means which is associated with said respective message with said completed-transcription data, to shift said information containing said replaced status data from said storage means to a sector included in a completed-transcription location of said magnetic disc, and to replace said shifted information with new information containing assigned-for-transcription status data transmitted to said storage means from a sector.

27. The apparatus of claim 16 wherein at least one of said recorders is of one type having a supply of fresh recording media, recording means spaced from said supply, means for transporting a recording medium from said supply to said recording means so that messages can be dictated onto said transported recording medium, eject means for ejecting a recording medium from said recording means while a fresh recording medium is transported thereto, optical reading means for reading an optical identifying code on a recording medium as said recording medium is transported to said recording means; wherein at least one other recorder is of another type which includes a recording medium adapted to have a message dictated thereon while, concurrently, to have a dictated message transcribed therefrom by a transcribe station assigned to transcribe dictated messages recorded on said other type recorder; wherein said means for transferring a line of displayed information comprises central processing means; and further comprising multiplexing means connected between said plurality of recorders and said central processing means to supply to said central processing means signals representing the identity of each dictate station that seizes a respective recorder, the identity of each respective recorder that is seized, the termination of seizure of a recorder, the identity of the transcribe station which is assigned to transcribe dictated messages recorded on said other type recorder, the identifying code on a recording medium, the ejection of a recording medium from a said one type recorder, and the identity of a transcribe station which may be assigned to transcribe dictated messages from a recording medium ejected from a said one type recorder; said central processing means being responsive to the seizure of a recorder for generating in-dictation status data, being responsive to the signal representing the identity of a recorder for generating recorder-identifying data, being responsive to the signal representing the termination of seizure of a said other type recorder for generating assigned-for-transcription status data, being responsive to the signal representing the termination of seizure of a said one type recorder for generating end-of-dictation status data, being responsive to the signal representing the ejection of a recording medium from a said one type recorder for generating ready-for-transcription status data, being responsive to the signal representing the identifying code on a recording medium for generating medium-identifying data and being responsive to signals representing the identities of transcribe stations which are assigned to transcribe dictated messages which had been recorded on said one and other type recorders, respectively, for generating transcribe-station-identifying data, all of said data generated by said central processing means for a respective message being included in the information associated with that message; and wherein said display means comprises a display screen coupled to said central processing means for displaying the information associated with a predetermined number of messages containing said assigned-for-transcription status data in a first area on said screen, for displaying the information associated with a predetermined number of messages containing said ready-for-transcription status data in a second area on said screen, and for displaying the information associated with a predetermined number of messages containing said in-dictation status data in a third area on said screen.

28. The apparatus of claim 27 wherein said central processing means includes length measuring means for measuring the length of each dictated message and for generating length data, said length data being included in the information associated with each dictated message; said central processing means further including storage means for storing the information associated with each message containing in-dictation status data and also for storing the information associated with said predetermined number of messages containing assigned-for-transcription status data and the information associated with said predetermined number of messages containing ready-for-transcription status data, and means for supplying to said display screen information associated with each said predetermined number of messages containing said assigned-for-transcription, said ready-for-transcription and said in-dictation status data, respectively, stored in said storage means.

29. The apparatus of claim 28 wherein said central processing means is operative in response to the termination of seizure of a recorder to change the status data in the information associated with the corresponding message and, in the event that the information associated with said corresponding message had been displayed in said third area on said screen, to delete said information from said third area; said status data being changed to assigned-for-transcription status data if said message had been recorded on said other type recorder and the information associated therewith being displayed in said first area on said screen if said storage means has information associated with less than said predetermined number of messages containing said assigned-for-transcription status data stored therein, said status data being changed to ready-for-transcription status data if said message had been recorded on a recording medium in said one type recorder and said recording medium is ejected therefrom and the information associated with at least the oldest messages on the ejected recording medium being displayed in said second area on said screen if said storage means has information associated with less than said predetermined number of messages containing said ready-for-transcription status data stored therein, and said status data being changed to end-of-dictation status data if said message had been recorded on a recording medium in said one type recorder and said recording medium is not ejected therefrom.

30. The apparatus of claim 29 wherein said central processing means further includes memory means having assigned-for-transcription storage locations for storing the information associated with messages containing said assigned-for-transcription status data, ready-for-transcription storage locations for storing the information associated with messages containing said ready-for-transcription status data and end-of-dictation storage locations for storing the information associated with messages containing said end-of-dictation status data; and wherein if the status data associated with a message is to be changed, the information associated with that message, if not stored in said storage means, is transferred to said storage means from said memory means, the status data in said information then in said storage means is changed, and said information is returned to said memory means for storage in the location whereat information associated with messages containing the changed status data is stored.

31. The apparatus of claim 30 wherein said central processing means is operative to transfer information associated with a message containing assigned-for-transcription data or ready-for-transcription data to said storage means for display on said display screen in the event that information associated with less than said predetermined number of messages containing said assigned-for-transcription data or said ready-for-transcription data, respectively, are displayed.

32. The apparatus of claim 16 wherein said display means is selectively operable to display said information of messages having a particular one status.

33. The apparatus of claim 32 further comprising storage means having a plurality of storage locations for storing said information of messages having respectively different statuses; and means for supplying to said display means information of messages all having a selected one status.

34. The apparatus of claim 33 further comprising access means for accessing said storage means to selectively supply to said display means said information of all messages having a selected parameter.

35. The apparatus of claim 34 wherein the information of each message contains status data and parameter data; and wherein said storage means comprises a magnetic disc having a plurality of sectors, each sector being adapted to store information of messages having the same status, and temporary store means for temporarily storing information of messages and for supplying the information stored therein to said display means, information being transferred to said temporary store means from said magnetic disc in accordance with a selected status or parameter.

36. The apparatus of claim 35 wherein the capacity of said temporary store means to store information of a number of messages is greater than the number of messages whose information can be displayed by said display means; and wherein said display means provides a predetermined indication in the event that the information of a greater number of messages than is displayed is stored in said temporary store means.

37. The apparatus of claim 36 wherein said display means is operable to display the information of a predetermined number of messages stored in said temporary store means and, in the event that said temporary store means stores information of more than said predetermined number of messages said display means is operable to advance the display to information of the next predetermined number of messages in said temporary store means, said display means providing said predetermined indication in the event that information of at least one additional message is in said temporary store means than is displayed, and wherein further information is transferred to said temporary store means from said magnetic disc in accordance with a selected status or parameter if said display means is operated to display said at least one additional message.

38. Apparatus for storing and displaying the status of individual dictated messages in a central dictation system of the type having at least one recorder, a plurality of dictate stations selectively coupled to and adapted to seize said recorder, and a plurality of transcribe stations assignable to transcribe said dictated messages, said apparatus comprising storage means for storing information of predetermined parameters associated with said messages, including status data of the status of said messages and time data of the time duration of each said message; display means operatively coupled to said storage means for displaying said stored information of at least a predetermined number of said messages; and means operatively coupled to said storage means for converting the time data of each message to an approximate line-of-transcription data representing the equivalent lines of printing of said message as transcribed, such that said display means displays the length of each message as an approximate number of lines of printing thereof once transcribed.

39. The apparatus of claim 38, further comprising central processing means including timing means responsive to the dictation of a message to time the length of said dictated message to generate said time data as dictation proceeds.

40. The apparatus of claim 1, 16 or 38, wherein at least one recorder is a multiple-cassette recorder having a supply of fresh cassettes and a recording means, each cassette having optically coded indicia on the housing thereof for identifying the cassettes; means for transporting individual ones of said cassettes from said supply to said recording means; and optical reading means interposed in the transport path of said cassettes for reading said optically indicia and generating cassette identification for display on said display means.

41. The apparatus of claim 1, 16 or 38, further comprising manually operable encoding means at each dictate station selectively operable by a user when said dictate station seizes a recorder to generate user identification information for display on said display means.

42. The apparatus of claim 1, 16 or 38, further comprising means for erasing from said display means information of messages having less than a predetermined duration.

43. Apparatus for storing and displaying information associated with respective messages which are dictated in a central dictation system, said information including status data representing whether said message has been transcribed and including predetermined parameters associated with said message, said apparatus comprising display means for selectively displaying information associated with a predetermined number of messages for each of selected statuses and for selectively displaying information associated with a plurality of messages having a common selected parameter; storage means for storing the information which is displayed; a magnetic disc for storing the information which is not displayed, said magnetic disc having a plurality of storage locations corresponding to the different statuses of said messages such that the information associated with messages of a particular status are stored in a respective storage location; means for transferring information from said magnetic disc to said storage means in accordance with the parameter which is selected for the display of information; and an archive magnetic disc for selectively receiving information associated with messages which have been transcribed; and means for supplying information from said archive magnetic disc to said storage means in the event that the information on said archive magnetic disc includes the parameter which is selected for the display of information.

44. The apparatus for storing and displaying information associated with respective messages which are dictated in a central dictation system of the type having at least one multiple cassette recorder which includes recorder means for recording a dictated message, loading means for loading said recorder means with a said eject means to unload said cassette and said loading means to load said recorder means with a fresh cassette for priority dictation.

45. Apparatus for storing and displaying the status of individual dictated messages in a central dictation system of the type having a plurality of recorders, a plurality of dictate stations selectively coupled to and adapted to seize selected ones of said recorders such that authors at said dictate stations are enabled to dictate messages for recording by said recorders, and a plurality of transcribe stations whereat transcriptionists are enabled to transcribe said dictated messages, said apparatus comprising storage means operatively coupled to at least said recorders for storing information associated with each message which is in the process of being dictated or which has been dictated, said information including status data; central processing means for measuring the length of each message which has been dictated, means for storing the lengths of all messages dictated by each author onto each recorder; and print means coupled to said central processing means and selectively operative to print summaries of the lengths of said messages dictated by said authors.

46. The apparatus of claim 45 wherein said summaries include a total length of all messages dictated by each author.

47. The apparatus of claim 45 wherein said summaries include a total length of all messages dictated to each recorder.

48. The apparatus of claim 46 or 47 wherein said means for storing further stores information of the number of messages dictated by each author; and said summaries further include the total number of dictated messages.

49. The apparatus of claim 45 wherein said means for storing further stores the lengths of all messages transcribed by each transcriptionist; and wherein said print means is selectively operative to print summaries of the total length of messages transcribed by each transcriptionist.

50. The apparatus of claim 45 wherein said central processing means is operative to update said stored information associated with each message in response to a change in status of said message; and wherein said print means is selectively operative in response to said change in status to print at least some of the stored information associated with the message whose status is changed.

* * * * *

UNITED STATES PATENT AND TRADEMARK OFFICE
CERTIFICATE OF CORRECTION

PATENT NO. : 4,319,337

DATED : March 9, 1982

INVENTOR(S) : Willy M. Sander, David L. Boudreau and G. Burnell Hohl

It is certified that error appears in the above-identified patent and that said Letters Patent are hereby corrected as shown below:

Claim 44, in its entirety, should read as follows:

44. Apparatus for storing and displaying information associated with respective messages which are dictated in a central dictation system of the type having at least one multiple cassette recorder which includes recorder means for recording a dictated message, loading means for loading said recorder means with a fresh cassette, said cassette being provided with encoded identity indicia thereon, reading means for reading the encoded identity provided on said cassette as said cassette is loaded, eject means for unloading a dictated cassette from said recorder means and priority discharge means for unloading and discharging a cassette from said recorder means, and a plurality of dictate stations each adapted to seize said multiple-cassette recorder and to control a dictation operation, said apparatus comprising central processing means responsive to the reading of the encoded identity of said cassette as said cassette is loaded to generate cassette-identity data, responsive to the release of said multiple-cassette

UNITED STATES PATENT AND TRADEMARK OFFICE
CERTIFICATE OF CORRECTION

PATENT NO. : 4,319,337
DATED : March 9, 1982
INVENTOR(S) : Willy M. Sander, David L. Boudreau and G. Burnell Hohl It is certified that error appears in the above—identified patent and that said Letters Patent are hereby corrected as shown below:

recorder by a dictate station to generate hang-up status data and responsive to the unloading of a cassette to generate ready-for-transcription data, said central processing means including timing means to determine the length of a message being dictated, and to generate length-of-message being dictated, and to generate length-of-message data, said cassette-identity data, hang-up status data, ready-for-transcription data and length-of-message data being selectively included in said information; storage means for storing said information; and display means for selectively displaying said information; said central processing means being selectively operative in response to a request for priority dictation to determine if any messages have been recorded on the cassette which is loaded in said recorder means and, if not, to control said priority discharge means to unload and discharge said cassette upon release of said multiple-cassette recorder, said central processing means being further operative in response to a request for priority dictation, in the event that it is determined that

UNITED STATES PATENT AND TRADEMARK OFFICE
CERTIFICATE OF CORRECTION

PATENT NO. : 4,319,337
DATED : March 9, 1982
INVENTOR(S) : Willy M. Sander, David L. Boudreau and G. Burnell Hohl It is certified that error appears in the above-identified patent and that said Letters Patent are hereby corrected as shown below:

at least one message has been recorded on said cassette which is loaded in said recorder means, to examine said length-of-message data to determine if a message is in the process of being dictated and, if not, to control said eject means to unload said cassette and said loading means to load said recorder means with a fresh cassette for priority dictation.

Signed and Sealed this

Twenty-eighth Day of December 1982

[SEAL]

Attest:

GERALD J. MOSSINGHOFF

Attesting Officer      Commissioner of Patents and Trademarks